US00RE50394E

(19) United States
(12) Reissued Patent
Schmuckle

(10) Patent Number: US RE50,394 E
(45) Date of Reissued Patent: Apr. 22, 2025

(54) LIGHT FIXTURE WITH TILTABLE SEALED LIGHT SOURCE

(71) Applicant: Hunter Industries, Inc., San Marcos, CA (US)

(72) Inventor: Darrin I. Schmuckle, Vista, CA (US)

(73) Assignee: Hunter Industries, Inc., San Marcos, CA (US)

(21) Appl. No.: 17/321,342

(22) Filed: May 14, 2021

Related U.S. Patent Documents

Reissue of:
(64) Patent No.: 10,288,267
Issued: May 14, 2019
Appl. No.: 16/228,457
Filed: Dec. 20, 2018

U.S. Applications:
(63) Continuation of application No. 15/011,137, filed on Jan. 29, 2016, now Pat. No. 10,197,252.

(51) Int. Cl.
*F21V 3/00* (2015.01)
*F21S 8/02* (2006.01)
(Continued)

(52) U.S. Cl.
CPC ..... *F21V 19/02* (2013.01); *F21V 3/00* (2013.01); *F21V 7/00* (2013.01); *F21V 17/02* (2013.01);
(Continued)

(58) Field of Classification Search
CPC . F21V 29/70; F21V 7/00; F21V 19/02; F21V 17/02; F21V 29/74; F21V 31/005;
(Continued)

(56) References Cited

U.S. PATENT DOCUMENTS

D242,945 S 1/1977 Moore
4,180,850 A 12/1979 Bivens
(Continued)

FOREIGN PATENT DOCUMENTS

CN 100549500 C 10/2009
CN 201377739 Y 1/2010
(Continued)

OTHER PUBLICATIONS

Lumpenpulse installation instructions, Oct. 20, 2020.
Lumenpulse installation sheet, Oct. 20, 2020.
UL1598 cover page and p. 13, dated Dec. 30, 2004.

*Primary Examiner* — Deandra M Hughes
(74) *Attorney, Agent, or Firm* — KNOBBE MARTENS OLSON & BEAR LLP

(57) ABSTRACT

A light fixture can include a light housing and a light cartridge. The light cartridge can be configured to releasably and/or electrically connect to a portion of the light housing. In some embodiments, the light cartridge includes a collar movably connected to the cartridge and configured to rotate with respect to the cartridge. Rotation of the collar can facilitate attachment and/or release of the cartridge from the light housing. In some cases, the cartridge includes a releasable driver, one or more lenses, one or more beam reflectors, one or more diffusers, and/or other electrical and optical components.

29 Claims, 49 Drawing Sheets

(51) Int. Cl.

| | |
|---|---|
| ***F21V 7/00*** | (2006.01) |
| ***F21V 17/02*** | (2006.01) |
| ***F21V 19/02*** | (2006.01) |
| ***F21V 21/14*** | (2006.01) |
| ***F21V 21/30*** | (2006.01) |
| ***F21V 23/00*** | (2015.01) |
| ***F21V 23/06*** | (2006.01) |
| ***F21V 29/507*** | (2015.01) |
| ***F21V 29/70*** | (2015.01) |
| ***F21V 29/74*** | (2015.01) |
| ***F21V 31/00*** | (2006.01) |
| ***H05B 47/19*** | (2020.01) |
| *F21W 131/10* | (2006.01) |
| *F21Y 115/10* | (2016.01) |

(52) U.S. Cl.

CPC ..... *F21V 23/003* (2013.01); *F21V 23/06* (2013.01); *F21V 29/70* (2015.01); *F21V 29/74* (2015.01); *F21V 31/005* (2013.01); *H05B 47/19* (2020.01); *F21S 8/022* (2013.01); *F21V 21/14* (2013.01); *F21V 21/30* (2013.01); *F21V 29/507* (2015.01); *F21W 2131/10* (2013.01); *F21Y 2115/10* (2016.08)

(58) Field of Classification Search

CPC ..... F21V 3/00; F21V 23/06; F21V 23/003; F21V 21/14; F21V 21/30; F21V 29/507; H05B 47/19; F21W 2131/10; F21Y 2115/10; F21S 8/022

See application file for complete search history.

(56) References Cited

U.S. PATENT DOCUMENTS

| | | | | |
|---|---|---|---|---|
| 5,599,091 | A | 2/1997 | Kira | |
| 5,649,760 | A | 7/1997 | Beadle | |
| 6,017,137 | A * | 1/2000 | Suehiro | B60Q 1/0683 362/529 |
| 6,357,892 | B1 | 3/2002 | Beadle | |
| 6,422,717 | B1 | 7/2002 | Beadle | |
| 6,491,407 | B1 * | 12/2002 | Beadle | F21S 8/022 362/153 |
| 6,540,374 | B2 | 4/2003 | Hudson | |
| 6,612,720 | B1 | 9/2003 | Beadle | |
| 6,752,516 | B1 | 6/2004 | Beadle | |
| 6,779,907 | B2 | 8/2004 | Beadle | |
| 6,786,622 | B1 | 9/2004 | Rice | |
| 6,796,684 | B1 | 9/2004 | Beadle | |
| 6,799,869 | B1 | 10/2004 | Beadle | |
| 6,860,624 | B2 | 3/2005 | Hille et al. | |
| 6,874,905 | B1 | 4/2005 | Beadle | |
| 6,902,200 | B1 | 6/2005 | Beadle | |
| 7,320,533 | B1 | 1/2008 | Beadle | |
| 7,387,409 | B1 | 6/2008 | Beadle | |
| 7,520,644 | B2 | 4/2009 | Jordan et al. | |
| 7,524,078 | B1 * | 4/2009 | Pressel | F21S 8/022 362/374 |
| 7,712,925 | B2 | 5/2010 | Russell | |
| 7,874,709 | B1 | 1/2011 | Beadle | |
| 7,905,621 | B1 * | 3/2011 | Hickman | F21V 31/00 362/153.1 |
| 7,993,040 | B2 | 8/2011 | Beadle | |
| 8,360,621 | B2 | 1/2013 | Avila et al. | |
| 8,602,613 | B2 | 12/2013 | Pike et al. | |
| 9,689,565 | B2 | 6/2017 | Fryzek | |
| 9,784,440 | B2 | 10/2017 | Erdener et al. | |
| 10,077,894 | B2 | 9/2018 | Mjelde | |
| D849,297 | S | 5/2019 | Deng | |
| D855,231 | S | 7/2019 | Huang | |
| 10,464,469 | B2 * | 11/2019 | Ekladyous | B60Q 1/05 |
| D882,142 | S | 4/2020 | Huang | |
| 10,612,734 | B2 * | 4/2020 | MacLeish | E04F 11/1836 |
| D900,372 | S | 10/2020 | Peng | |
| 10,816,168 | B2 * | 10/2020 | Zeman | F21V 15/01 |
| 10,935,229 | B2 | 3/2021 | Gauthier | |
| 11,466,821 | B2 * | 10/2022 | Zhang | F21V 23/06 |
| 2001/0014021 | A1 | 8/2001 | Duff et al. | |
| 2004/0120141 | A1 | 6/2004 | Beadle | |
| 2004/0145899 | A1 * | 7/2004 | Riebling | F21V 27/02 362/487 |
| 2004/0246709 | A1 * | 12/2004 | Hagen | F21S 8/022 362/153.1 |
| 2004/0252489 | A1 * | 12/2004 | Hagen | F21S 8/022 362/153.1 |
| 2005/0174774 | A1 | 8/2005 | Lunt | |
| 2006/0114668 | A1 * | 6/2006 | Hagen | F21V 31/03 362/153.1 |
| 2006/0198129 | A1 * | 9/2006 | Hagen | F21V 31/03 362/153.1 |
| 2009/0040774 | A1 | 2/2009 | Avila | |
| 2009/0154164 | A1 | 6/2009 | Hsu et al. | |
| 2011/0255293 | A1 | 10/2011 | Lipscomb et al. | |
| 2015/0369469 | A1 * | 12/2015 | Vamberi | E01F 9/559 362/267 |
| 2016/0327258 | A1 * | 11/2016 | Sloan | F21V 14/02 |
| 2016/0377280 | A1 * | 12/2016 | Acampora | F21S 8/022 362/294 |

FOREIGN PATENT DOCUMENTS

| | | | |
|---|---|---|---|
| CN | 202177052 | U | 3/2012 |
| CN | 202675059 | U | 1/2013 |
| CN | 102192449 | B | 3/2013 |
| CN | 203384914 | U | 1/2014 |
| CN | 204153599 | U | 2/2015 |
| CN | 204300860 | U | 4/2015 |
| CN | 204300871 | U | 4/2015 |
| CN | 204420720 | U | 6/2015 |
| CN | 105135292 | A | 12/2015 |

* cited by examiner

LIGHT FIXTURE WITH TILTABLE SEALED LIGHT SOURCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue of U.S. Pat. No. 10,288,267 which issued on May 14, 2019, from U.S. patent application Ser. No. 16/228,457, filed on Dec. 20, 2018, which* is a continuation application of U.S. patent application Ser. No. 15/011,137, filed Jan. 29, 2016, and entitled "LIGHT FIXTURE WITH REMOVABLE LIGHT CARTRIDGE." The entire contents of the above application is hereby incorporated by reference and made a part of this specification. Any and all priority claims identified in the Application Data Sheet, or any correction thereto, are hereby incorporated by reference under 37 CFR § 1.57.

BACKGROUND

Technical Field

The present invention relates to light fixtures, and more particularly, light fixtures designed for outdoor installation.

Description of the Related Art

Outdoor lighting is popular for security, aesthetic, safety, and other reasons. For many years outdoor landscape light fixtures have incorporated incandescent light bulbs. Recent advances in light emitting diode (LED) technology have led to an increased demand for improved landscape light fixtures that utilize more reliable and more energy efficient high intensity LEDs.

Various types of commercial landscape light fixtures are available to meet the particular needs of residential or commercial properties. These include path, down, deck, tree, spot, spread, and security light fixtures.

SUMMARY

In many installations and circumstances, it is desirable to utilize a light fixture that is reliable and easy to repair. This can be especially true in installation environments subject to rain or other environmental hazards. In some cases, a reliable and easy-to-repair light fixture can include a light housing configured to receive a light cartridge. The light cartridge can be constructed to include many or most of the lighting and/or electrical components of the light fixture. In some cases, the light cartridge is interchangeable with other light cartridges (e.g., replacement light cartridges and/or light cartridges having varying lighting/power/operable features). The light cartridge can include a handle or other structure configured to facilitate easy installation and removal of the cartridge from the light housing. In some embodiments, the handle or other structure is moveable with respect to a body portion of the light cartridge.

According to some variants, a light fixture includes a light housing. The light housing can have a first end; a second end; an opening at the first end; a light housing axis extending through the first and second ends; and/or at least one sidewall defining a light housing interior. The light fixture can include a light cartridge. The light cartridge can be configured to releasably and electrically connect to a portion of the light housing. In some embodiments, the light cartridge has a cartridge body having: a body axis; a first end; and/or a second end spaced from the first end along the body axis. The cartridge can include a collar moveably connected to the first end of the cartridge body; an electrical connector configured to releasably and electrically connect with a source of electric power; and/or a light element operably connected to the electrical connector and configured to direct light out of the opening of the light housing when the light cartridge is connected to the light housing. In some embodiments, the light cartridge is configured to: transition between a connected position and a released position with respect to the light housing; transition from the connected position to the released position via rotation of the collar about the light housing axis, followed by translation away from the second end of the light housing toward the first end of the light housing; and/or transition from the released position to the connected position via translation through the opening of the light housing toward the second end of the light housing, followed by rotation about of the collar the light housing axis.

In some embodiments, the light cartridge is configured to transition between the connected and released positions without the use of tools.

In some embodiments, the light fixture includes a handle connected to the collar.

In some embodiments, the collar is configured to rotate with respect to the cartridge body.

In some embodiments, the handle comprises a gripping portion and a pair of tracks connected to the gripping portion.

In some embodiments, the gripping portion has a first end and a second end and an arcuate body extending between the first and second ends, the arcuate body having a concave side and a convex side opposite the concave side, In some embodiments, each of the pair of tracks has an arcuate shape. In some embodiments, the tracks are configured to move in an arcuate path as the handle is transitioned between an actuation position and a closed position.

In some embodiments, the handle is configured to rotate about a first axis of rotation when the handle transitions between an actuation position and a closed position. In some embodiments, the handle is configured to rotate about the light housing axis when the light cartridge transitions between the connected and released positions.

In some embodiments, the first axis of rotation is perpendicular to the body axis of the cartridge body.

In some embodiments, the light cartridge comprises a driver removably connected to the cartridge body and electrically connected to the light element.

According to some variants, a light fixture can include a light housing having an opened end; and/or a light cartridge configured to releasably and electrically connect to a portion of the light housing. The light cartridge can include a cartridge body; a collar rotatably connected to the cartridge body; an electrical connector configured to releasably and electrically connect with a source of electric power; and/or a light element operably connected to the electrical connector and configured to direct light out of the opened end of the light housing when the light cartridge is connected to the light housing. In some embodiments, the collar is configured to rotate between a first position and a second position with respect to the cartridge body.

In some embodiments, the light cartridge has a body axis and includes a locking tab extending away from the body axis. In some embodiments, the light housing includes a tab slot. In some embodiments, the locking tab is configured to couple with and move with respect to the tab slot when the light cartridge is transitioned between a connection with and disconnection from the light housing.

In some embodiments, the tab slot has a helical shape configured to move the light cartridge toward an end of the light housing opposite the opened end as the collar is rotated to the second position when the locking tab is positioned within the tab slot.

In some embodiments, the locking tab is positioned on the collar.

In some embodiments, the locking tab is positioned closer to the light element than to an end of the light cartridge opposite the light element.

In some embodiments, the light fixture includes one or more thermal pads positioned on the light cartridge and configured to transfer heat from the light cartridge to the light housing.

In some embodiments, transition of the light cartridge to the connected position compresses the one or more thermal pads, and the one or more thermal pads have increased heat conduction properties when compressed.

In some embodiments, an electrical connection between the light cartridge and the light housing is engaged as the collar is rotated to the second position when the light cartridge is positioned within the light housing. In some embodiments, the electrical connection between the light cartridge and the light housing is disengaged as the light cartridge is rotated to the first position when the light cartridge is electrically connected to the light housing.

In some embodiments, the light cartridge comprises a driver removably connected to the cartridge body and electrically connected to the light element.

According to some variants, a light fixture can include a light housing. The light housing can have: a first end; a second end; an opening at the first end; a light housing axis extending through the first and second ends; and/or at least one sidewall defining a light housing interior. In some embodiments, the light fixture includes a light cartridge configured to releasably and electrically connect to a portion of the light housing. The light cartridge can include a cartridge body; a collar moveably connected to the first end of the cartridge body and configured to transition between an actuation position and a closed position; and/or a light element configured to direct light out of the opening of the light housing when the light cartridge is connected to the light housing. In some embodiments, the light fixture includes a light cover configured to removably connect to the first end of the light housing.

In some embodiments, the light cover comprises a cover portion and a mating portion extending from the cover portion toward the second end of the light housing when the light cover is connected to the light housing. In some embodiments, the mating portion of the light cover includes at least one seal configured to form a seal between the mating portion and a portion of the light housing. In some embodiments, the seal between the mating portion of the light cover and the portion of the light housing inhibits or prevents moisture ingress past the light cover to the light cartridge.

In some embodiments, the light cover includes an aperture configured to receive a fastener. In some embodiments, the light housing includes a fastener recess aligned with the aperture of the light cover when the light cover is connected to the first end of the light housing. In some embodiments, light cover is configured to be removable from the light housing by hand after the fastener is removed from the fastener recess.

In some embodiments, when the light cover is installed on the light housing: the light cover includes a lens seat and a lens positioned within the lens seat. The lens can include: a front face; a back face opposite the front face and positioned closer to the second end of the light housing; a first end extending between the front and back faces; and/or a second end extending between the front and back faces opposite the first end. In some embodiments, when the light cover is installed on the light housing, the first end of the lens is positioned closer to the second end of the light housing than the second end of the lens; at least a portion of the light cover positioned beyond the first end of the lens with respect to the second end of the lens is positioned closer to the second end of the light housing than any portion of the front face of the lens; and/or the portion of the front face of the lens closest to the second end of the light housing is visible from at least one direction perpendicular to the light housing axis.

In some embodiments, the lens is planar.

In some embodiments, the first end of the lens is positioned beneath the any other portion of the lens when the first end of the light housing is positioned above the second end of the light housing, and when the light housing axis is within 10° of vertical.

In some embodiments, the light cover and lens are configured to direct water away from the lens and out from the light cover when the first end of the light housing is positioned above the second end of the light housing and the light housing axis is within 10° of vertical.

In some embodiments, when the light cover is installed on the light housing, the light cover includes a lens seat and a lens positioned within the lens seat, and when the light cover is positioned above the second end of the light housing and the light housing axis is within 10° of vertical, the light cover is configured to inhibit accumulation of water on the lens and direct all water off of the lens and out from the light cover.

In some embodiments, the light cover includes a shroud.

In some embodiments, the light fixture includes a pivot mount rotatably connected to the light housing. In some embodiments, the light housing is configured to rotate up to a range of approximately 120° of rotation with respect to the pivot mount.

In some embodiments, the light fixture includes a fastener configured to engage with the light housing and pivot mount. In some embodiments, loosening the fastener permits rotation of the light housing with respect to the pivot mount and tightening the fastener rotationally locks the light housing with respect to the pivot mount.

In some embodiments, the pivot mount includes a mount opening. In some embodiments, the mount opening defines the only aperture through which wires pass out from the light fixture.

In some embodiments, the light cartridge comprises a driver removably connected to the cartridge body and electrically connected to the light element.

In some embodiments, the light cartridge includes a clamp configured to retain the driver in connection to the cartridge body. In some embodiments, the clamp is configured to transition between a retaining position in which the driver is retained in position and a release position in which the driver may be removed from the cartridge body.

In some embodiments, the clamp is configured to accommodate drivers of various physical sizes.

According to some variants, a light assembly includes an outer housing. The outer housing can include: a first end configured to be positioned at or below a ground level or wall surface when installed; a second end opposite the first end; and/or an outer housing axis extending through the first and second ends of the outer housing. The light assembly can include an inner housing assembly. The inner housing assembly can include: a first end; a second end; a hollow inner housing body extending between the first and second ends of the inner housing; a light cartridge positioned within the inner housing body and having a lighting element configured to emit light through the second end of the inner housing assembly; and/or a tilt assembly connected to the inner housing body and having a user input portion configured to receive user input. The tilt assembly can be configured to tilt the light cartridge between a first tilt position and a second tilt position with respect to the outer housing axis upon receipt of user input. In some embodiments, the tilt assembly is configured to tilt the light cartridge between the first and second tilt positions without breaking the hermetic seal of the second end of the inner housing.

In some embodiments, the light assembly includes a lens assembly connected to the second end of the inner housing assembly and configured to hermetically seal the second end of the inner housing.

In some embodiments, the lens assembly comprises: a lens frame configured to connect to the second end of the inner housing assembly; a lens positioned between the lens frame and the second end of the inner housing assembly when the lens frame is connected to the second end of the inner housing assembly; and/or a seal positioned between the lens and the second end of the inner housing assembly when the lens frame is connected to the second end of the inner housing assembly.

In some embodiments, the lens frame comprises at least one fastener aperture configured to align with at least one fastener aperture of the inner housing body when the lens assembly is connected to the second end of the inner housing assembly.

In some embodiments, the tilt assembly has: an adjusting shaft with a first end and a second end, the user input portion positioned on the first end of the adjusting shaft; and/or a collar adjustably connected to the adjusting shaft. In some embodiments, the collar is configured to move toward and away from the second end of the inner housing assembly in response to user input to the user input portion.

In some embodiments, the tilting assembly has a bracket, the bracket connected to the light cartridge and having at least one rail. In some embodiments, the collar is slidably connected to the at least one rail.

In some embodiments, the first end of the adjusting shaft is accessible from outside of the inner housing assembly when the lens assembly is connected to the second end of the inner housing assembly. In some embodiments, the second end of the adjusting shaft is positioned inside the inner housing assembly when the lens assembly is connected to the second end of the inner housing assembly.

In some embodiments, the adjusting shaft includes a threaded portion between the first and second ends of the adjusting shaft. In some embodiments, the collar includes a threaded aperture connected to the threaded portion of the adjusting shaft.

In some embodiments, an interior of the inner housing assembly is hermetically sealed from an exterior of the inner housing assembly when the light assembly is assembled.

In some embodiments, the light assembly includes a strain relief positioned through a wall of the inner housing body and configured to permit passage of a wire through the wall of the inner housing body in a sealed manner.

In some embodiments, the light assembly includes one or more fasteners having heads. In some embodiments, the outer housing includes one or more fastener apertures configured to receive the one or more fasteners. In some embodiments, the inner housing body includes a mating portion configured to be held between the heads of the one or more fasteners and the outer housing body when the one or more fasteners are received in the one or more fastener apertures. In some embodiments, the one or more fasteners are configured to hold the inner housing body in place with respect to the outer housing when tightened.

In some embodiments, the inner housing assembly is configured to transition between a first rotational position and a second rotational position without breaking the hermetic seal on the inner housing assembly when the one or more fasteners are loosened.

In some embodiments, the inner housing assembly is rotatable within the outer housing assembly without breaking the hermetic seal on the inner housing assembly.

In some embodiments, the light assembly includes a pivot frame positioned within the inner housing assembly and configured to receive the light cartridge.

In some embodiments, the pivot frame comprises a sleeve portion and at least one tilting member extending from the sleeve portion.

In some embodiments, the at least one tilting member comprises an arcuate surface.

In some embodiments, the inner housing body includes at least one tilting pocket configured to receive the at least one tilting member. In some embodiments, the at least one tilting body has an arcuate surface configured to engage the arcuate surface of the at least one tilting member. In some embodiments, the at least one tilting member is configured to rotate within the tilting pocket between a first tilt position and a second tilt position.

In some embodiments, the at least one tilting member is configured to rotate within the tilting pocket about a tilt axis, and wherein the tilt axis is non-parallel to the outer housing axis.

In some embodiments, the tilt axis is substantially perpendicular to the outer housing axis.

In some embodiments, the at least one tilting member comprises a first stop wall and a second stop wall. In some embodiments, the first stop wall is configured to limit rotation of the tilting member with respect to the tilting pocket in a first direction and the second stop wall is configured to limit rotation of the tilting member with respect to the tilting pocket in a second direction.

In some embodiments, the light assembly includes at least one pivot frame retainer connected to the inner housing body. In some embodiments, the first stop wall is configured to abut the at least one pivot frame retainer when the at least one tilting member is in the first tilt position. In some embodiments, the second stop wall is configured to abut the at least one pivot frame retainer when the at least one tilting member is in the second tilt position.

In some embodiments, the inner housing body comprises a tilt housing. In some embodiments, the tilt assembly is positioned at least partially within the tilt housing.

In some embodiments, the light assembly includes an installation cap configured to connect to the second end of the outer housing. In some embodiments, the installation cap includes: a cover portion configured to cover the second end of the outer housing when the installation cap is connected to the second end of the outer housing; and/or a wall connected to and extending from the cover portion is a direction away from the outer housing, the wall configured to connect a support to suspend the outer housing downward into an installation site.

According to some variants, a method of assembling a light assembly can include: inserting an inner housing assembly into an open end of an outer housing having an outer housing axis. The inner housing assembly can be hermetically sealed and/or can comprise a light cartridge configured to direct light through a lens of the inner housing assembly. In some embodiments, the method includes tilting the light cartridge with respect to the outer housing axis without moving the hollow inner housing body of the inner housing assembly and/or without breaking the hermetic seal of the inner housing assembly In some embodiments, the method includes rotating the inner housing assembly about the outer housing assembly with respect to the outer housing after inserting the inner housing assembly through the open end of the outer housing and/or without breaking the hermetic seal of the inner housing assembly.

In some embodiments, the method includes manually actuating a user input portion of a tilt assembly within the inner housing assembly to tilt the light cartridge with respect to the inner housing assembly without breaking the hermetic seal of the inner housing assembly.

In some embodiments, the method includes removing the inner housing assembly from the outer housing and inserting a second inner housing assembly without breaking the hermetic seal of the inner housing assembly or a hermetic seal of the second inner housing assembly.

In some embodiments, the method includes connecting an installation cap to the open end of the outer housing, connecting the installation cap to a support structure, and/or suspending the outer housing downward into an installation site.

According to some variants, a method of assembling a light fixture includes inserting a light cartridge through an open end of a light fixture housing along a linear installation path to a connected position. In some embodiments, the method includes rotating a light cartridge collar about the installation path with respect to both the light cartridge and the light fixture housing after inserting the light cartridge through the open end of the light fixture housing from an unlocked position to an unlocked position. In some embodiments, rotation of the collar from the unlocked position to the locked position inhibits removal of the light cartridge from the light fixture housing along the installation path.

In some embodiments, the method includes rotating a handle connected to the collar about an axis of rotation non-parallel to the installation path.

In some embodiments, the method includes aligning an alignment structure of the light cartridge with an alignment structure of the light fixture housing. In some embodiments, alignment of the alignment structures of the light cartridge and light fixture housing prevents rotation of the light cartridge with respect to the light fixture housing as the light cartridge is inserted through open end of the light fixture to the connected position.

In some embodiments, movement of the light cartridge to the connected position electrically connects the light cartridge to the light fixture housing.

In some embodiments, the method includes connecting a light cover to the open end of the light fixture housing to seal the open end of the light fixture housing in a liquid-tight manner. In some embodiments, the light cover comprises a lens through which light from the light cartridge is configured to shine.

In some embodiments, the method includes removing a first driver from the cartridge and connecting a second driver to the cartridge. In some embodiments, the second driver is larger or smaller than the first cartridge in at least one dimension.

In some embodiments, the light cartridge is inhibited from full insertion into the light fixture housing when the collar is not in the unlocked position as the light cartridge is inserted through the open end of the light fixture housing.

According to some variants, a light assembly can include an outer housing. The outer housing can have: a first end; a second end opposite the first end; and/or an outer housing axis extending through the first and second ends of the outer housing. In some embodiments the light assembly includes an inner housing assembly. The inner housing assembly can include a first end; a second end; and/or a hollow inner housing body extending between the first and second ends of the inner housing. In some embodiments, the light assembly includes a light cartridge positioned within the inner housing body and having a lighting element configured to emit light through the second end of the inner housing assembly. In some embodiments, the light assembly includes a lens assembly connected to the second end of the inner housing assembly and configured to hermetically seal the second end of the inner housing. In some embodiments, the light assembly includes a tilt assembly connected to the inner housing body and having a user input portion configured to receive user input. The tilt assembly can be configured to tilt the light cartridge between a first tilt position and a second tilt position with respect to the outer housing axis upon receipt of user input. In some embodiments, the tilt assembly is configured to tilt the light cartridge between the first and second tilt positions without breaking the hermetic seal of the second end of the inner housing

BRIEF DESCRIPTION OF THE DRAWINGS

The present disclosure is described with reference to the accompanying drawings, in which like reference characters reference like elements, and wherein.

DETAILED DESCRIPTION

Outdoor light fixtures are often exposed to environmental hazards such as moisture, temperature variants, dirt, wind, sunlight, and other hazards. Additionally, like many electrical devices, light fixtures often require routine and non-routine maintenance for a variety of reasons. For example, light engines, light bulbs, circuits, wiring, and other components of light fixtures may have limited service lives and may require replacement and/or repair. In some cases, one or more components of the light fixture may be consumable, while all or most of the remaining components are designed for long-term installation and use.

Repair and replacement of components in a light fixture, especially an outdoor light fixture, can be costly, as the maintenance services can require specially-trained technicians and may require complete or substantially complete replacement of the entire fixture. As such, it is desirable that the repair of light fixtures be simplified to both reduce the cost of repair and to expedite the process of repairing fixtures.

Figure 1:
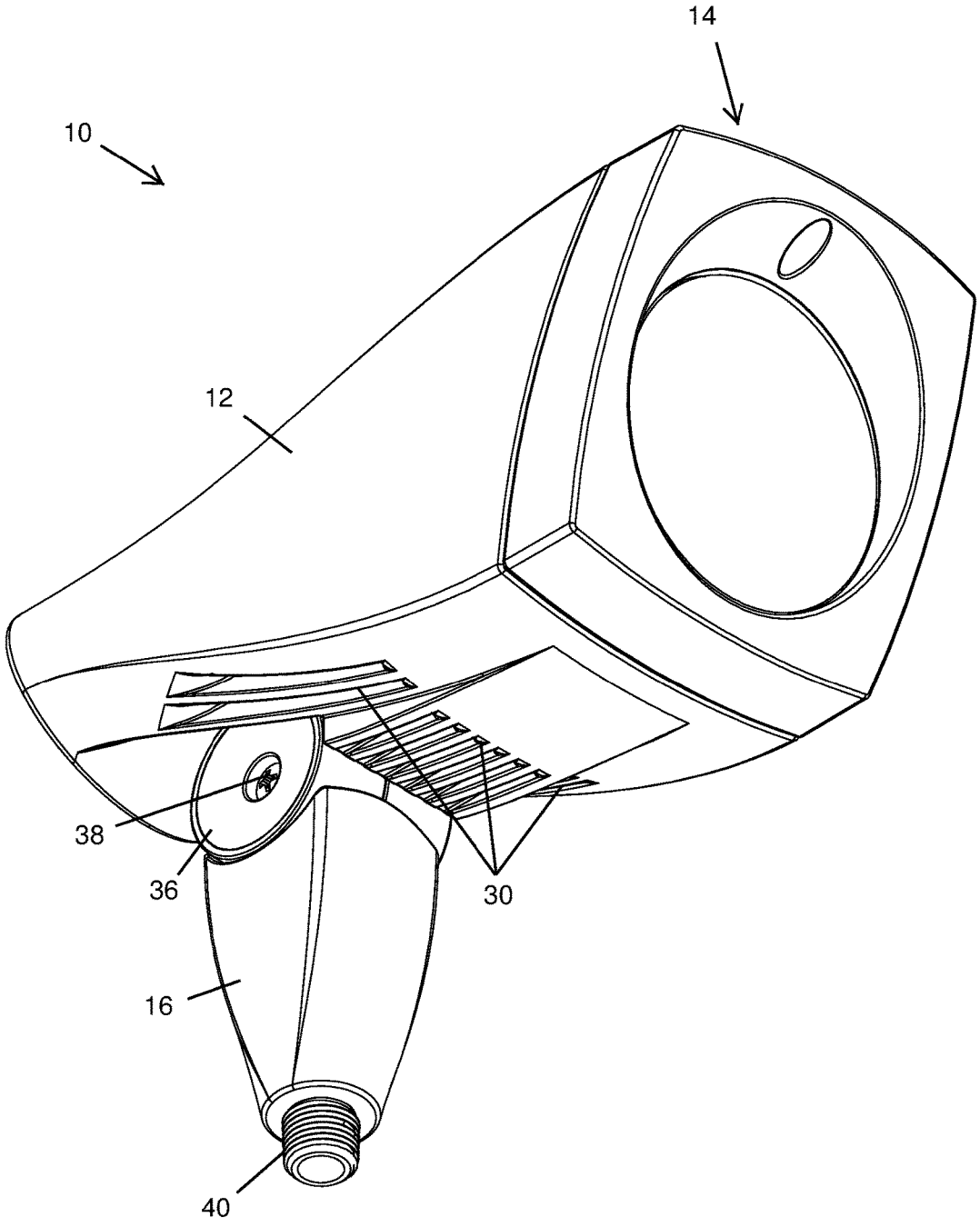
FIG. 1 illustrates a bottom perspective view of an embodiment of a light fixture.
Figure 2:
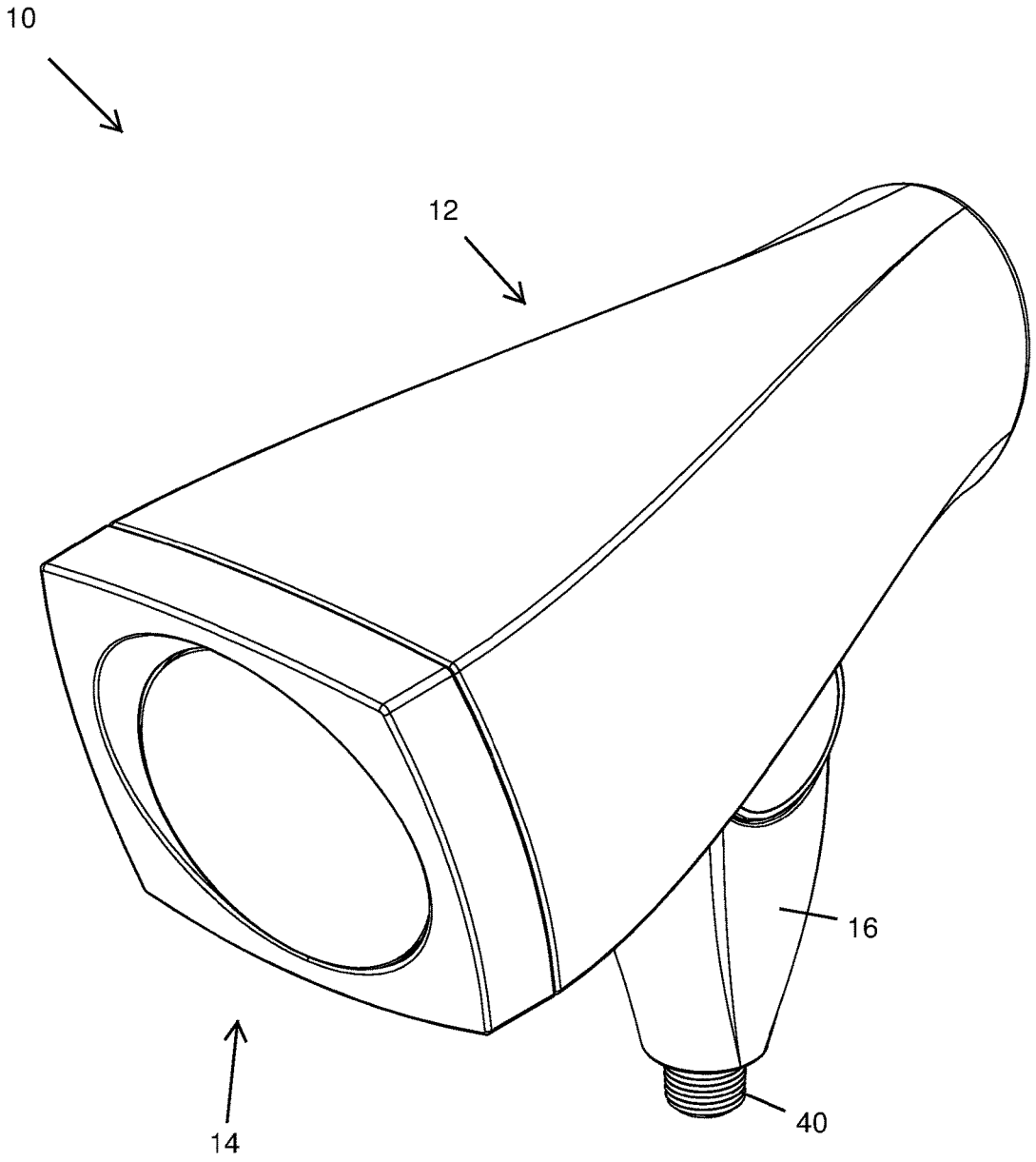
FIG. 2 illustrates a top perspective view of the light fixture of FIG. 1.

FIGS. 1 and 2 of the present disclosure illustrates an embodiment of a light fixture 10 (e.g., an outdoor light fixture) that can be configured to permit easy and simple repair and replacement of many of the components of the fixture 10. It will be understood that, though embodiments and components discussed herein are discussed in the context of outdoor lighting, many or all of the embodiments discussed herein can be also be used in an indoor environment.

As illustrated, the light fixture 10 can include a housing 12. In some embodiments, the fixture 10 includes a light cover 14. The light cover 14 can be configured to sealingly couple with the housing 12. In some embodiments, the fixture 10 can include a mount 16 configured to facilitate installation of the fixture 12 at an installation site (not shown) (e.g., an electrical box, a lighting base, or some other installation site). In some embodiments (see, e.g., FIG. 2A) the light fixture includes one or more cartridges 18 configured to be inserted and removed from the fixture housing.

Light Fixture Mount

Figure 3:
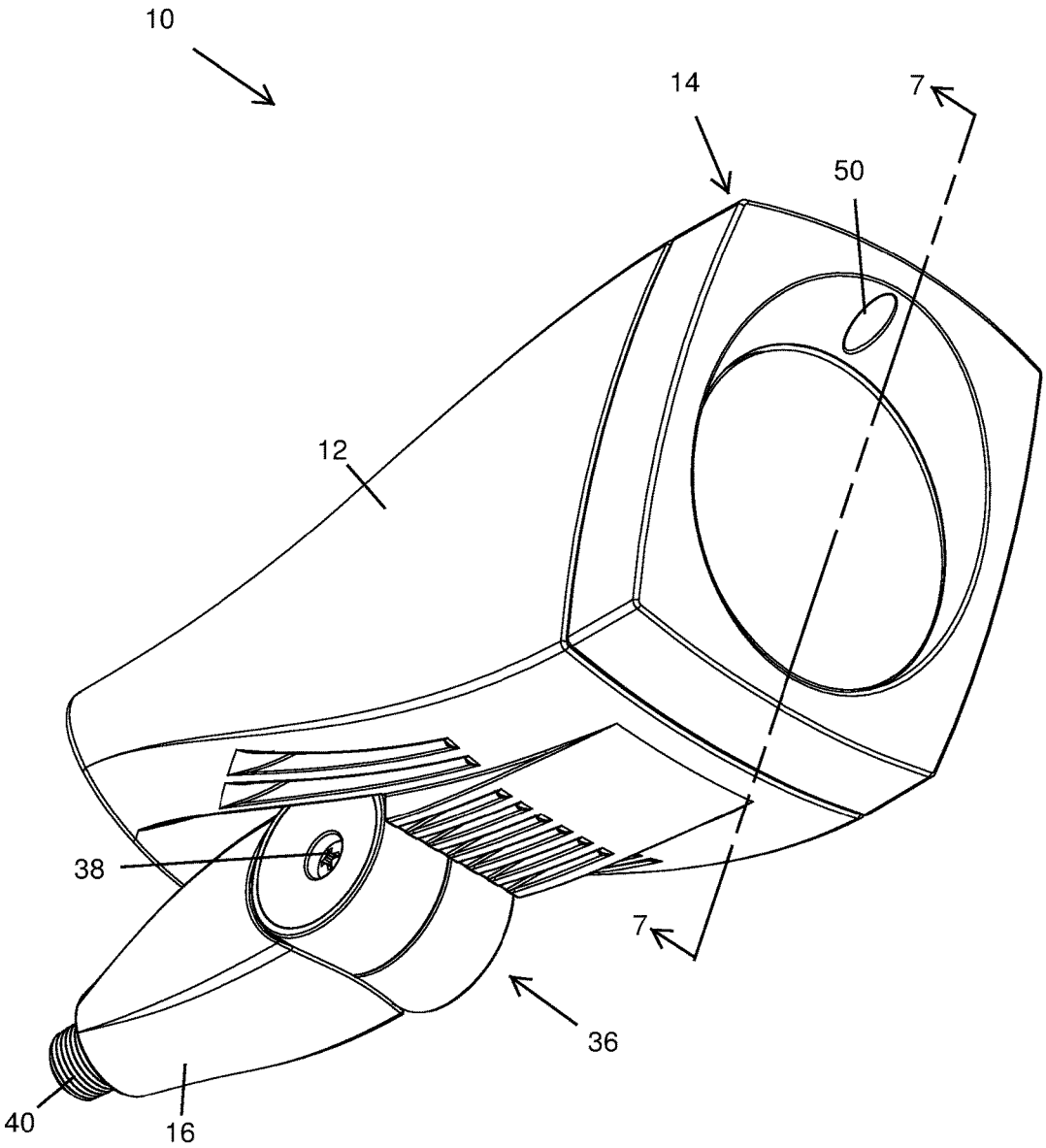
FIG. 3 illustrates another bottom perspective view of the light fixture of FIG. 1, wherein the mount is rotated to a second position.

As illustrated in FIGS. 1-3, in some embodiments, the mount 16 is rotatably or otherwise adjustably connected to the housing 12. For example, the mount can be connected to the housing 12 via a mount connection 36 such as a hinge, a ball joint, a telescoping connection, or some other adjustable connection or combination of connections.

In the illustrated embodiment, the mount 16 is connected to the housing 12 via a hinge 36 configured to rotate about a single axis of rotation. Rotation of the housing 12 about the hinge 36 can facilitate use of the fixture 10 in a variety of settings and applications. For example, the fixture 10 can be used as an "up light" when the housing 12 is rotated such that light is directed upward. Rotation of the housing 12 downward can facilitate use of the fixture 10 to illuminate the ground, low-lying landscaping, or other features positioned closed to the ground.

In some embodiments, the mount connection 36 (e.g., hinge) has a wide range of rotation. For example, the mount connection 36 may be configured to permit a range of rotation between the mount 16 and the housing 12 of at least about 20°, at least about 20°, at least about 45°, at least about 55°, at least about 70°, at least about 80°, at least about 90°, and/or at least about 100°.

The mount connection 36 can include a feature configured to permit locking and/or unlocking the mount connection 36. For example, as illustrated, the hinge 36 can include a tightening screw 38. The hinge 36 can be configured to lock (e.g., lock the mount 16 in a given angular orientation with respect to the fixture housing 12) when the screw 38 is tightened. In some embodiments, loosening of the screw 38 can permit unlocking of the hinge 36, permitting adjustment of the angular orientation of the fixture housing 12 with respect to the mount 16. In some embodiments, the hinge 36 may include a mechanical clamp that does not require a screw.

In some embodiments, the mount 16 can include an attachment structure 40 configured to connect with a corresponding attachment structure (not shown) at an installation site. For example, as illustrated, the mount 16 can include a threaded connector 40 (e.g., a male or female threaded connector) configured to connect to a female or male threaded connector at the installation site. In some embodiments, the attachment structure 40 includes one or more of a detent connection structure, a friction-fit connection structure, a snap fit, or other releasable connection structure.

Figure 5:
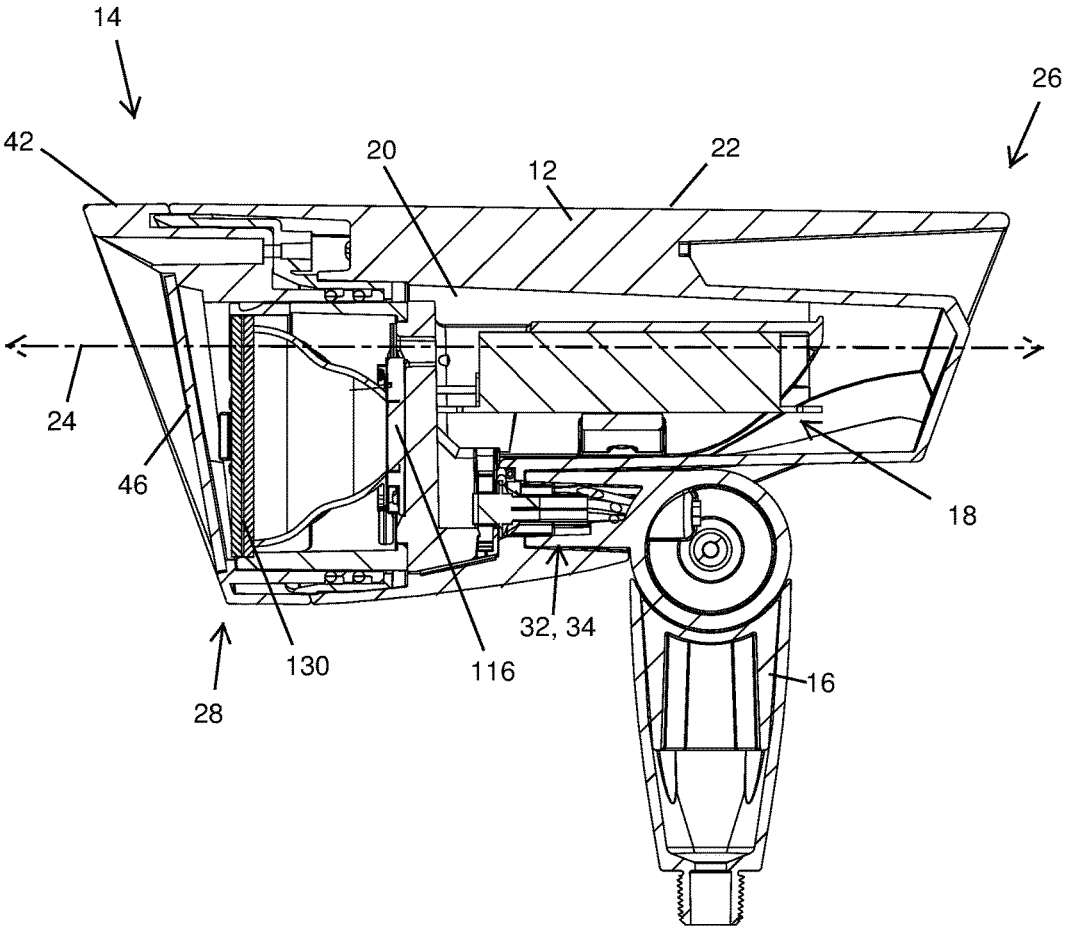
FIG. 5 illustrates a side cross-sectional view of the light fixture of FIG. 1 along the cut-plane 5-5 of FIG. 4.

In some embodiments, as illustrated in FIG. 5, the mount 16 is at least partially hollow. One or more wires or other electrical components (not shown) can extend through the mount 16. For example, electrical wires for power and/or controlling the light fixture 10 can extend through the mount 16. The wires can be directed to a source of power and/or controls. In some embodiments, potting material, gasket(s), and/or other sealing materials or structures (not shown) are used to reduce or eliminate the possibility of moisture ingress into the fixture 10 via the mount 16.

In some embodiments, the mount 16 is not hollow. In some applications, power is provided to the fixture 10 via a battery and/or wireless power. In some embodiments, control signals are provided to the fixture 10 via wired and/or wireless signals.

Fixture Housing

Referring to FIG. 1, in some embodiments, the fixture housing 12 has one or more surface features on the outer surface of the fixture housing. For example, the fixture housing 12 can include one or more heat dissipating structures 30 (e.g., heat sinks) such as ribs, ridges, indentations, flanges, bumps, protrusions and/or other structures configured to conductively and/or convectively dissipate heat from the fixture housing 12. The heat dissipating structure 30 can comprise indentations forming ribs or otherwise thinned structures.

Figure 4:
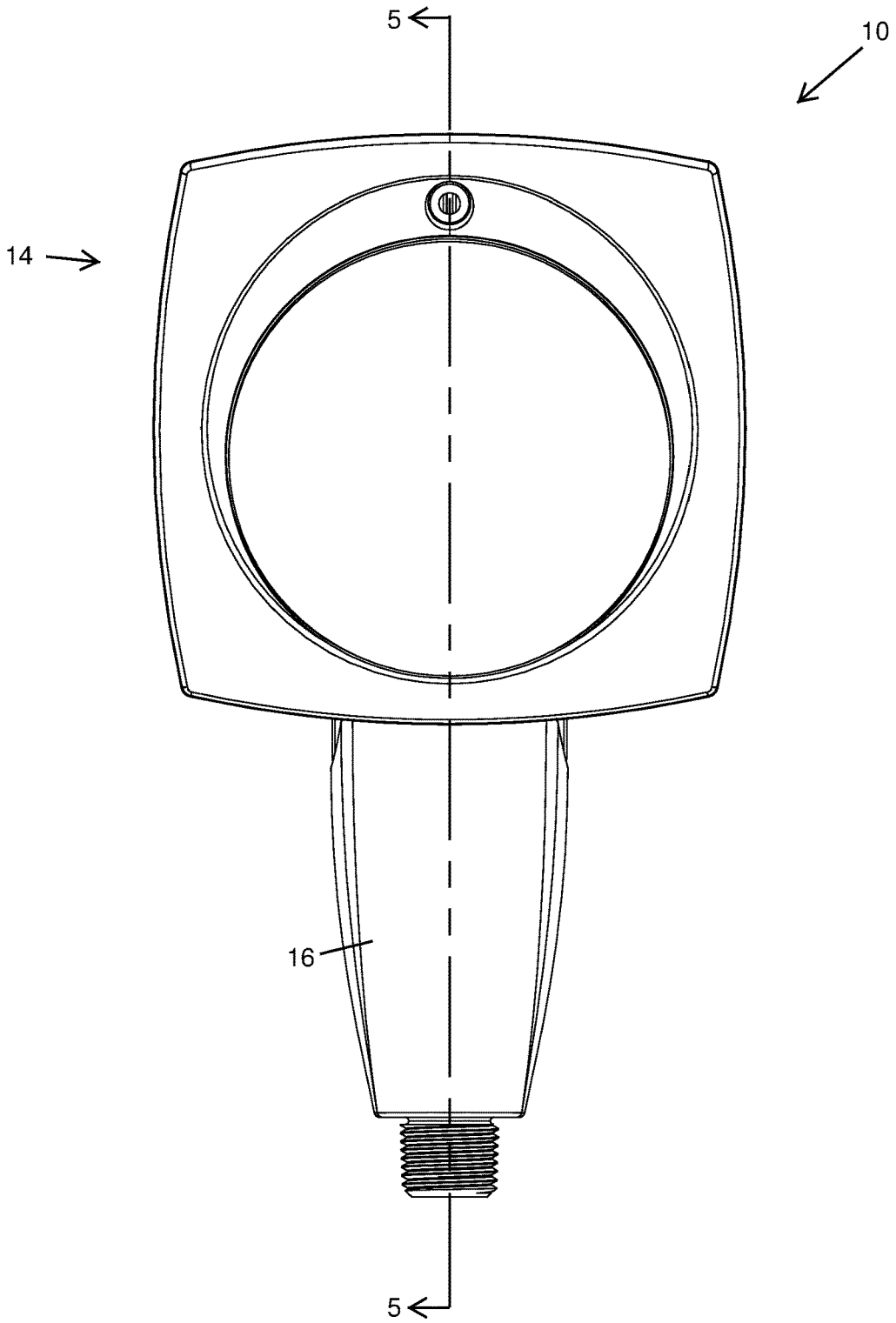
FIG. 4 illustrates a front view of the light fixture of FIG. 1.

As illustrated in FIGS. 4 and 5, the fixture housing 12 can define a fixture housing interior 20 and a fixture housing exterior 22. The fixture housing 12 can have a fixture housing axis 24 (e.g., a longitudinal axis and/or axial centerline). The fixture housing axis 24 can extend through a first or closed end 26 (e.g., back end) and a second or open end 28 (e.g., front end) of the fixture housing 12. The fixture housing axis can pass through the light cover 14 when the light cover 14 is coupled with the fixture housing 12.

The fixture housing interior 20 can include one or more electrical connectors 32 configured to mate with complementary electrical connectors 34 on the cartridge 18. For example, the fixture housing 12 can include one or more female and/or male plugs sized and shaped to releasably mate with complementary male and/or female plugs on the cartridge 18.

Light Cover

In some embodiments, the light cover 14 can be removably connected to the housing 12. In some configurations, the light cover 14 is connected to the housing 12 via a hinge or other permanent or semi-permanent connection structure. The light cover 14 can be configured to transition between an opened position (e.g., providing access to an interior of the housing 12) and a closed position (e.g., closing off access to an interior of the housing 12). In some embodiments, the light cover 14 is configured to connect to a front, back, or lateral side of the light housing 12.

Referring to FIG. 5, the light cover 14 can include a frame 42. In some embodiments, a lens 46 is connected to the frame. For example, a lens 46 can be releasably or fixedly attached to the frame 42. Preferably, the lens 46 is attached to the frame in a fluid-tight or liquid-tight manner. For example, the lens 46 can be attached to the frame 42 using adhesives (e.g., silicone adhesive bonds). In some embodiments, the lens 46 is attached to a side of the frame 42 closer to the fixture housing 12 (e.g., on an inner side of the frame 42). In some embodiments, the lens 46 is attached to a side of the frame 42 further from the fixture housing 12 (e.g., on an outer side of the frame 42). The lens 46 can be configured to remain in place as the light cover 14 transitions between the opened and closed positions. In some embodiments, the lens 46 is configured to move with the light cover 14 (e.g., with the frame 42) as the light cover 14 moves between the opened and closed positions.

In some embodiments, the lens 46 is constructed from glass. In some cases, the lens 46 is constructed from a polymer. The lens 46 can be transparent or translucent. The lens 46 can be planar or can have one or more concave or convex portions. In some embodiments, the light cover 14 includes one or more diffusers in front of (e.g., outside of the fixture 10 with respect to the lens 46) and/or behind (e.g., inside the fixture 10 with respect to the lens 46) the lens 46.

Figure 6:
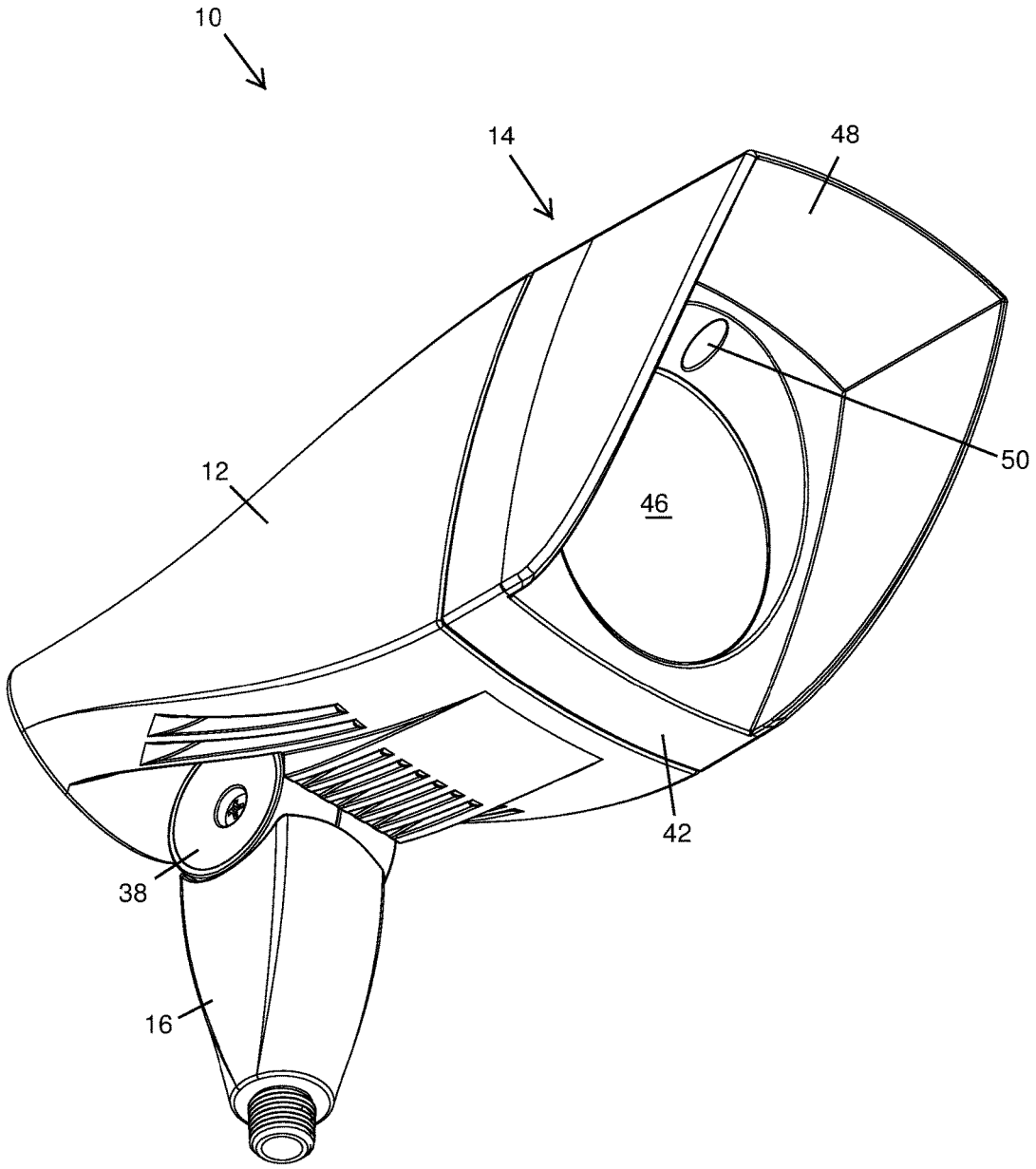
FIG. 6 illustrates another bottom perspective view of the light fixture of FIG. 1 having a shroud.

Comparing FIGS. 1 and 6, the light cover 14 may or may not include a shroud portion 48. Many different shroud configurations may be used for the light cover 14. In some cases, a shroud 48 is formed (e.g., injection molded or otherwise formed) as an integral part of the light cover 14. In some embodiments, the shroud 48 is formed as a separate part connected to the frame 42 of the light cover 14 during assembly. In some cases, the shroud 48 is removably attached to the frame 42. In some such embodiments, the shroud configuration for a given light cover 14 can be modified before, during, and/or after installation of the light fixture 10 to suit the requirements of the given installation.

Figure 7:
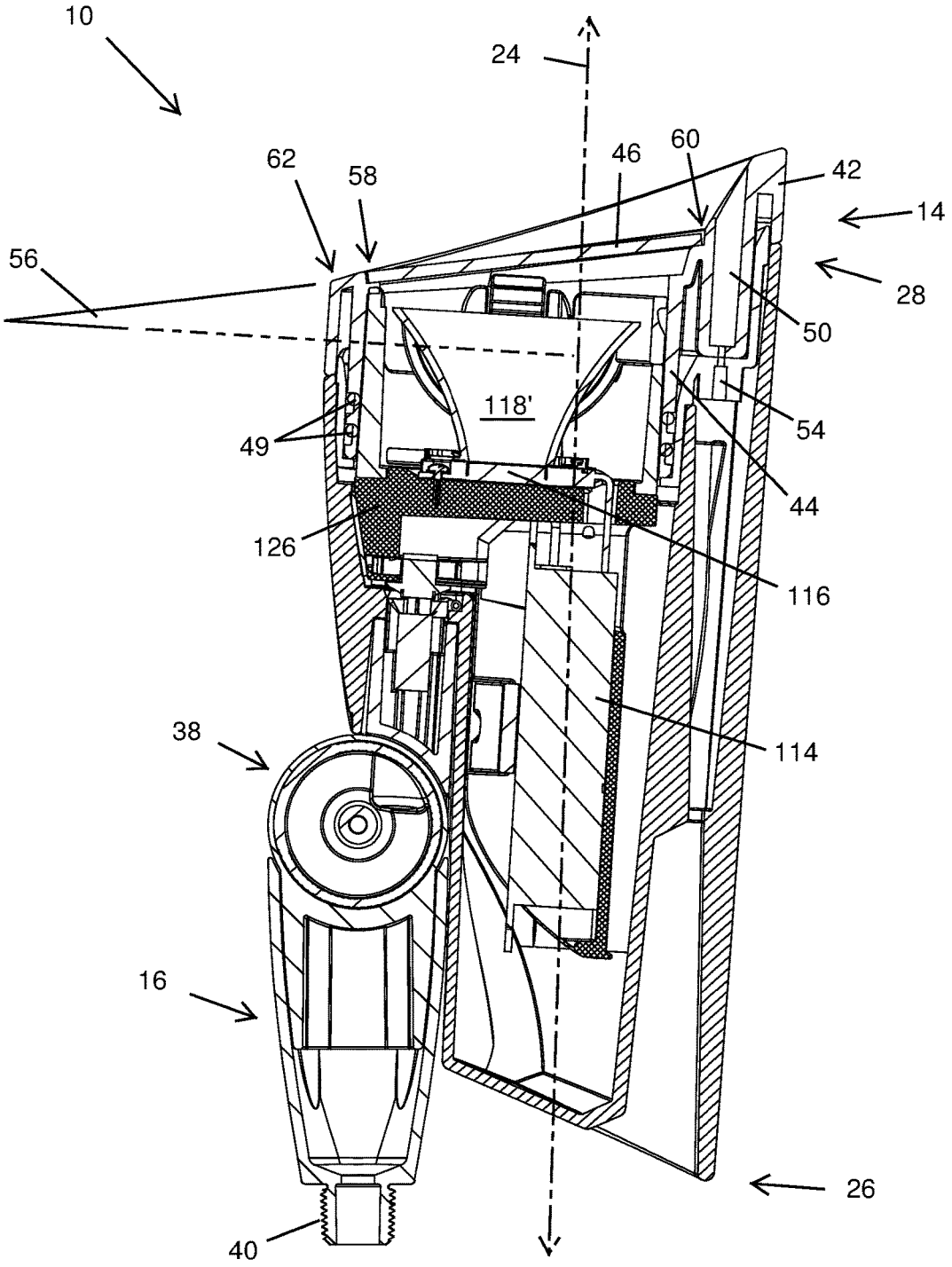
FIG. 7 illustrates a side cross-sectional view of the light fixture of FIG. 1 along the cut-plane 7-7 of FIG. 3.
Figure 8:
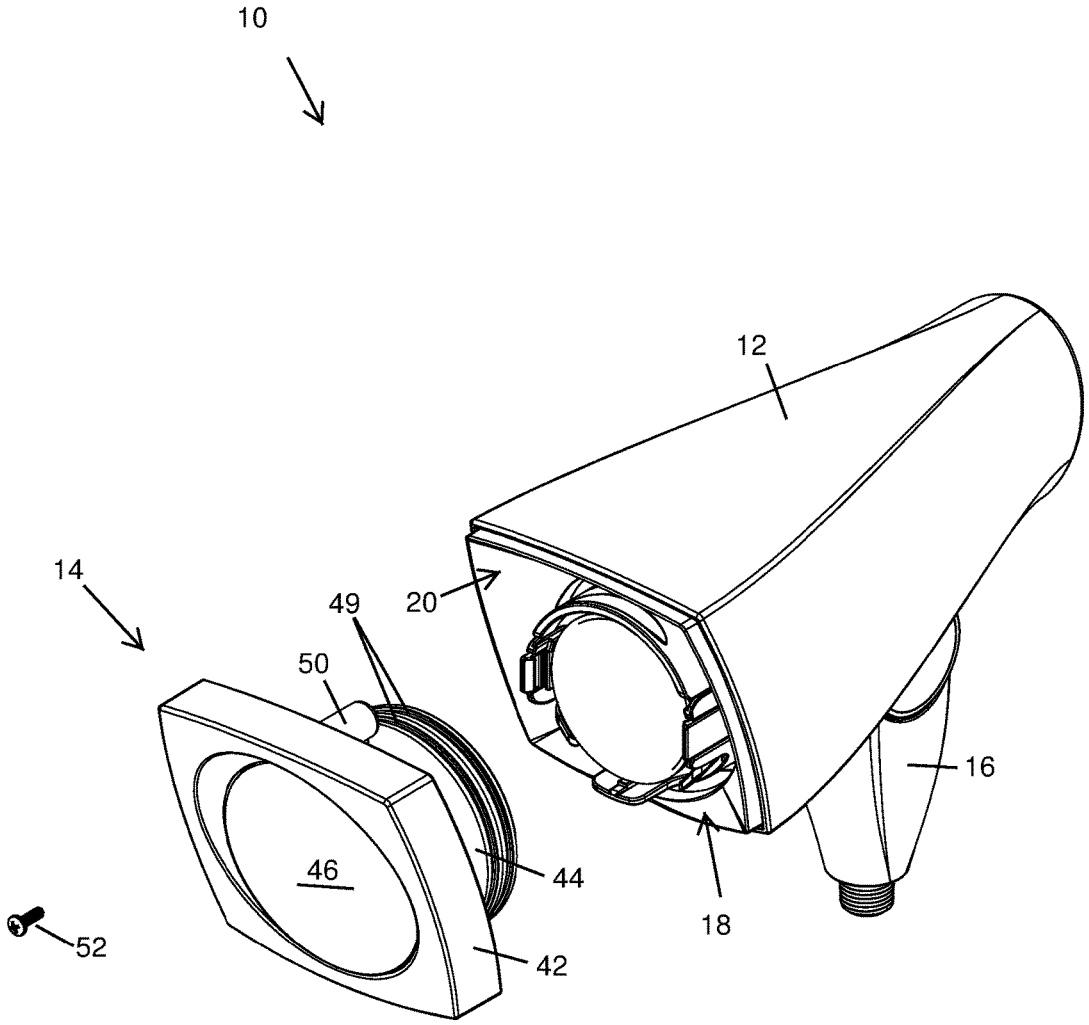
FIG. 8 illustrates an exploded view of the light fixture of FIG. 1, wherein the light cover is removed.

In some embodiments, as illustrated in FIGS. 7 and 8, the frame 42 of the light cover 14 can include a mating portion 44. The mating portion 44 can extend away from the lens 46 in a direction toward the first end 26 of the fixture housing 12 when the light cover 14 is mated with the fixture housing 12. The mating portion 44 can extend into or around the fixture housing 12 when the light cover 14 is coupled with the fixture housing 12. The mating portion 44 can be connected to the fixture housing 12 in a water-tight or fluid-tight manner. For example, in some embodiments, the mating portion 44 includes one or more seals 49. The seals 49 can be, for example, O-rings, gaskets, and/or other sealing features. In some embodiments, the seals 49 comprise one or more O-rings configured to inhibit or prevent ingress of moisture, dirt, and/or other environmental hazards into the fixture housing 12 when the light cover 14 is coupled with the fixture housing 12. The O-rings 49 can be positioned in one or more grooves or recesses on an inner or outer surface of the mating portion 44 of the light cover 14. In some embodiments, the O-rings 49 are positioned in grooves on the interior or exterior of the fixture housing 12 between the mating portion and the fixture housing 12. In some embodiments, multiple successive seals 49 are used to provide redundant leak resistance in the event of failure of one or more seals 49. For example, as illustrated in FIG. 7, the fixture 10 can include two seals 49 between the mating portion 44 of the light cover 14 and the fixture housing 12.

The light cover 14 can be configured for easy and fast installation and/or removal from the fixture housing 12. For example, as illustrated in FIGS. 6-8, the light cover 14 can include one or more access holes 50 through which a fastener 52 may be inserted. In some embodiments, the light cover 14 includes a single access hole 50. In some such embodiments, the light cover 14 can be securely coupled with the fixture housing 12 via alignment of the access hole 50 of the cover with a fastener hole 54 in the fixture housing 12, coupling of the mating portion 44 of the light cover 14 with the interior or exterior of the fixture housing 12, and insertion and tightening of a fastener 52 through the access hole 50 and into the fastener hole 54 of the fixture housing 12. Removal of the light cover 14 from the fixture housing 12 may be accomplished via loosening and/or removing the fastener 52 from the access hole 50 and fixture hole 54 and decoupling of the mating portion 44 of the light cover 14 from the fixture housing 12. In some embodiments, the mating portion 44 or some other portion of the light cover 14 may include a keyed feature configured to couple with the fixture housing 12 in only a finite number of orientations to facilitate easy alignment of the access hole 50 with the fastener hole 54. In some embodiments, the light cover 14 is coupled with the fixture housing 12 without use of fasteners. In some such cases, clips, detents, or other releasable mating structures can be used to couple the light cover 14 with the fixture housing 12. In some embodiments, both the light cover 14 and fixture housing 12 include complementary threaded portions configured to threadedly engage with each other.

In some embodiments, the light cover 14 is configured to inhibit or prevent accumulation of water, dirt, or other substances on the exterior of the lens 46 (e.g., the side of the lens 46 facing away from the interior 20 of the fixture housing 12 when the light cover 14 is coupled with the fixture housing 12) and/or elsewhere on the light cover 14. For example, the frame of the light cover 14 can align the lens at a non-perpendicular offset angle 56 with respect to the axis 24 of the fixture housing 12 (e.g., a longitudinal axis of the fixture housing 12). In some embodiments, the offset angle 56 of the lens with respect to perpendicular of the fixture housing axis 24 is between about 5° and 10°, between about 3° and 15°, between about 7° and 12°, and/or between about 11° and about 20°. In some embodiments, the offset angle 56 of the lens is greater than 20°.

The lens 46 can be oriented such that a first end 58 of the lens 46 is positioned further rearward (e.g., closer to the fixture housing 12) than a second, opposite end 60 of the lens 46 when the light cover 14 is coupled to the fixture housing 12. As can be seen in FIG. 7, the end of the lens 46 closest to the mount 16 (e.g., the first end 58 of the lens 46) is positioned further back than the end of the lens 46 furthest from the mount 16 (e.g., the second end 60 of the lens 46) when the light cover 14 is coupled with the fixture housing 12. In some embodiments, the first end 58 of the lens 46 is visible from a viewpoint perpendicular to the fixture housing axis 24 at a same position along the fixture housing axis 24. For example, a first portion 62 of the frame 42 of the light cover 14 at and/or near the first end 58 of the lens 46 can be positioned entirely at the same position along the fixture housing axis 24 with respect to the lens 46 and/or closer to the mount 16 with respect to the lens 46. In some such configurations, water or other substances which contact the lens 46 can flow, roll, or otherwise move off the lens 46 under the influence of gravity. In some embodiments, as illustrated in FIG. 7, the orientation of the lens 46 can permit gravity-induced run off of substances when the fixture housing axis 24 is within ±about 10° of vertical.

Cartridge

Figure 9:
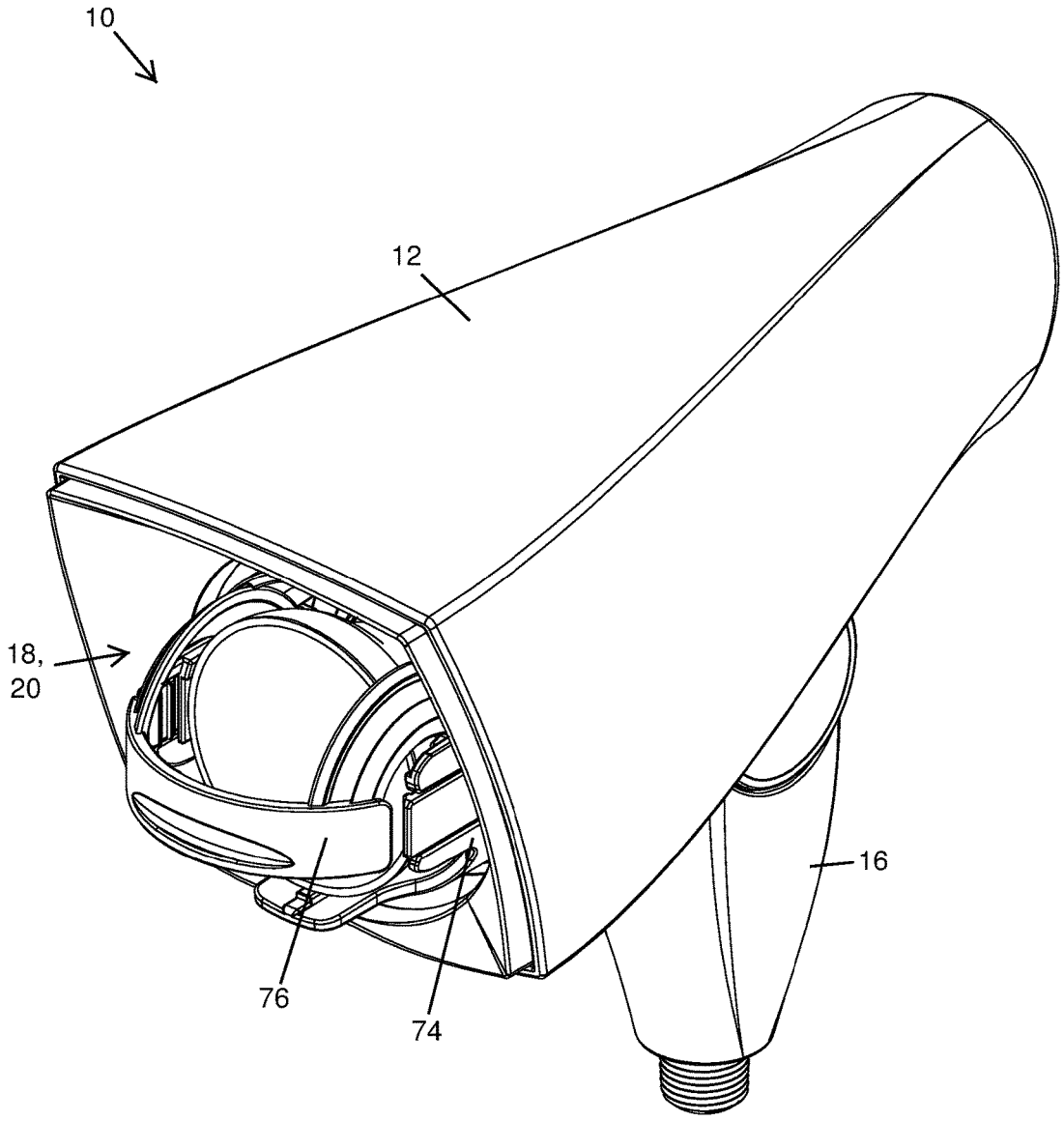
FIG. 9 illustrates a top perspective view of the light fixture of FIG. 1, wherein a handle of a light cartridge is in a down position.
Figure 10:
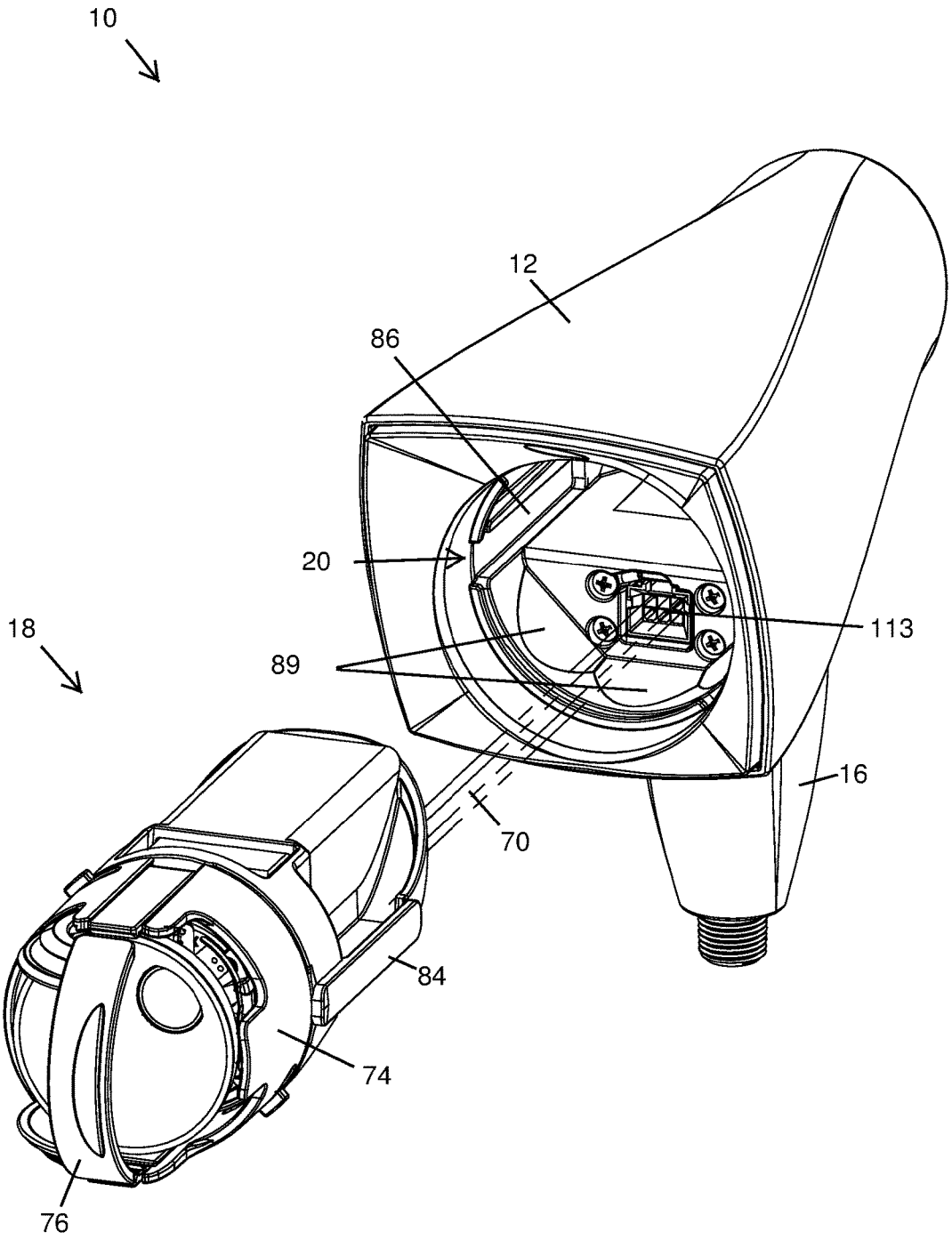
FIG. 10 illustrates a front perspective exploded view of the light fixture of FIG. 1, wherein the cartridge is removed from the light housing.
Figure 11:
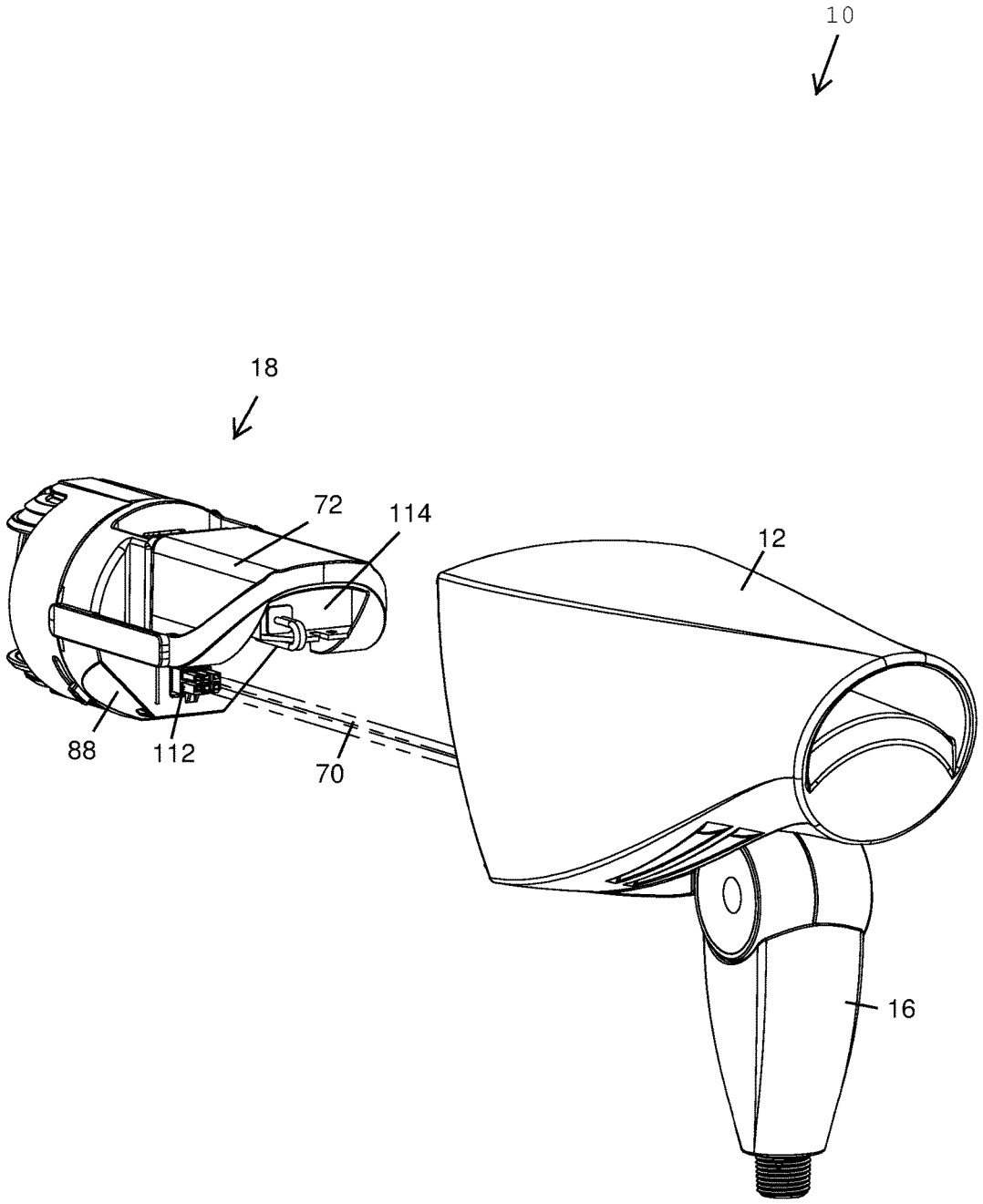
FIG. 11 illustrates a rear perspective exploded view of the light fixture of FIG. 1, wherein the cartridge is removed from the light housing.

Moving to FIGS. 9-11, the light fixture 10 can include a cartridge 18. The cartridge 18 can be configured to removably connect to the light housing 12. The cartridge 18 can include numerous structural features and components configured to house, maintain, or otherwise integrate with one or more electrical/lighting features and components. The cartridge 18 can be configured to facilitate removal, repair, installation, and/or other customization of the lighting features connected to the cartridge 18. For example, unlike standard "smart" light bulbs, the cartridge 18 can be configured such that one or more light engines, controllers, plugs, sensors, and/or other components may be replaced and/or swapped with other components.

One or more of the structural features of the cartridge 18 can be configured to releasably mate with one or more features of the fixture housing 12 and/or with one or more features of the light cover 14. The structural features of the cartridge 18 can be configured to facilitate quick and easy installation and removal of the cartridge 18 to and from the housing 12. For example, the cartridge 18 can be configured to be removable from the housing 12 via a twist and pull movement without use of threading or other features common to other lighting structures. In some embodiments, one or more of the electrical/lighting features of the cartridge 18 are configured to releasably mate with one or more features of the fixture housing 12 and/or with one or more features of the light cover 14. In some embodiments, the installation of the cartridge 18 to the fixture housing 12 connects an electrical grounding path.

Cartridge Structural and Mechanical Connection Features

Figure 12:
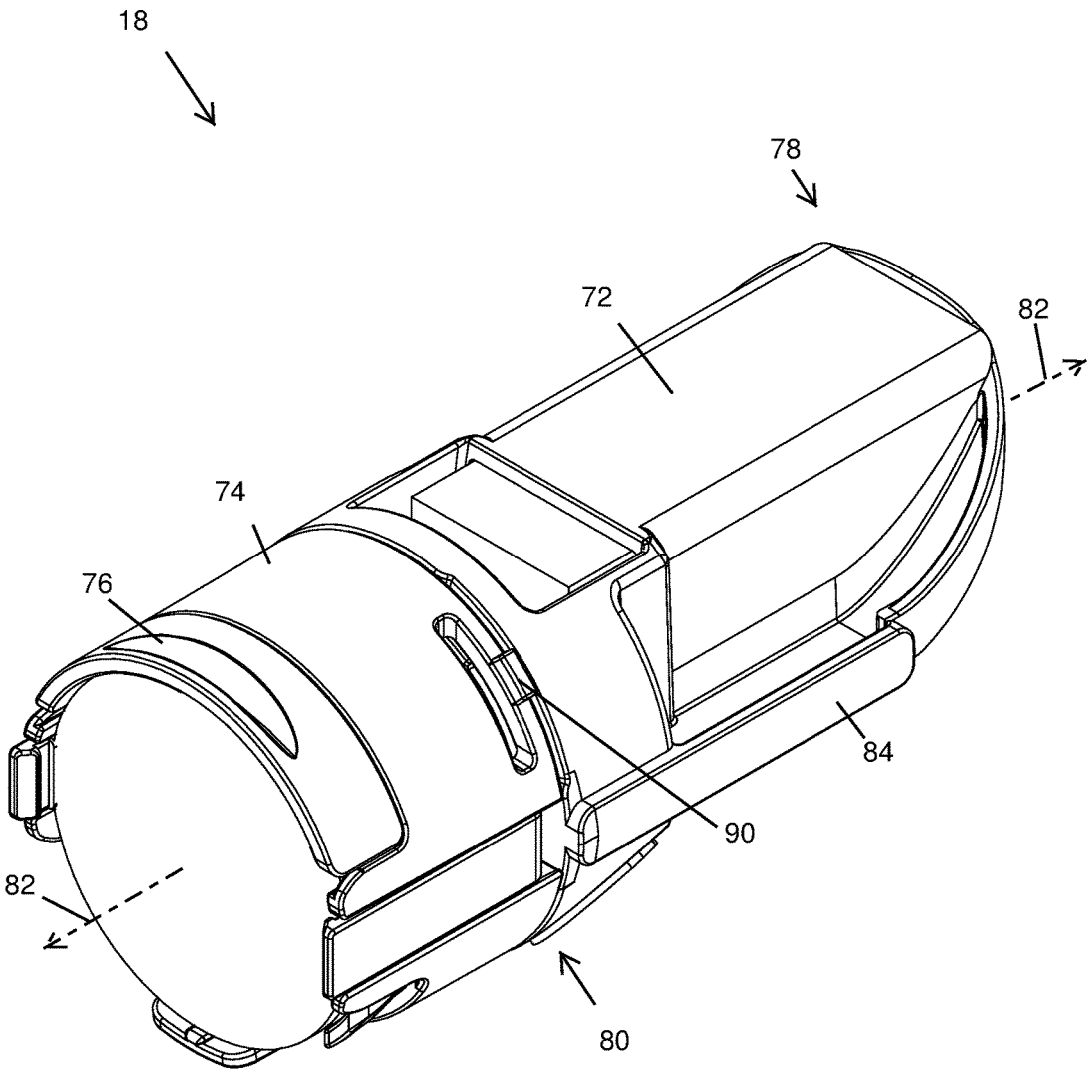
FIG. 12 is a front top perspective view of an embodiment of a light cartridge.
Figure 13:
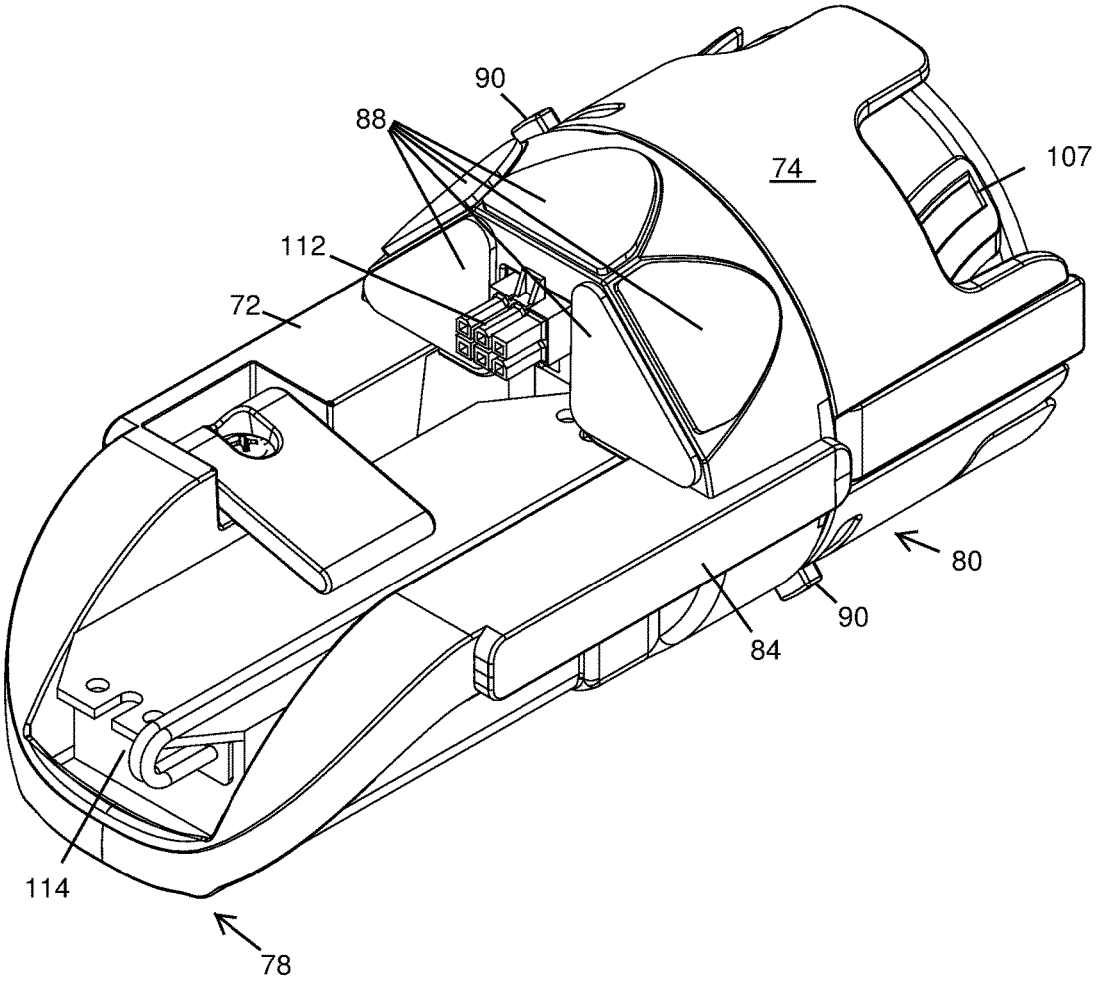
FIG. 13 is a both rear perspective view of the cartridge of FIG. 12.

Moving to FIGS. 12 and 13, the structural features of the cartridge 18 can include a cartridge housing 72. In some embodiments, the structural features can include a collar 74 connected to the cartridge housing 72. The collar 74 can be configured to releasably connect with one or more features of the fixture housing 12 when the cartridge 18 is coupled with the fixture housing 12. For example, the collar 74 can include features configured to releasably connect to one or more features of the light housing 12 to inhibit or prevent accidental or inadvertent disconnection between the cartridge 18 and the light housing 12. In some embodiments, the collar 74 includes one or more alignment features configured to facilitate alignment of the cartridge 18 with respect to the housing 12 before and/or during installation and/or removal of the cartridge 18 with respect to the housing 12.

In some embodiments, the cartridge 18 includes one or more structural features configured to facilitate manipulation of the collar 74. For example, the cartridge 18 can include a handle 76 connected to the collar 74. The handle 76 can be configured to facilitate rotation of the collar 74 about the cartridge housing 72. In some embodiments, the handle 76 is configured to facilitate manual gripping of the cartridge 18 during installation and/or during removal of the cartridge 18 from the housing 12.

The cartridge housing 72 can have a first end 78 (e.g., a back end or an end directed toward the fixture housing 12 during coupling/decoupling of the cartridge 18 with or from the fixture housing 12) and a second end 80 (e.g., a front end or an end directed away from the fixture housing 12 during coupling/decoupling of the cartridge 18 with or from the fixture housing 12). The cartridge 18 can include a cartridge axis 82 (e.g., a longitudinal and/or central axis). The cartridge axis 82 can pass through the first and second ends 78, 80 of the cartridge 18. In some embodiments, the cartridge axis 82 is parallel or substantially parallel to the fixture housing axis 24 when the cartridge 18 is coupled with the fixture housing 12. In some embodiments, the cartridge axis 82 is parallel to or substantially collinear with the fixture housing axis 24 when the cartridge 18 is coupled with the fixture housing 12. In some embodiments, the cartridge axis 82 and fixture housing axis 24 are not parallel to each other when the cartridge 18 is coupled with the fixture housing 12. In some embodiments, the cartridge housing 72 includes one or more seals (e.g., O-rings, gaskets, or other seals) configured to sealingly engage with one or more of the fixture housing 12 and the light cover 14.

As illustrated in FIG. 12, the cartridge housing 72 can include an alignment structure 84. The alignment structure 84 can be configured to facilitate proper alignment between the cartridge 18 and the fixture housing 12 during coupling and/or decoupling of the cartridge 18 with or from the fixture housing 12. Proper alignment during coupling and/or decoupling of the cartridge 18 with or from the fixture housing 12 can reduce the risk of damage to the cartridge 18 and/or to the fixture housing 12 due to improper alignment.

The alignment structure 84 can comprise, for example, one or more ridges (e.g., rails) configured to fit into one or more channels 86 (FIG. 10) or indentations in fixture housing 12 when the cartridge 18 is coupled with the fixture housing 12. In some embodiments, the alignment structure 84 comprises a channel configured to receive a protrusion or ridge of the fixture housing 12 when the cartridge 18 is coupled with the fixture housing 12. The alignment structures 84 of the cartridge can be arranged (e.g., about the cartridge axis 82) in a pattern which inhibits or prevent engagement of the cartridge alignment structures 84 with the complementary alignment structures 86 of the fixture housing 12 in more than one rotational orientation (e.g., about the cartridge axis 82 and/or about the fixture housing axis 24). In some embodiments, the alignment structures 84 of the cartridge 18 are arranged in a pattern which permits engagement of the alignment structures 84 of the cartridge 18 and fixture housing 12 in only a single rotational orientation. For example, a pair of alignment structures can be positioned on opposite sides of the cartridge. The cartridge can also be shaped so as to only fully advance into the fixture in the proper orientation (i.e. right side up). In some embodiments, the alignment structures 84 of the cartridge 18 can include one or more coupling features such as detents, snaps, or other features configured to releasably connect to complementary structures in or on the fixture housing 12.

In some embodiments, as illustrated in FIGS. 11 and 13, the cartridge housing 72 can include one or more pads 88. The pads 88 can be constructed from a conductive and/or compressible material. For example, the pads 88 can be constructed from a thermally conductive elastomer. The pads 88 can be positioned such that they are compressed as the cartridge 18 is moved into connection with the fixture housing 12. In some embodiments, the pads 88 are configured to conduct heat from the cartridge 18 to the fixture housing 12 during and/or after use of the light fixture 10. For example, the pads 88 can be thermally connected to the cartridge 18 and/or fixture housing 12 when the cartridge 18 is installed in the housing 12. In some cases, thermal grease, conductive filler, or other materials can be used instead of or in addition to the pads 88 to facilitate thermal conduction between the cartridge 18 and the fixture housing 12.

In some embodiments, as illustrated in FIG. 10, the fixture housing 12 includes one or more pads 89 configured to contact the cartridge 18 (e.g., the cartridge housing 72) when the cartridge 18 is coupled with the fixture housing 12. The pads 89 can be constructed from a conductive and/or compressible material (e.g., a same or similar material as that from which the pads 88 of the cartridge housing 72 are constructed). For example, the pads 89 can be constructed from a conductive and compressible material and can conduct heat away from the cartridge 18 during operation of the lighting fixture 10. Compression of the pads 89 between the cartridge 18 and the fixture housing 72 can facilitate dissipation of heat from the cartridge 18 to the fixture housing 72 when the cartridge 18 is coupled with the fixture housing 72. In some embodiments, the one or more pads 89 of the fixture housing 72 contact and/or align with the one or more pads 88 of the cartridge housing 72 when the cartridge 18 is mated with the fixture housing 12. In some embodiments, the fixture housing 72 does not include pads, but includes surfaces sized and shaped substantially the same as the pads 89. In some embodiments, the cartridge 18 does not include pads, but includes surfaces 88a (FIG. 22) sized and shaped to interact with the pads 89.

Moving to FIGS. 12 and 13, the collar 74 can be connected to the cartridge housing 72 at or near the second end 80 of the cartridge housing 72. The collar 74 can be configured to rotate about the cartridge axis 82 with respect to the cartridge housing 72. In some embodiments, the collar 74 is fixed in a direction parallel to the cartridge axis 82 with respect to the cartridge housing 72. The collar 74 can be configured to releasably connect to one or more portions of the fixture housing 12 to facilitate coupling of the cartridge 18 with the fixture housing 12.

In some embodiments, the collar 74 is configured to rotate freely about the cartridge housing 72 in either direction of rotation about the cartridge housing axis 82. In some embodiments, the collar 74 is inhibited from rotating about the cartridge housing 72 outside of a predetermined range. For example, the collar 74 and/or cartridge housing 72 can include one or more structures (e.g., protrusions, tabs, and/or other structures) configured to limit the rotational range of the collar 74 with respect to the cartridge housing 72. In some embodiments, the rotational limits defining the predetermined range of rotation of the collar 74 comprise a first rotational position (e.g., an unlocked position) and a second rotational position (e.g., a locked position).

Referring to FIGS. 12 and 13, the collar 74 can include one or more coupling structures 90 configured to mate with complementary structure(s) on or in the fixture housing 12. For example, the collar 74 can include one or more tabs 90 or protrusions extending from an outer surface of the collar 74.

Figure 14A:
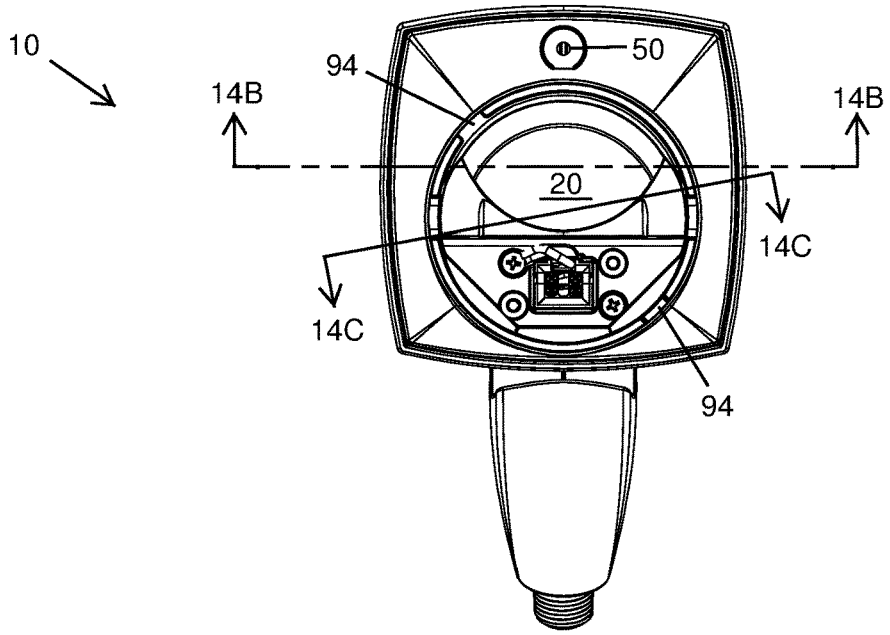
FIG. 14A is a front view of an embodiment of a light housing.
Figure 14B:
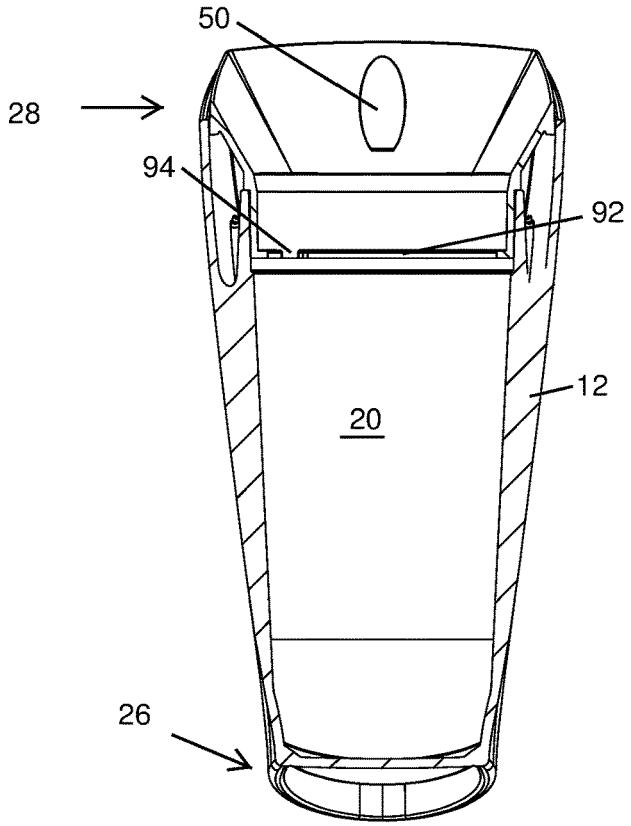
FIG. 14B is a bottom cross-section view of the light housing of FIG. 14A along the cut-plane 14B-14B of FIG. 14A.
Figure 14C:
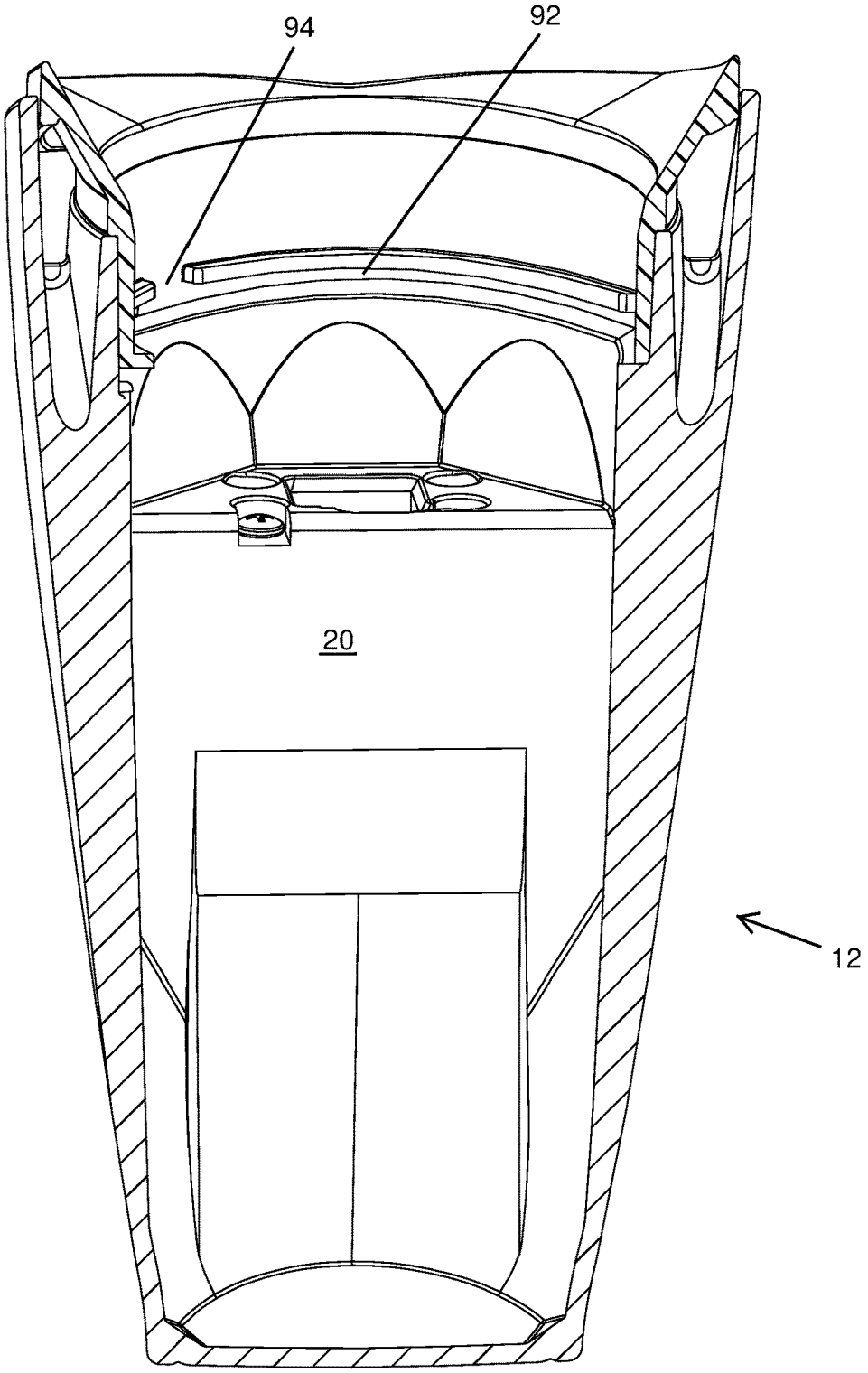
FIG. 14C is a tilted cross-section view of the light housing of FIG. 14A along the cut-plane 14C-14C of FIG. 14A.

The one or more protrusions 90 can be configured to engage and disengage with a coupling structure of the fixture housing 12 during coupling and decoupling of the cartridge 18 from the fixture housing 12. For example, as illustrated in FIGS. 14A and 14B, the fixture housing 12 can include a tab slot 92 configured to receive the tab 90 of the collar 74 when the collar 74 is in the unlocked position. The tab 90 and tab slot 92 can engage in a bayonet-type coupling wherein the tab 90 enters a tab opening 94 in the tab slot 92 as the cartridge 18 is moved into the fixture housing 12. The tab 90 can then be moved along the tab slot 92 as the collar 74 is rotated with respect to the fixture housing 12 (e.g., and rotated with respect to the cartridge housing 72, as illustrated, for example, in FIGS. 9 and 10) to the locked position. Interference between the tab and the wall of the tab slot can inhibit or prevent movement of the collar 74 in a direction parallel to the fixture housing axis 24 with respect to the fixture housing 12 when the tab 90 is rotated into the tab slot 92. In some embodiments, the tab slot 92 includes one or more stops configured to limit the range of movement of the tab 90 within the tab slot 92.

Figure 15A:
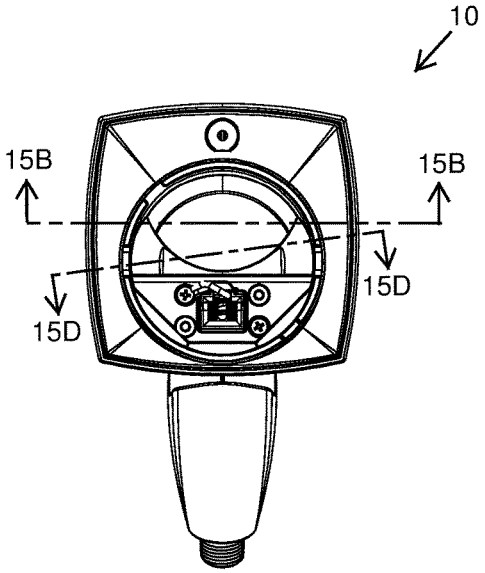
FIG. 15A is a front view of another embodiment of a light housing.
Figure 15B:
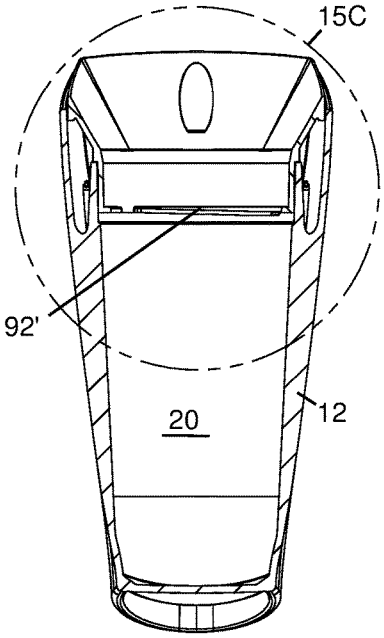
FIG. 15B is a bottom cross-section view of the light housing of FIG. 15A along the cut-plane 15B-15B of FIG. 15A.
Figure 15C:
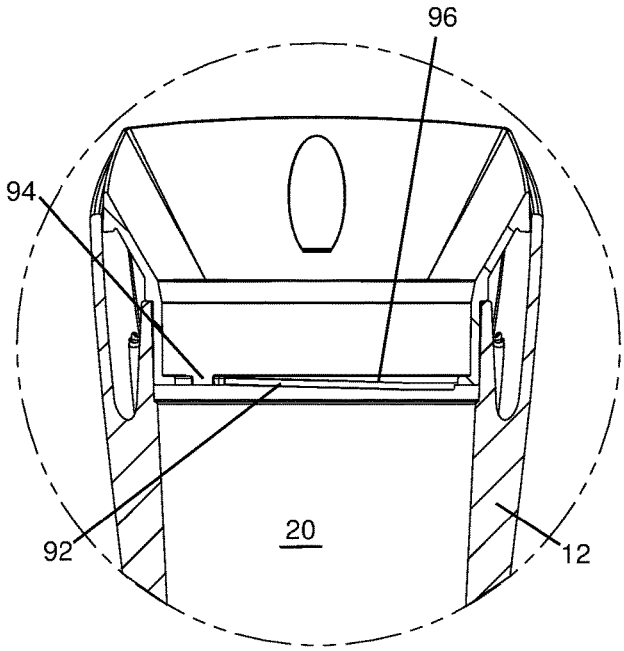
FIG. 15C is a close-up view of the cross-section view of FIG. 15B.
Figure 15D:
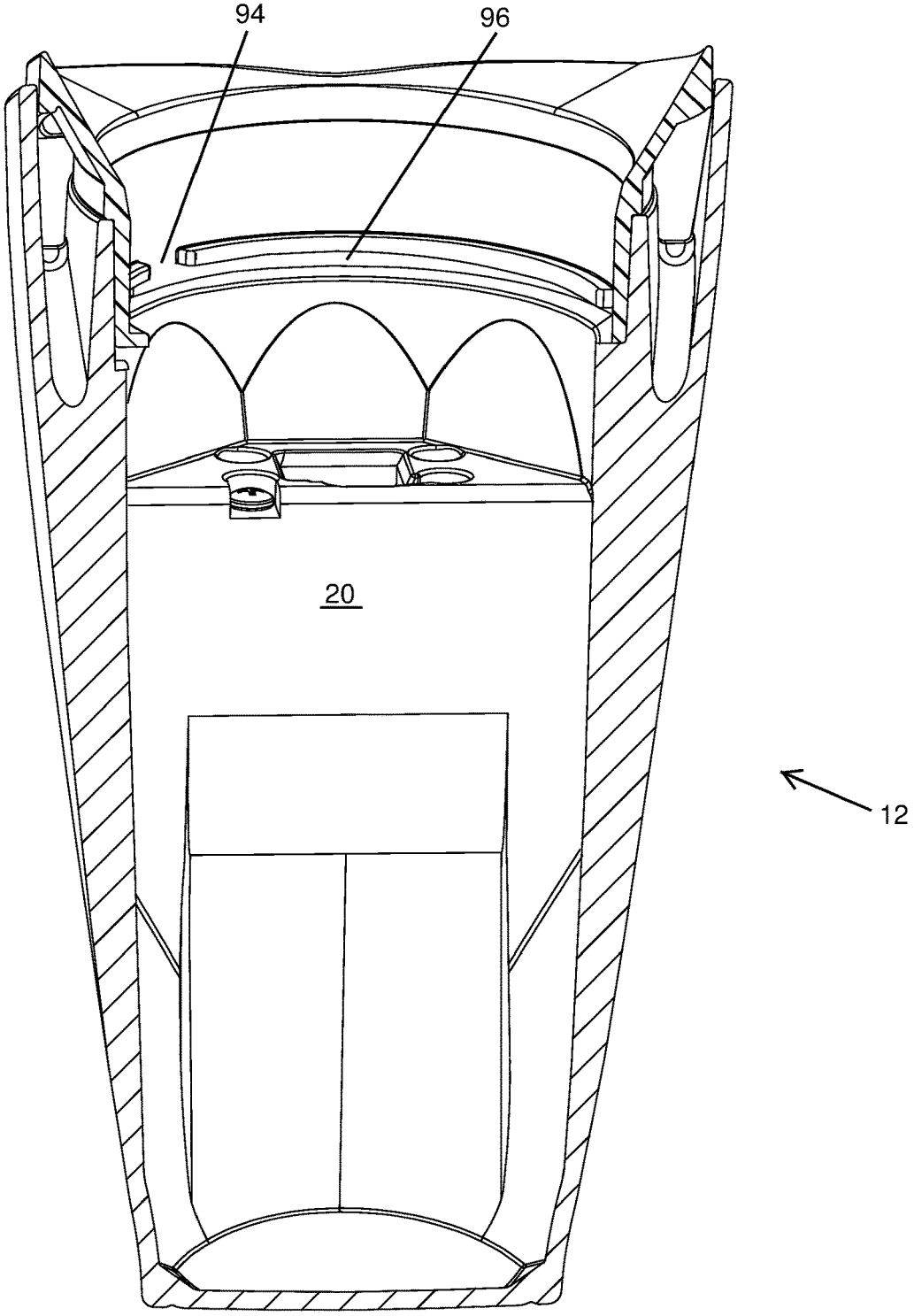
FIG. 15D is a tilted cross-section view of the light housing of FIG. 15A along the cut-plane 15D-15D of FIG. 15A.

In some embodiments, as illustrated in FIGS. 15A-15C, the tab slot 92' include a sloped (e.g., helical) surface 96. The sloped surface 96 of the tab slot 92' can be configured to move the tab 90 (e.g., and thus the cartridge 18) toward the first end 26 of the fixture housing 12 as the tab 90 is rotated in the tab slot 92' during coupling of the cartridge 18 with the fixture housing 12. Rotation of the tab 90 in an opposite direction can move the cartridge 18 away from the first end 26 of the fixture housing 12. Movement of the cartridge 18 toward the first end 26 of the fixture housing 12 during rotation of the collar 74 can facilitate a reliable and/or sure electrical and/or thermal connection between the cartridge 18 and the fixture housing 12.

In some embodiments, the cartridge 18 includes one or more features configured to facilitate easier rotation of the collar 74 and/or movement of the cartridge 18 toward and away from the fixture housing 12. For example, as illustrated in FIGS. 16 and 17, the cartridge 18 can include a handle 76 or other tactile portion.

The handle 76 can be connected to the cartridge housing 72 and/or to the collar 74. The handle 76 can be configured to transition between one or more configurations. For example, the handle 76 can be configured to rotate about one or more axes of rotation with respect to the cartridge housing 72 and/or collar 74. In some embodiments, the handle 76 rotates in unison with the collar 74 with respect to the cartridge housing 72 about a first axis of rotation (e.g., an axis rotation parallel to or substantially parallel to the cartridge axis 82). In some embodiments, the handle 76 is configured to rotate with respect to both the cartridge housing 72 and the collar 74 about a second axis of rotation 98. The second axis of rotation 98 can be perpendicular to or otherwise non-parallel with the first axis of rotation.

Rotation of the handle 76 about the second axis 98 can transition the handle 76 between a first and a second configuration. The first configuration can be, for example, a stored (e.g., closed) configuration, as illustrated in FIGS. 8 and 12. The second configuration can be an actuation position, as illustrate in FIGS. 9-11, 16 and 17. In some embodiments, transition of the handle 76 to the stored configuration can move the handle 76 (e.g., and the subcomponents thereof) out from a path of light emitted from the cartridge 18. Transition of the handle 76 to the actuation position can facilitate easier rotation of the handle 76 and/or pulling/pushing of the handle 76.

Figure 16:
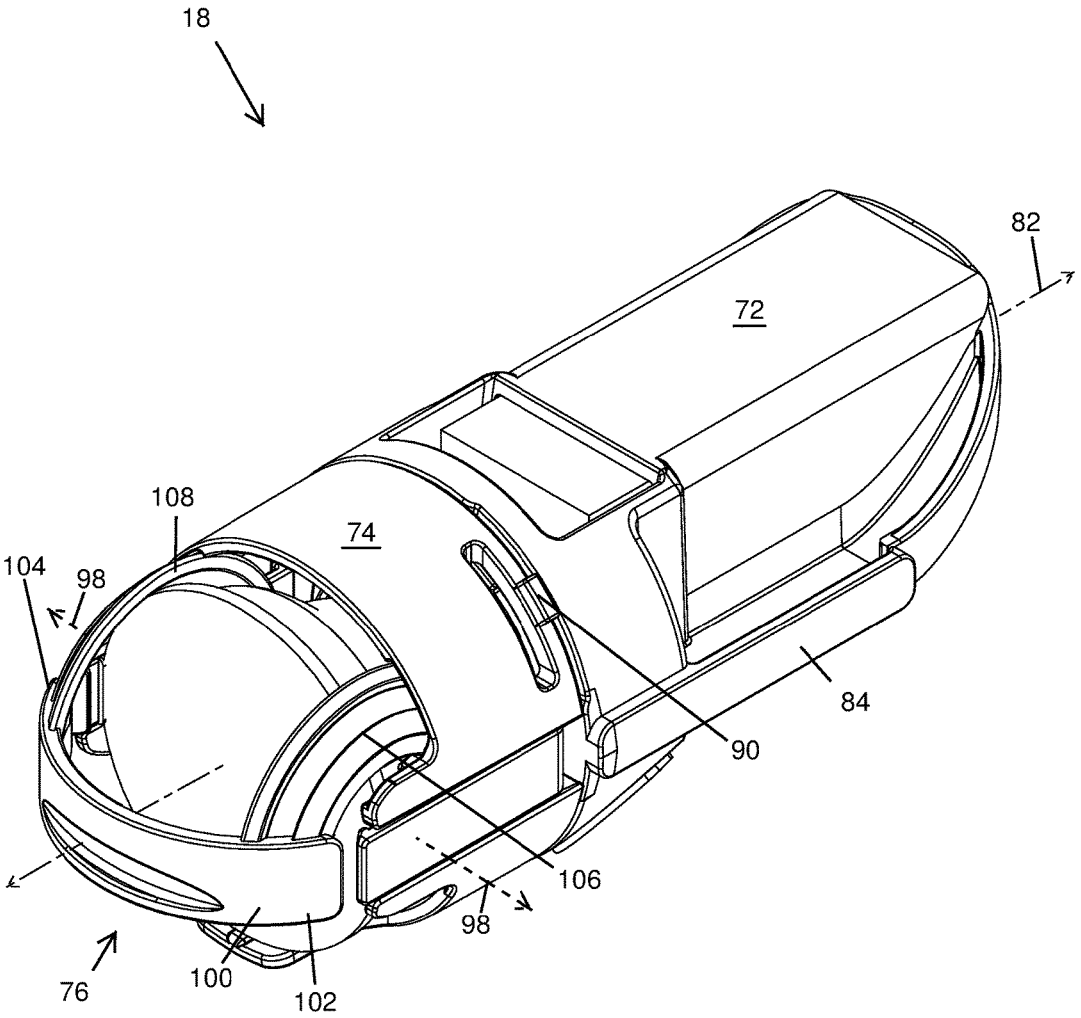
FIG. 16 is a front top perspective view of the light cartridge of FIG. 12, wherein the handle is in a second position.
Figure 17:
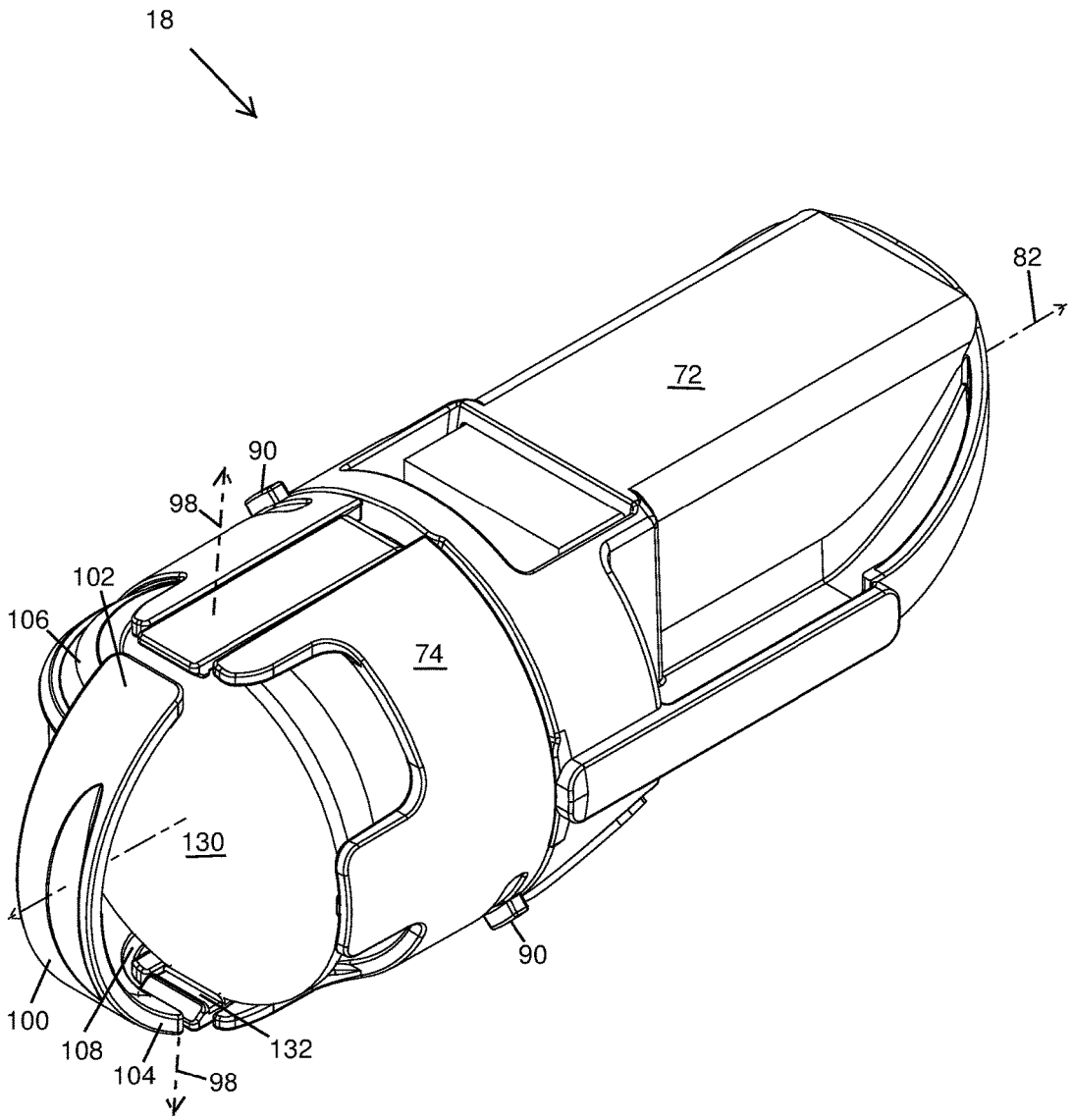
FIG. 17 is a front top perspective view of the light cartridge of FIG. 12, wherein the collar is rotated to a second position.

As illustrated in FIGS. 16 and 17, the handle 76 can include a gripping portion 100. In some embodiments, the handle 76 includes a hinge or other rotation structure configured to facilitate rotation of the gripping portion 100 with respect to the cartridge housing 72 and/or with respect to the collar 74.

The gripping portion 100 can have an arcuate shape extending between a first gripping end 102 and a second gripping end 104. The arcuate shape of the gripping portion 100 can curve about the cartridge axis 82 and/or the first axis of rotation when the handle 76 is in the stored configuration. In some embodiments, a radius of curvature of the gripping 100 portion is similar to or the same as a radius of curvature of the collar 74. The radius of curvature of the gripping portion 100 can be greater than a radius of the light unit assembly 110 (described below) and/or of some components thereof. In some embodiments, the arcuate shape of the gripping portion 100 facilitates movement of the gripping portion 100 out of the light emission path of the cartridge 18 when the handle 76 is in the stored configuration. In some embodiments, the gripping portion 100 is formed as a monolithic part. In some case, the gripping portion 100 is constructed from a plurality of separate components.

The rotation structure can comprise one or more structures configured to facilitate movement of the gripping portion 100 about the second axis of rotation 98. For example, as illustrated in FIGS. 16 and 17, the rotation structure can include a first track 106 connected to the first gripping end 102. In some embodiments, the rotation structure includes a second track 108 connected to the second gripping end 104.

The first and/or second tracks 106, 108 can have an arcuate shape and a track portion extending along a length of the respective tracks 106, 108. In some embodiments, the arcuate shape of the tracks 106, 108 curve around the second axis of rotation 98. In some embodiments, the tracks 106, 108 have curved profiles along a length of the first and/or second tracks 106, 108. The curved profile of the tracks can be configured to fit around an outer dimension (e.g., outer radius) of the electrical/lighting features of the cartridge as the handle 76 is transitioned between the stored and actuation positions. A radius of curvature of the curved profile of the first and/or second tracks 106, 108 can be similar to, the same as, or smaller than the radius of curvature of the collar 74.

The first and/or second tracks 106, 108 can be configured to ride along a corresponding structure of the collar 74. For example, the collar 74 can include one or more protrusions configured to sit in the first and/or second tracks 106, 108. In some embodiments, the protrusions can engage an end surface 107 (FIG. 13) in the track to cause the tracks 106, 108 to inhibit or prevent rotation when the handle 76 is in its actuation position. In some embodiments, the collar 74 includes one or more apertures 77 that confine at least one side of the first and/or second tracks 106 or 108. A surface may be formed on the inner side of the collar 74 that forms a slot with the aperture 77 through which the tracks 106, 108 are configured to slide. The track apertures can include tabs or other features configured to confine at least three sides of the tracks 106 and 108. Interference between the tabs and the ends of the channels of the tracks 106, 108 can define one or more rotational limits of the handle 76 between the stored and actuation positions. In some embodiments, interference between the gripping portion 100 and the collar 74 defines a rotational limit for the stored configuration.

In some embodiments, the cartridge 18 is configured to be inserted into and/or removed from the light housing 12 through a portion of the light housing 12 other than the second end 28 of the housing 12. For example, the cartridge 18 may be configured to be inserted through the first end 26 and/or through a sidewall between the first and second ends 26, 28 of the housing 12. The structural elements of the cartridge 18 described above (e.g., the collar 74 and/or handle 76 can be at various locations (e.g., the first end 78, second end 80, or in between) on the cartridge 18 to facilitate coupling of the cartridge 18 with the housing 12 at locations other than the second end 28 of the housing 12.

Cartridge Electrical and Lighting Features

As mentioned above, the cartridge 18 can include one or more electrical and/or lighting components. These components can be connected to, integral with, and/or otherwise associated with the structural components of the cartridge 18 described above.

Figure 18:
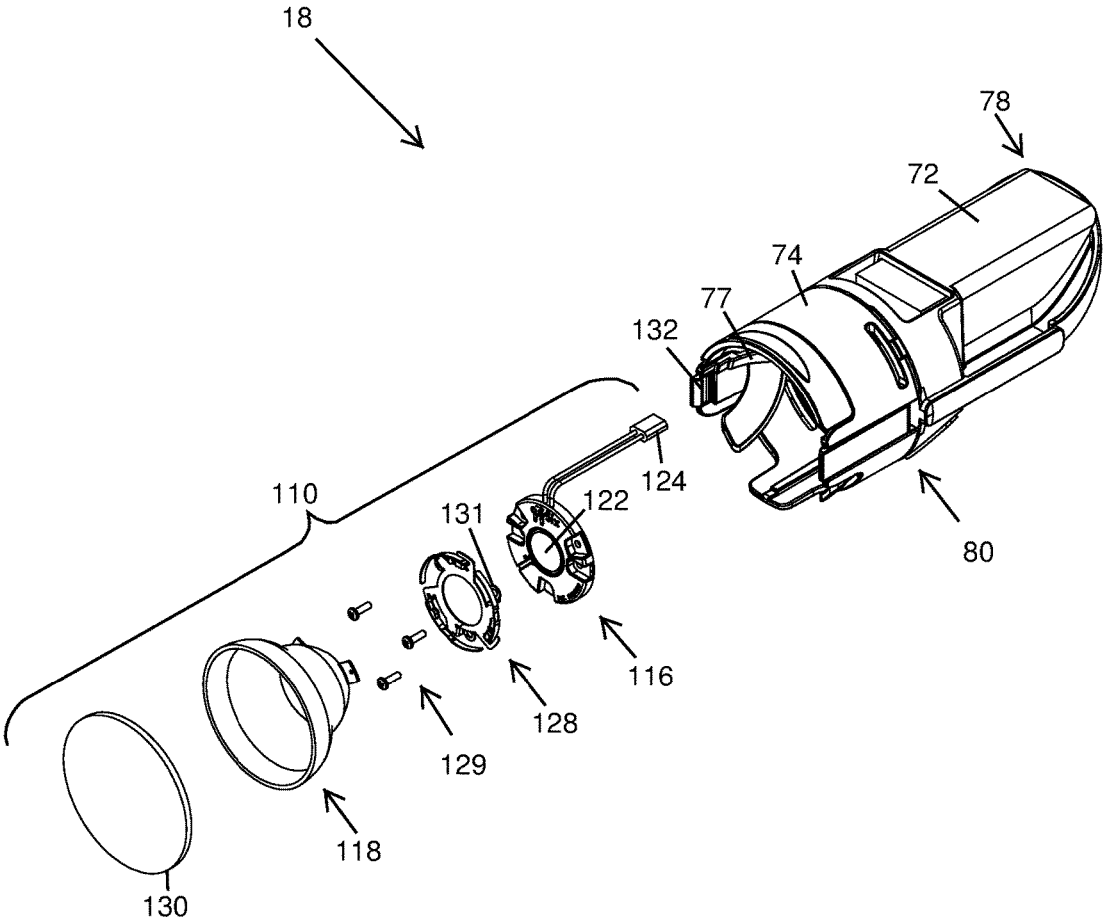
FIG. 18 is an exploded view of the light cartridge of FIG. 12.

Moving to FIG. 18, the electrical/lighting components can include a light unit assembly 110. The light unit assembly 110 can be configured to generate light and direct that light with desired lighting characteristics (e.g., shape, intensity, direction, color, and/or other characteristics) from the cartridge 18. In some embodiments, the handle 76 (e.g., the gripping portion 100 and/or tracks 106, 108) are shaped and sized to move around the light unit assembly 110 when transitioning between the stored and actuation positions.

The light unit assembly 110 can be powered by a battery or other source of power in the cartridge 18. In some embodiments, the cartridge 18 includes one or more electrical connections 112 (e.g., plugs) (see FIGS. 11 and 13) configured to electronically connect with complementary electronic features of the light fixture 10. Preferably, the cartridge 18 includes one or more drivers 114 (see FIGS. 22 and 23). The one or more drivers 114 can be configured to process and/or generate signals to control functions of the light unit assembly 110 (e.g., ON/OFF, timing, and/or one or more of the lighting characteristics described above).

The light unit assembly 110 can include a light engine 116 configured to generate light. In some embodiments, the light unit assembly 110 includes a beam reflector 118 and/or a beam director 120 (FIGS. 19B-21), each of which can be configured to alter the shape and/or intensity of the light generated by the light engine 116.

Referring to FIG. 18, the light engine 116 can be or include a light emitting diode 122 (LED) or an array of multiple LED's. In some embodiments, the light engine 116 is a light bulb (e.g., an incandescent, fluorescent, halogen, or other bulb type). In some embodiments, the light engine 116 includes one or more circuit boards and/or other electrical components. The light engine 116 can be electronically connected to one or more sources of power and/or to one or more control units. For example, as illustrated, the light engine 116 can include a plug 124 or other electrical connector configured to mate with the driver 114 and/or with some other component of the cartridge 18.

The light engine 116 can be attached to some portion of the cartridge housing 72 via, for example, fasteners, adhesives, soldering, and/or welding. In some embodiments, as illustrated in FIG. 7, the light engine 116 is connected to a wall 126 of the cartridge housing 72 between the first and second ends 78, 80 of the cartridge housing 72. In some embodiments, the wall 126 is configured to at least partially thermally separate the light engine 116 from other components of the cartridge 18 (e.g., from the driver(s) 114). The light engine 116 can be directed toward (e.g., face) the second end 80 of the cartridge housing 72.

In some embodiments, the light unit assembly 110 includes a beam reflector 118. Beam reflectors 118 of various shapes and sizes may be used in the light unit assembly 110 (e.g., compare the beam reflector 118 in FIG. 18 with the beam reflector 118' in FIG. 7) to accommodate specific lighting requirements. The beam reflector 118 can be configured to direct light from the light engine 116 in a predetermined pattern.

The beam reflector 118 can be connected to the light engine 116 directly or indirectly. For example, the beam reflector 118 can be connected to the light engine 116 via one or more fasteners and/or some other connection structure or method. In some embodiments, as illustrated in FIG. 18, the light unit assembly 110 can include a connecting frame 128 configured to facilitate releasable or fixed connection between the beam deflector 118 and the light engine 116. In some embodiments, the connecting frame 128 is connected to the light engine 116 via adhesive, fasteners (e.g., fasteners 129), and/or other connection structures or methods.

The connecting frame 128 can be configured to couple and decouple with the beam reflector 118 via a bayonet connection, threaded connection, detent connections, or some other releasable connection. Using a releasable connection between the beam reflector 118 and the connecting frame 128 or between the beam reflector 118 and the light engine 116 can facilitate easy and quick changing of the beam reflector 118 of one configuration for a beam reflector 118' of another configuration.

In some embodiments, the beam reflector 118 includes one or more arms 131 or other structures configured to connect to the connecting frame 128 and/or to the light engine 116. For example, the arms 131 can be configured to couple and decouple from the connecting frame 128 via a bayonet connection and/or via use of the fasteners 129. In some embodiments, the one or more arms 131 are configured to receive one or more fasteners 129 to connect to the connecting frame 128 and/or to the light engine 116 with or without a bayonet connection.

Turning to FIGS. 16-18, the light unit assembly 110 can include one or more optical components 130. The optical component(s) 130 can be, for example, one or more of a diffuser, a color filter, secondary lens, and/or some other optical component. As illustrated in FIG. 7, the optical component 130 can be positioned between the light engine 116 and the lens 46 of the light cover 14 when the light fixture 10 is assembled.

In some embodiments, one or more optical components 130 are connected to the beam reflector 118 (e.g., via adhesives, clips, or other attachment structures). In some embodiments, the one or more optical components 130 are held in place via retention structures on the cartridge 18, the light cover 14, or some other component of the fixture 10. For example, the collar 74 can include one or more clamps 132 (see, e.g., FIGS. 17 and 18) configured to retain the optical component(s) in place with respect to the cartridge 18. In some embodiments, the clamps 132 retain the optical component(s) 130 in place in a releasable manner, thereby permitting exchange of one or more optical components 130 for other optical components.

In some embodiments, as illustrated in FIGS. 19A-21, the light unit assembly 110 can include beam director 120. The beam director 120 can be used instead of, or in addition to, a beam reflector 118. In some embodiments, the beam director 120 is positioned between the light engine 116 and the lens 46 of the light cover 14 when the light fixture 10 is assembled. For example, the beam director 120 can be connected directly to the light engine 116 in a fixed or releasable manner. In some embodiments, the beam director 120 is connected to the light engine 116 via one or more fasteners, clips, detents, or other structures configured to facilitate releasable connection between the light engine 116 and the beam director 120. In some such embodiments, a beam director 120 installed in the light unit assembly 110 can be exchanged for another beam director 120' without use of complex tools (e.g., other than simple screwdrivers or other hand tools).

Figure 21:
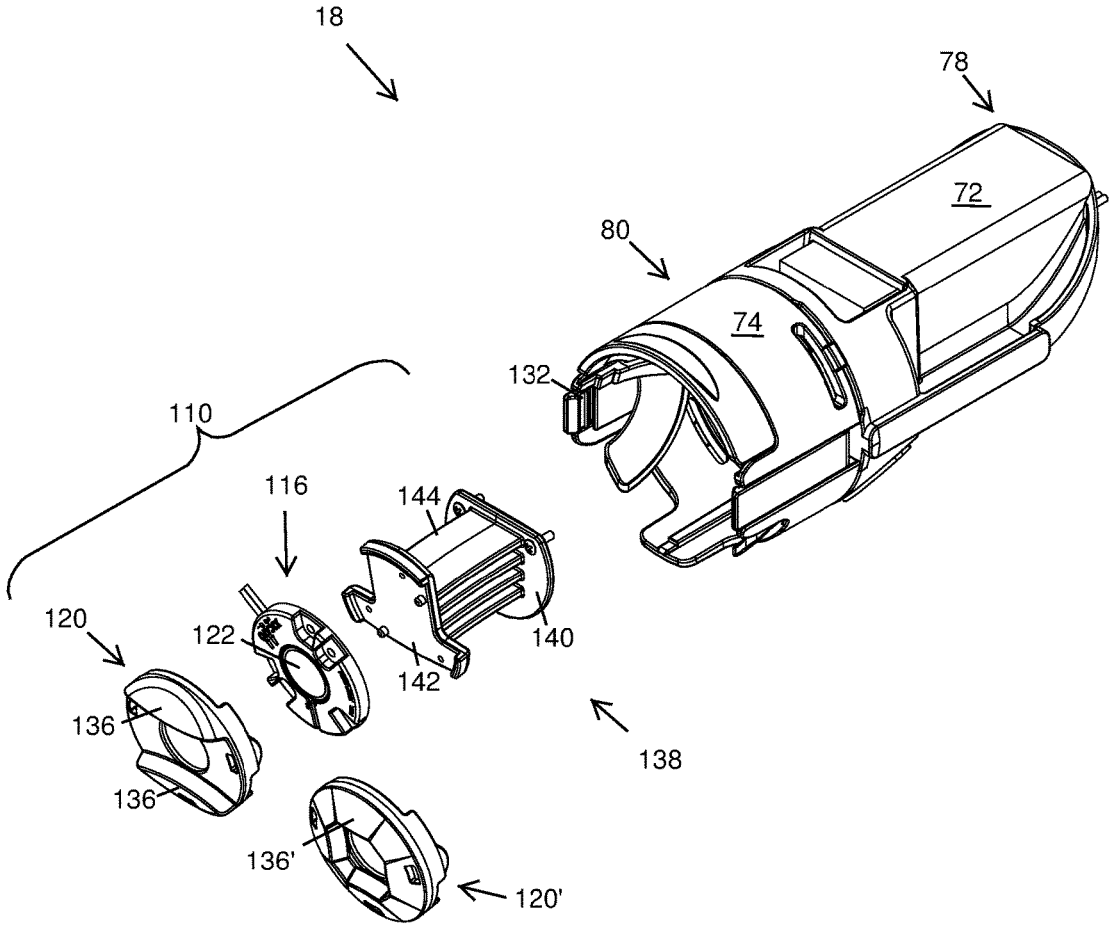
FIG. 21 is an exploded view of the light cartridge of FIG. 16.

The beam director 120 can include one or more protrusions 136 configured to at least partially shroud and reflect the light emitted from the light engine 116. The protrusions 136 of the beam director 120 can be arranged in patterns to produce predetermined light emissions patterns for the light engine 116. For example, the beam director 120 illustrated in FIG. 20 can include two opposing protrusions 136 to form a rectangular light pattern. A second beam director 120' is illustrated in FIG. 21 including a light wall 136' extending from the beam director 120' away from the extender 138 and/or from the light engine 116. In some embodiments, the light wall 136' is continuous around a perimeter of the beam director 120. The light wall 136' can have a plurality of sides. For example, the light wall 136' can have four sides and can be configured to produce a square light pattern. Many other light-directing shapes, including ellipses, polygons, and combinations thereof, can be produced by beam directors with appropriate protrusion arrangements.

Figure 19A:
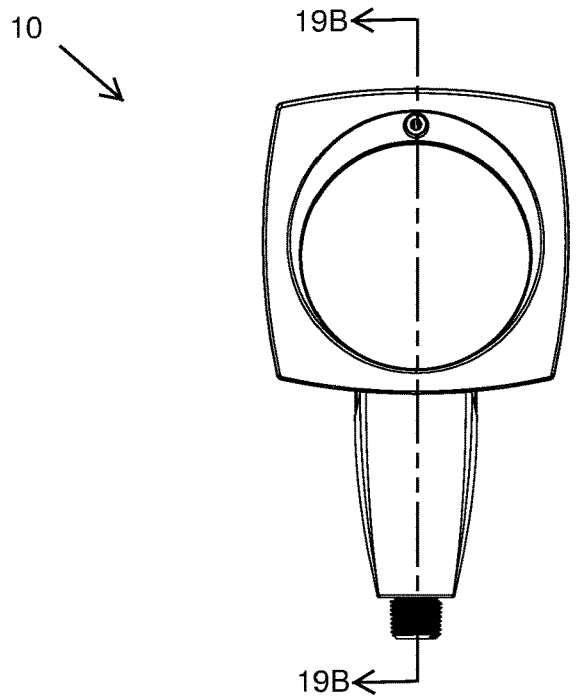
FIG. 19A is a front view of the light fixture of FIG. 1.
Figure 19B:
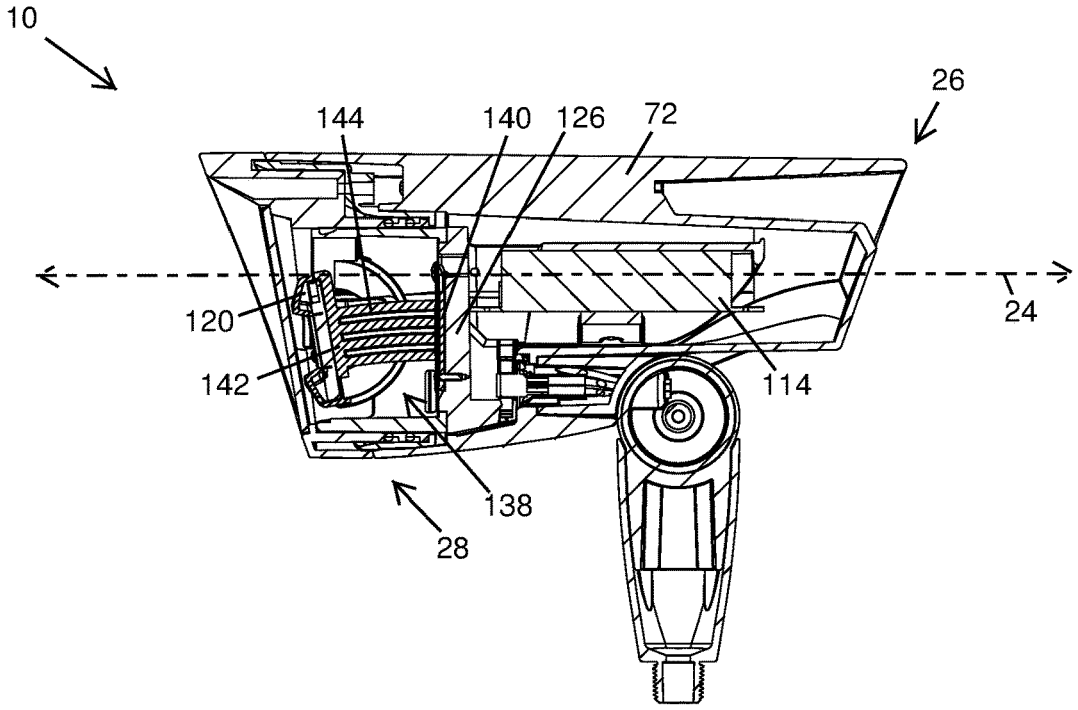
FIG. 19B is a side cross-section view of the light fixture of FIG. 1 along the cut-plane 19B-19B of FIG. 19A, wherein the fixture includes a light unit extender.
Figure 20:
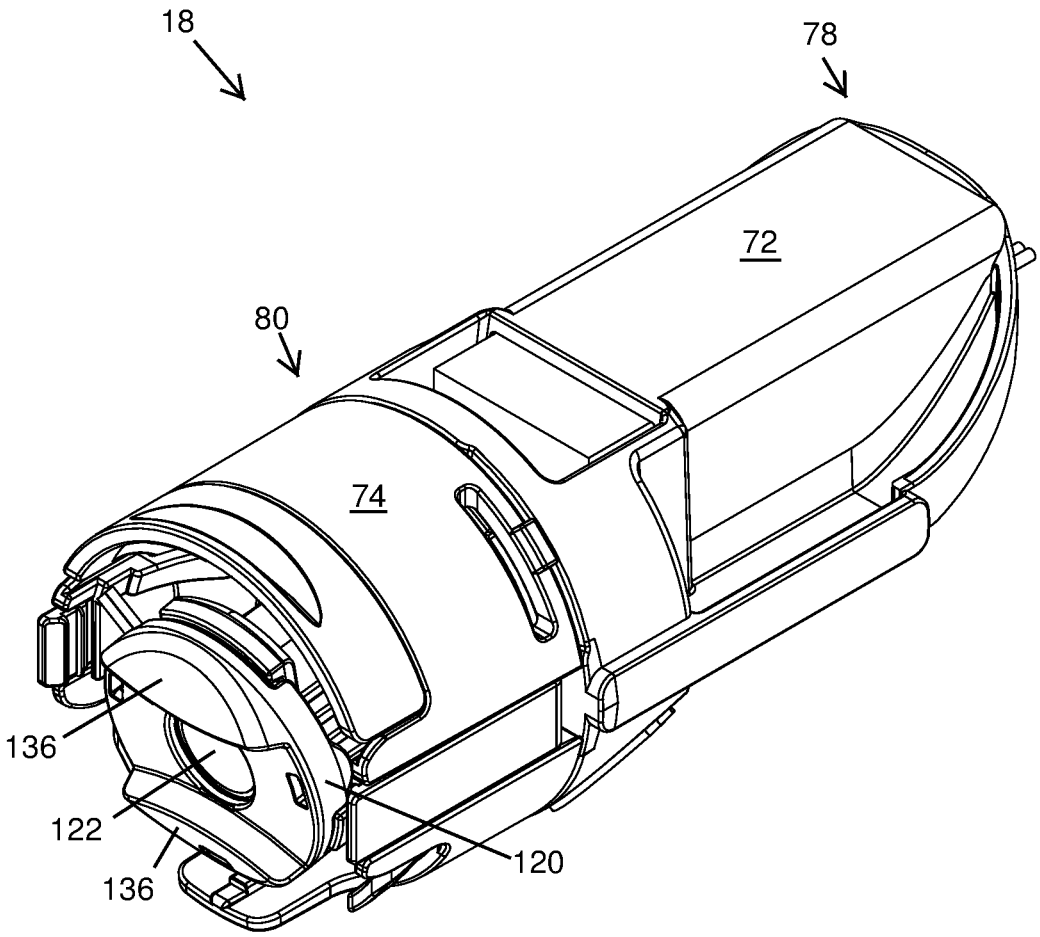
FIG. 20 is a front top perspective view of a light cartridge having a light unit extender.

As best shown in FIGS. 19B and 21, the light unit assembly 110 can include a light unit extender 138. The light unit extender 138 can be positioned between the light engine 116 and the first end 78 of the cartridge 18. In some embodiments, the light extender 138 is positioned between the light engine 116 and the wall 126 of the cartridge 18. The light extender 138 can be configured to position the light engine 116 nearer the second end 80 of the cartridge 18. Positioning the light engine 116 at or near the second end 80 of the cartridge 18 can facilitate higher degrees of angulation between the light engine 116 and the cartridge axis 82 than may be feasible if the light engine 116 is positioned closer to the first end 78 of the cartridge 18. For example, positioning the light engine 116 closer to the second end 80 of the cartridge 18 reduces the likelihood that the collar 74 or other cartridge structure would interfere with the light transmission path of the light engine 116.

The light extender 138 can include an extender base 140 at a first end of the light extender 136. The second end of the light extender 136 can include a light engine base 142. The light extender 136 can include an elongate and/or columnar extension portion 144 connecting the extender base 140 to the light engine base 142. In some embodiments, the light extender is constructed from a metal or other conductive material configured to dissipate heat from the light engine 116. In some embodiments, the light extender 138 is constructed from a polymer material.

The extender base 140 can be connected to the wall 126 or other structure of the cartridge 18. In some embodiments, the extender base 140 is connected to the cartridge housing 18 via one or more fasteners, adhesives, welding, and/or other fixed or releasable connection methods or structures. In some embodiments, extender base 140 includes one or more fastener holes. One or more of the fastener holes of the extender base 140 can be arranged in a same pattern as one or more of the fasteners holes on the light engine 116. In some such embodiments, a technician or other user of the cartridge 18 can remove the light extender 138 from and/or add a light extender 138 to a cartridge 18 without making any structural changes to other components in the cartridge 18.

The light engine base 142 can be configured to connect to the light engine 116. For example, the light engine base 142 can be configured to connect to the light engine via one or more fasteners, adhesives, welding, and/or other fixed or releasable connection methods or structures. In some embodiments, the light engine base 142 includes one or more fastener holes. One or more of the fastener holes of the light engine base 142 can be arranged in a same pattern as one or more fastener holes in the cartridge housing 18 (e.g., in the wall 126). In some such embodiments, the same light engine 116 may be attached to the light engine base 142 or to the cartridge housing 72, in accordance with the existence or absence of a light extender 138.

The extension portion 144 of the light extender 138 can include one or more ribs, protrusion, channels, or other heat-dissipating structural elements. The heat-dissipating structural elements of the extension portion 144 can be configured to dissipate heat from the light engine 116 before, during, and/or after use of the light fixture 10.

As illustrated in FIG. 19B, the light engine base 142 can be tilted or otherwise non-parallel to the extender base 140. Angular offset between the light engine base 142 and the extender base 140 can permit direction of the light from the cartridge 18 in a direction tilted from the fixture housing axis 24. In some embodiments, the extender 136 can be used in combination with beam directors 120 and/or beam reflectors 118 to generate customized light patterns from the light fixture 10. In some embodiments, the light engine base 142 and extender base 140 are positioned parallel to each other (not shown).

Figure 22:
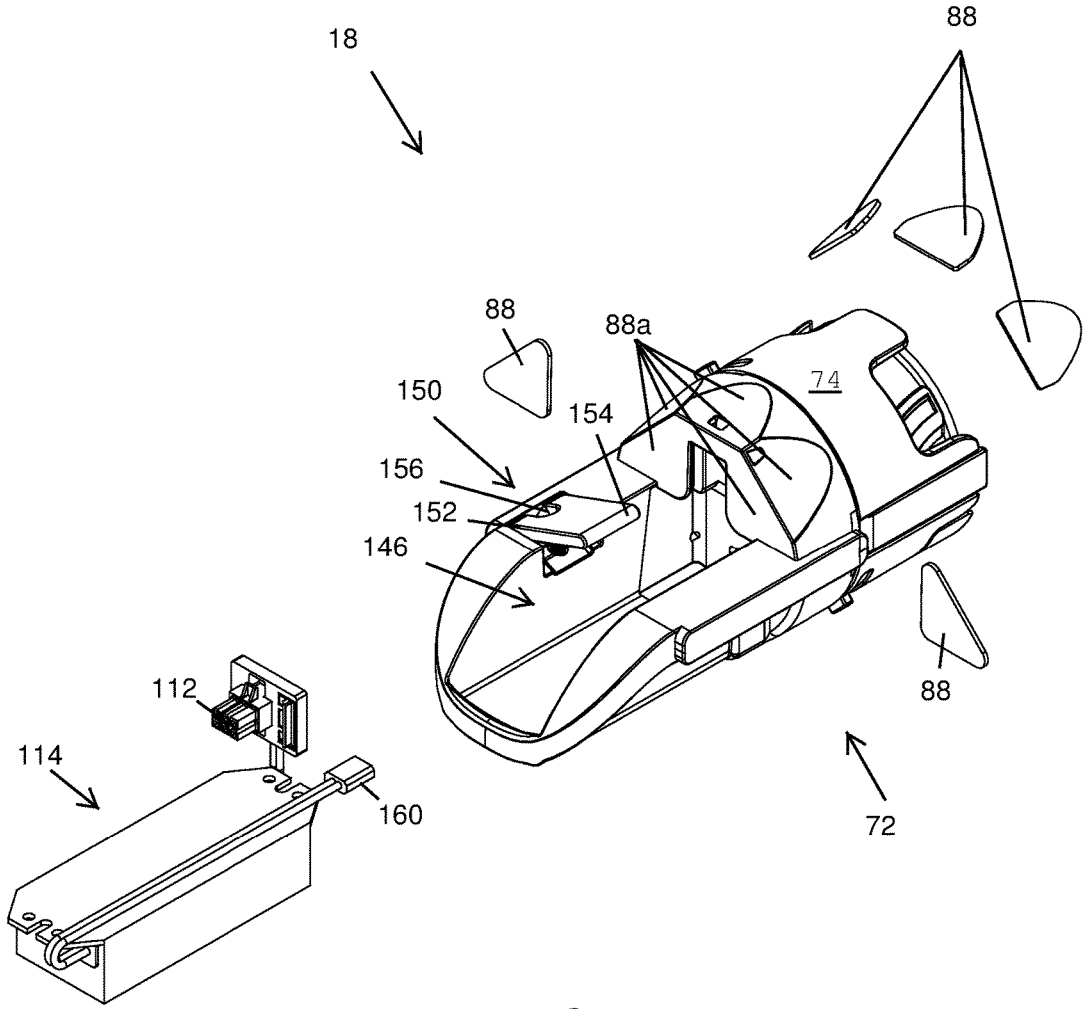
FIG. 22 is a rear exploded view of the light cartridge of FIG. 12, wherein the driver and thermal pads are removed.
Figure 23:
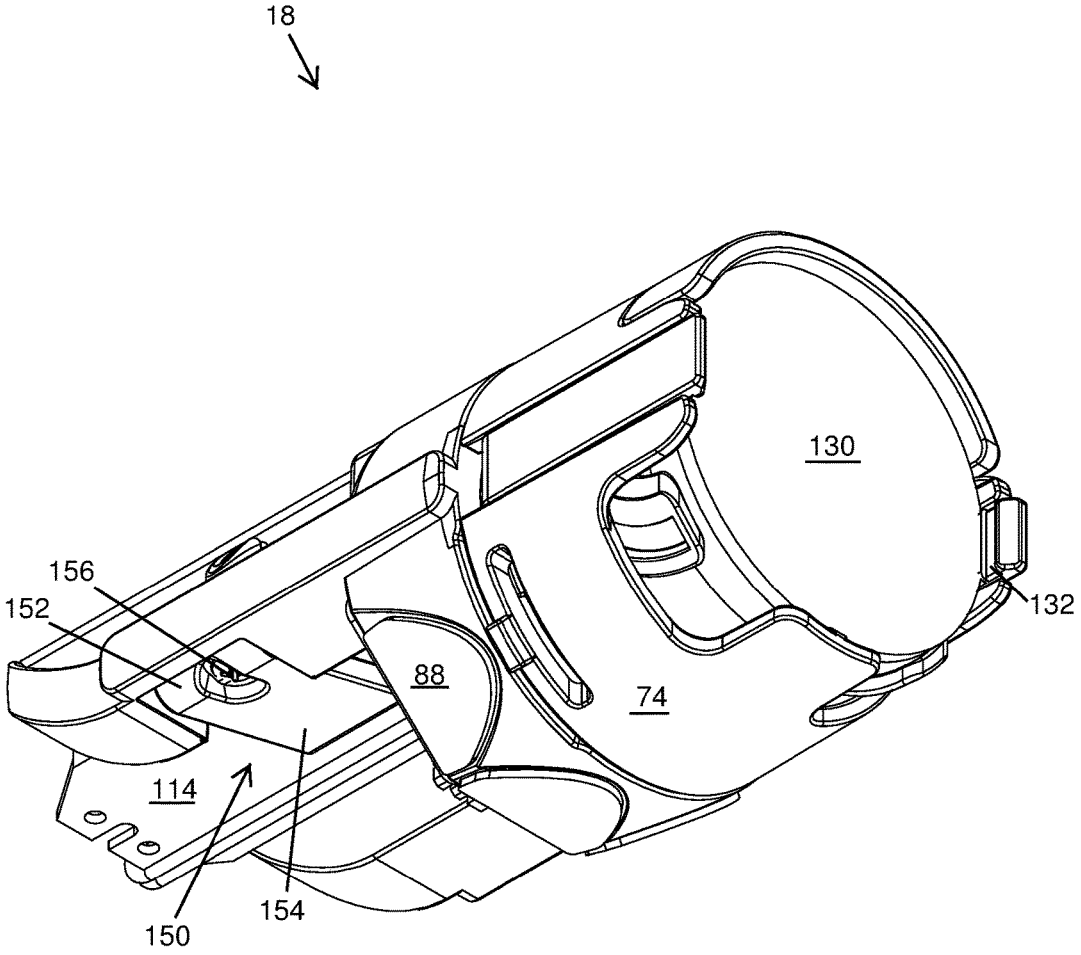
FIG. 23 is a front bottom perspective view of the light cartridge of FIG. 12.

Turning to FIGS. 22 and 23, the driver 114 can be configured to couple with the cartridge housing 72. In some embodiments, the cartridge housing 72 includes a driver recess 146. The driver recess 146 can be sized and/or shaped to receive drivers 114 of varying sizes.

The cartridge 18 can include one or more driver securement features configured to retain the driver 114 in connection with the cartridge 18. The securement features can be configured to accommodate drivers 114 of various sizes and/or shape. In some embodiments, the securement features are configured to tighten or otherwise increase the stability of the connection between the driver 114 and the cartridge housing 72.

The driver 114 securement features can include, for example, a clamp 150. The clamp 150 can be adjustable. For example, the clamp 150 can have a first end 152 adjustably connected to the cartridge housing 72 and a second end 154. The second end 154 of the clamp 150 can extend over a portion of the driver recess 146. The clamp 150 can include an adjustment feature configured to move the second end 154 of the clamp 150 toward and away from the driver recess 146. For example, the clamp 150 can include a screw 156 or other adjustable feature. In some embodiments, tightening the screw 156 at the first end 152 of the clamp 150 can move the second end 154 of the clamp 150 toward the driver recess 146 (e.g., toward the driver 114). Further tightening of the screw 156 can tighten the second end 154 of the clamp 150 against the driver 114. In some embodiments, loosening of the screw 156 can permit movement of the second end 154 of the clamp 150 away from the driver 114 and/or away from the driver recess 146. Additional securement features such as, for example, detents, clips, high-friction surfaces, and/or other securement features can be used in addition to or instead of the clamp 150.

As illustrated in FIG. 22, the driver 114 can include a first electrical connector (e.g., a plug) 160. The first electrical connector 160 can be configured to couple with the electrical connector 124 of the light engine 116 (FIG. 18). In some embodiments, the driver 114 includes a second electrical connector. For example, the driver 114 can include the plug 112 configured to electrically connect with the plug 113 of the fixture housing 72 (see, e.g., FIG. 10). In some embodiments, the driver 114 includes a power source (e.g., a battery). In some such embodiments, the driver 114 does not include a second plug.

The driver 114 can be configured to receive and/or process signals from a remote signal source. The remote signal source can be a server or other signal generator. In some embodiments, the driver 114 receives the signals via the second plug 112. In some embodiments, the driver 114 receives signals via a wireless connection. The driver 114 can be configured to process the signals to facilitate operation of the light unit assembly 110 (e.g., ON/OFF, dimming/brightening, color changing, and/or other operations of the light unit assembly 110). In some embodiments, the driver 114 is embedded with one or more signal algorithms configured to operate the light unit assembly 110 without additional signal reception from a signal generator. In some applications, the driver 114 is configured to receive line voltage (e.g., high voltage) and output a constant current to drive the light engine 116. In some embodiments, the driver 114 is configured to receive line voltage and output a lower voltage to the light engine 116. For example, the light engine 116 may include additional circuitry configured to use the voltage output from the driver 114 to drive the LEDs or other light units. In some embodiments, the driver 113 is thermally connected to the cartridge housing 72. In some embodiments, the light engine 116 receives line voltage directly without use of a driver 114. In some cases, the light engine 116 contains over-temperature circuitry and/or sensor for motion or other features. In some embodiments, the light engine 116 is configured to process signals to facilitate operation of the light unit assembly 110 (e.g., ON/OFF, dimming/brightening, color changing, and/or other operations of the light unit assembly 110).H Repair and/or Replacement of Electrical Components As described above, the cartridge 18 can be constructed and assembled to include many and/or most of the electrical components of the light fixture 10. In some embodiments, the cartridge 18 includes all or most of the consumable components of the light fixture 10. Positioning electrical and/or consumable components on and in the cartridge 18 can facilitate easy and/or quick repair of and/or other desired changes to the light fixture 10 in the field.

Figure 2A:
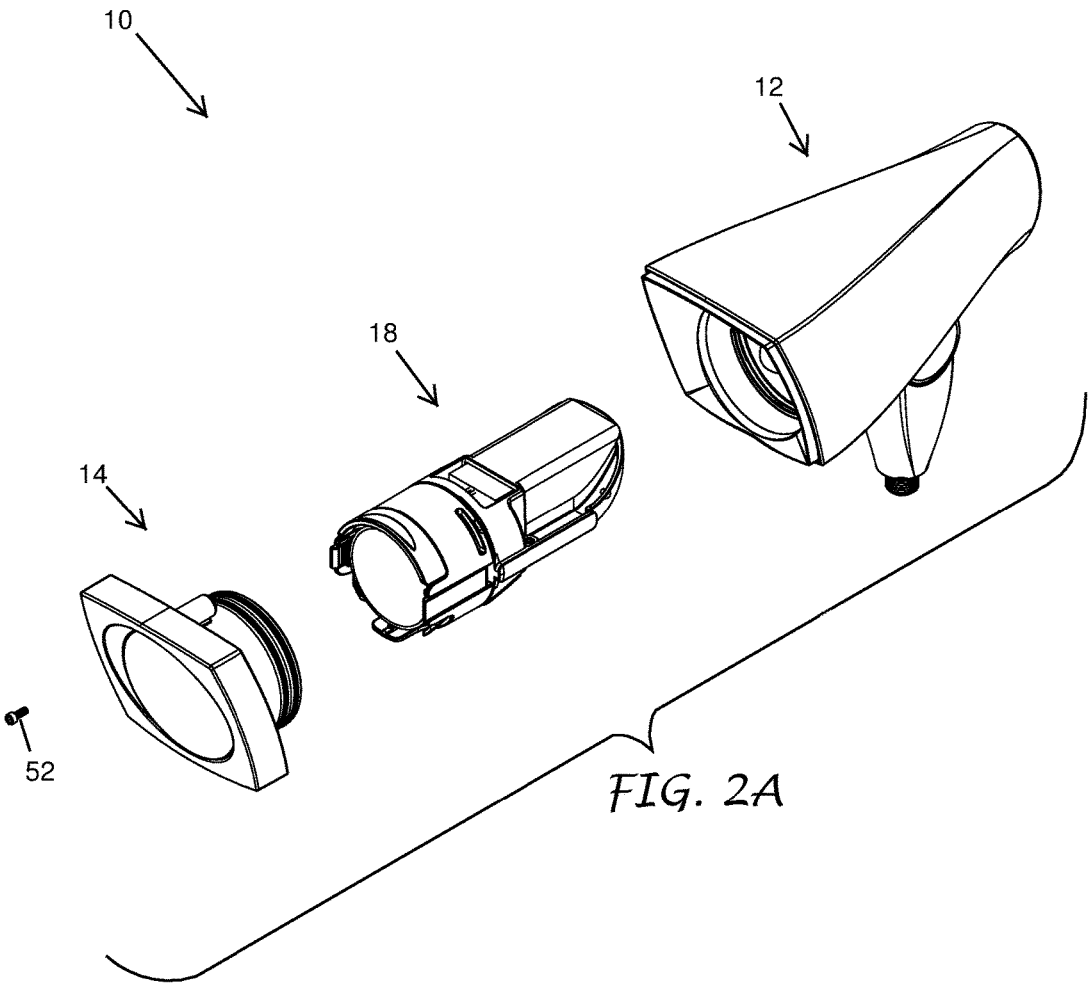
FIG. 2A illustrates an exploded view of the light fixture of FIG. 1.
Figure 2B:
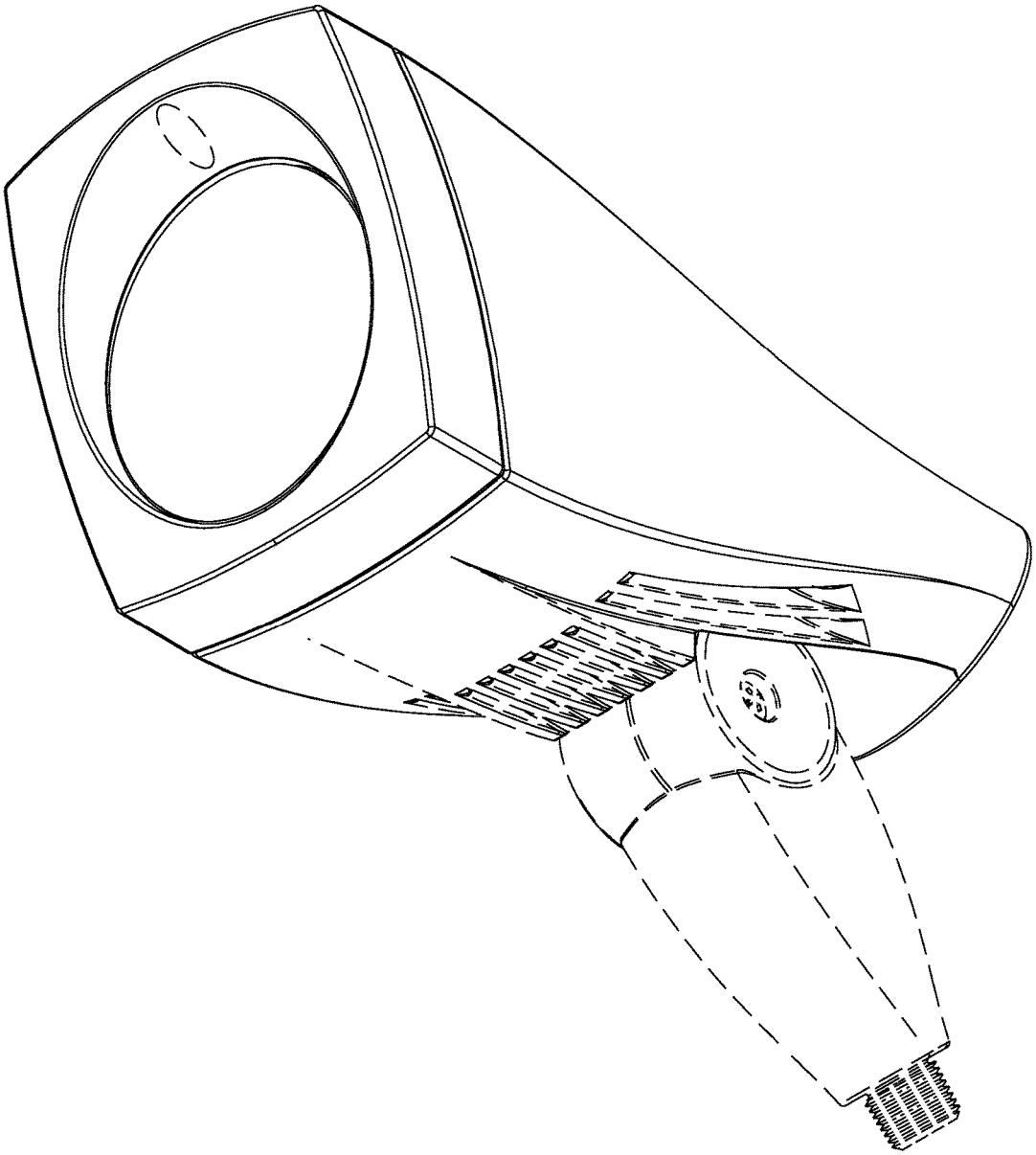
FIG. 2B illustrates a front, right, and bottom side perspective view of the light fixture of FIG. 1, wherein broken lines are used to illustrate features of the light fixture which may or may not form part of the design, depending on the embodiment.
Figure 2C:
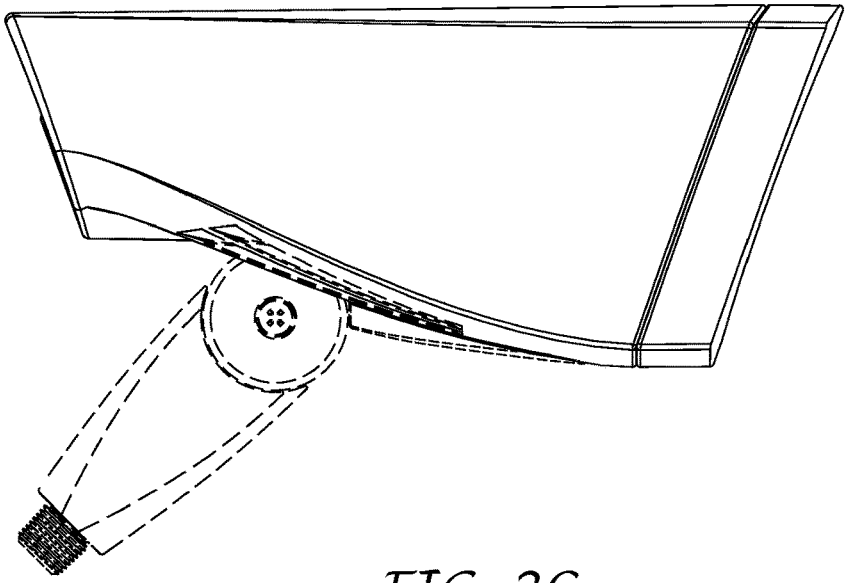
FIG. 2C illustrates a left side elevational view thereof.
Figure 2D:
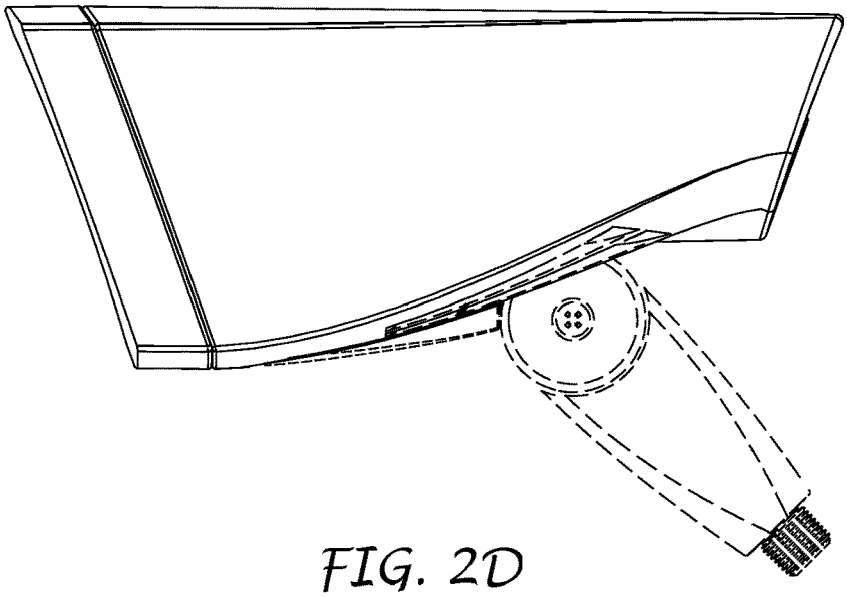
FIG. 2D illustrates a right side elevational view thereof.
Figure 2E:
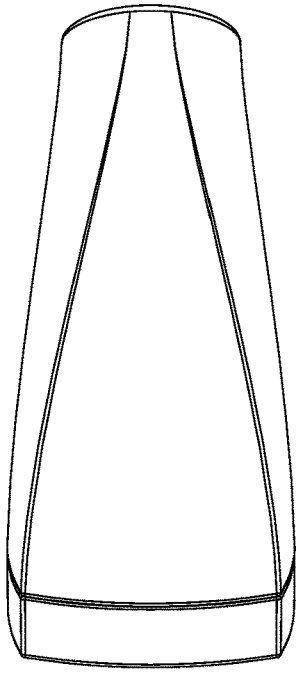
FIG. 2E illustrates a top plan view thereof.
Figure 2F:
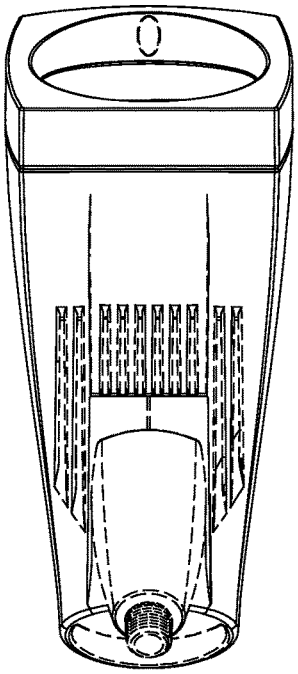
FIG. 2F illustrates a bottom plan view thereof.
Figure 2G:
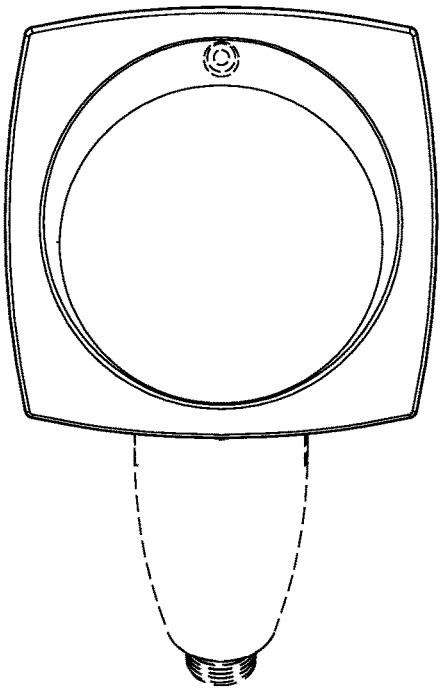
FIG. 2G illustrates a front side elevational view thereof.
Figure 2H:
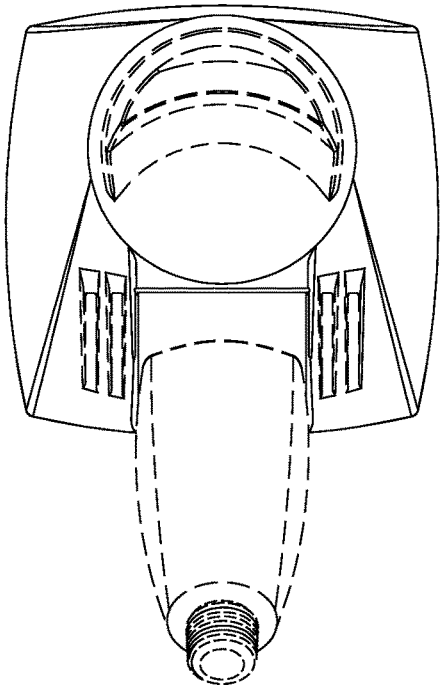
FIG. 2H illustrates a back side elevational view thereof.
Figure 2I:
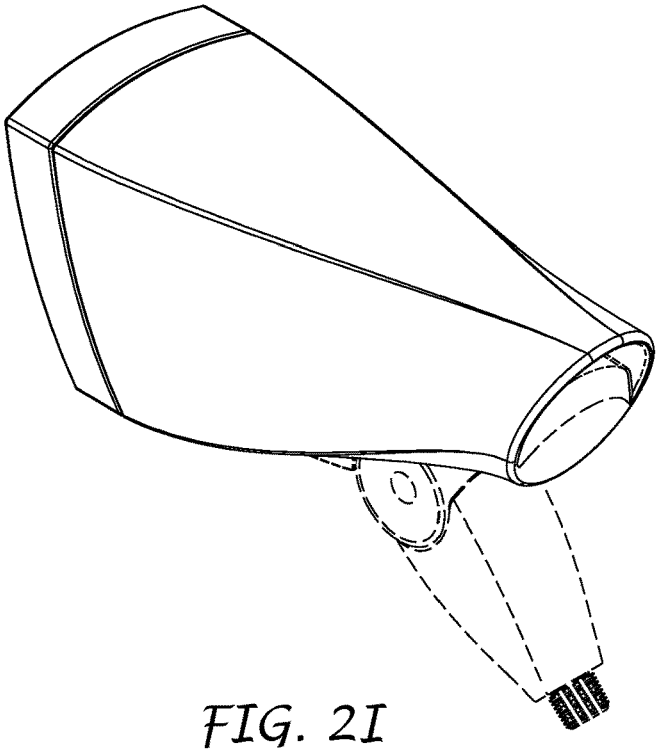
FIG. 2I illustrates a back, right, and top side perspective view thereof.
Figure 2J:
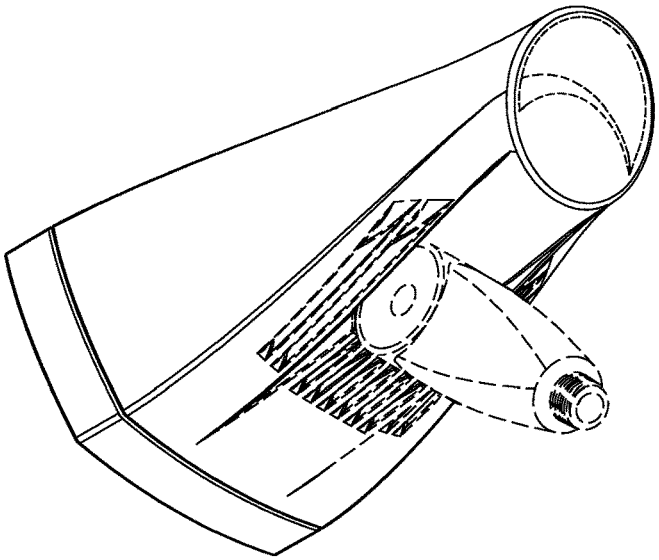
FIG. 2J illustrates a back, right, and bottom side perspective thereof.
Figure 2K:
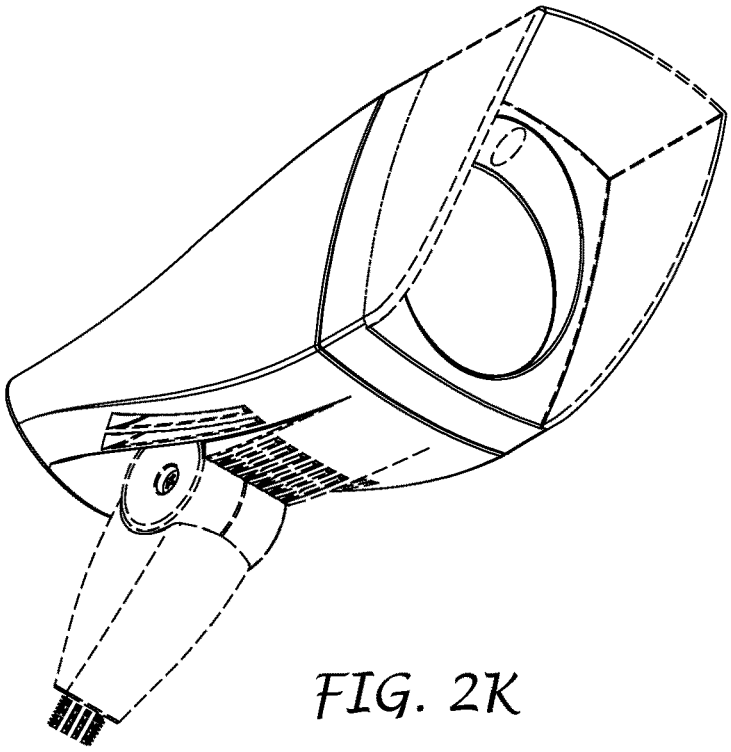
FIG. 2K illustrates a front, left, bottom side perspective view of another embodiment of a light fixture, the light fixture being identical to the light fixture of FIGS. 1-2J with the addition of a shroud extending from the dot-dash boundary line.
Figure 2L:
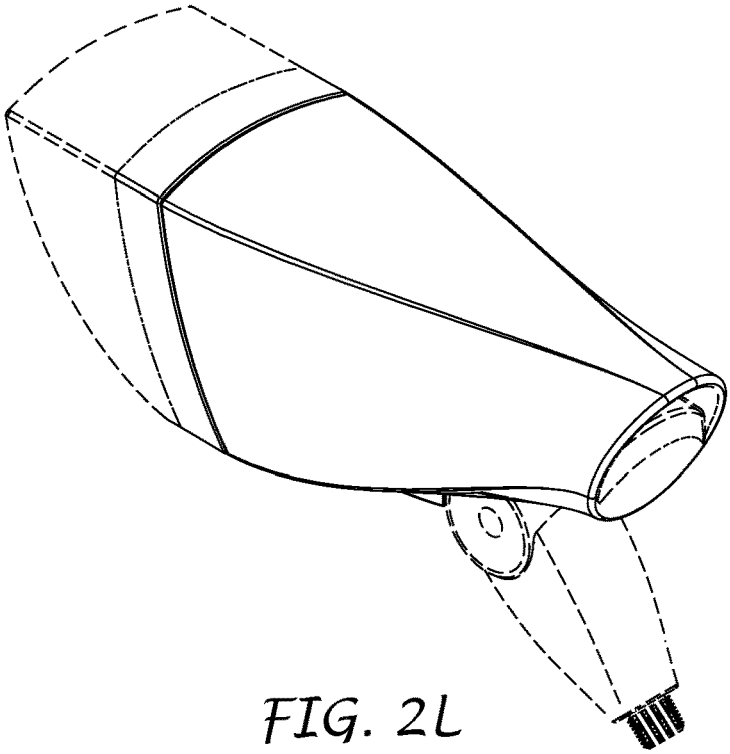
FIG. 2L illustrates a back, right, top side perspective view thereof.

For example, a method of repairing or replacing one or more of the light engine 116, beam director 120, beam reflector 118, driver 114, cartridge electrical connectors 112, and/or other components of the cartridge 18 can include removing the fastener 52 from the light cover 14 and from the fixture housing 12 (FIG. 2A). The light cover 14 can then be removed from the fixture housing 12. In some cases, the light cover 14 may be reinstalled on the fixture housing 12 while waiting to replace the cartridge 18 to reduce exposure of the interior 20 of the fixture housing 12 to moisture or other environmental hazards.

The cartridge 18 can be configured to pass into and out of the housing interior 20 of the fixture housing 12. In some embodiments, the cartridge 18 is configured to be removed from and mated with the fixture housing 12 along a mating path 70 (FIGS. 10 and 11) parallel to or substantially parallel to the fixture housing axis 24. In some embodiments, the mating path 70 of the cartridge 18 is not parallel to the fixture housing axis 24.

A method of removing the cartridge from the fixture housing 12 can include rotating the handle 76 to the actuation configuration. The technician or other user can rotate the collar 74 from the locked (FIG. 16) to the unlocked position (FIG. 17). For example, the user can rotate the gripping portion 100 of the handle 76 to rotate the collar 74. When the collar 74 is in the unlocked position (e.g., when the tabs 90 are aligned with the tab openings 94 of the fixture housing 12), the user can pull the cartridge 18 out from the fixture housing 12.

In some cases, a replacement cartridge may be placed into the fixture housing 12 prior to reinstallation of the light cover 14. The damaged cartridge can be repaired on-site or shipped to a remote repair center. In some embodiments, the damaged cartridge can be repaired in a nearby indoor facility to avoid exposure of the cartridge components to environmental hazards.

To replace the same cartridge or connect another cartridge to the fixture housing 12, the user can position the collar 74 of the replacement cartridge in the unlocked position (FIG. 17). The user can align the alignment structure 84 of the replacement cartridge 18 with the corresponding alignment structure 86 of the fixture housing 12. The user can push the cartridge 18 into engagement with the fixture housing 12. In some embodiments, pushing the replacement cartridge 18 into the fixture housing 12 electrically connects the electrical connector 112 of the cartridge 18 with the electrical connector 113 of the fixture housing 12. After the tab 90 of the collar passes through the tab opening 94 of the fixture housing 72, the collar 74 can be rotated to the locked position.

In-Grade Light

In some applications, it may be desirable to install a light on or at least partially in the ground. In-ground lights are sometimes referred-to as "in-grade lights" (see e.g., FIG. 24). In-Grade lights can provide desired lighting for applications such as landscaping, structural lighting, pathway lighting, or other applications where upward-directed light is desired. In-Grade lights can also be used in applications to provide downward-directed or sideways-directed light. In-Grade lights can be installed in many environments including, but not limited to, landscaping beds, concrete (e.g., walkways), and/or turf. In-Grade lights can have a low profile (e.g., extend very little or not at all in an upward direction from the ground). In-Grade lights can be flush with or (entirely or partially) recessed from an adjacent surface. In some applications, activities such as lawn mowing, walking, pressure-washing, and/or other activities can be performed on and/or near in-grade lights without negatively impacting the integrity or performance of the light.

Because in-grade lights are often installed at least partially underground, they are especially susceptible to moisture, dirt, and other environmental hazards. Ingress of moisture into An in-grade light can negatively affect the performance of the light. For example, the lens of the light may accumulate moisture and become cloudy or otherwise optically compromised. Moisture can damage or destroy electrical components in the in-grade light. In some cases, the position of the in-grade light can make replacement and/or repair of parts within the light difficult due to the high risk of moisture ingress into the light and the difficulty of removing moisture from the light. Additionally, it can be difficult to adjust the direction (e.g., angle, tilt, etc.) of the light produced from the in-grade light, as it may be necessary to open the light and permit ingress of moisture and other environmental hazards into the light when adjusting the lighting direction.

As such, it would be advantageous to provide An in-grade light configured to resist or eliminate moisture ingress into the light before, during, and/or after replacement, repair and/or adjustment of the light. Certain features and characteristics of the in-grade lights described herein can facilitate replacement, repair, and/or adjustment of in-grade light components with little or no water ingress into the light and/or into portions of the light housing electrical components.

Figure 24:
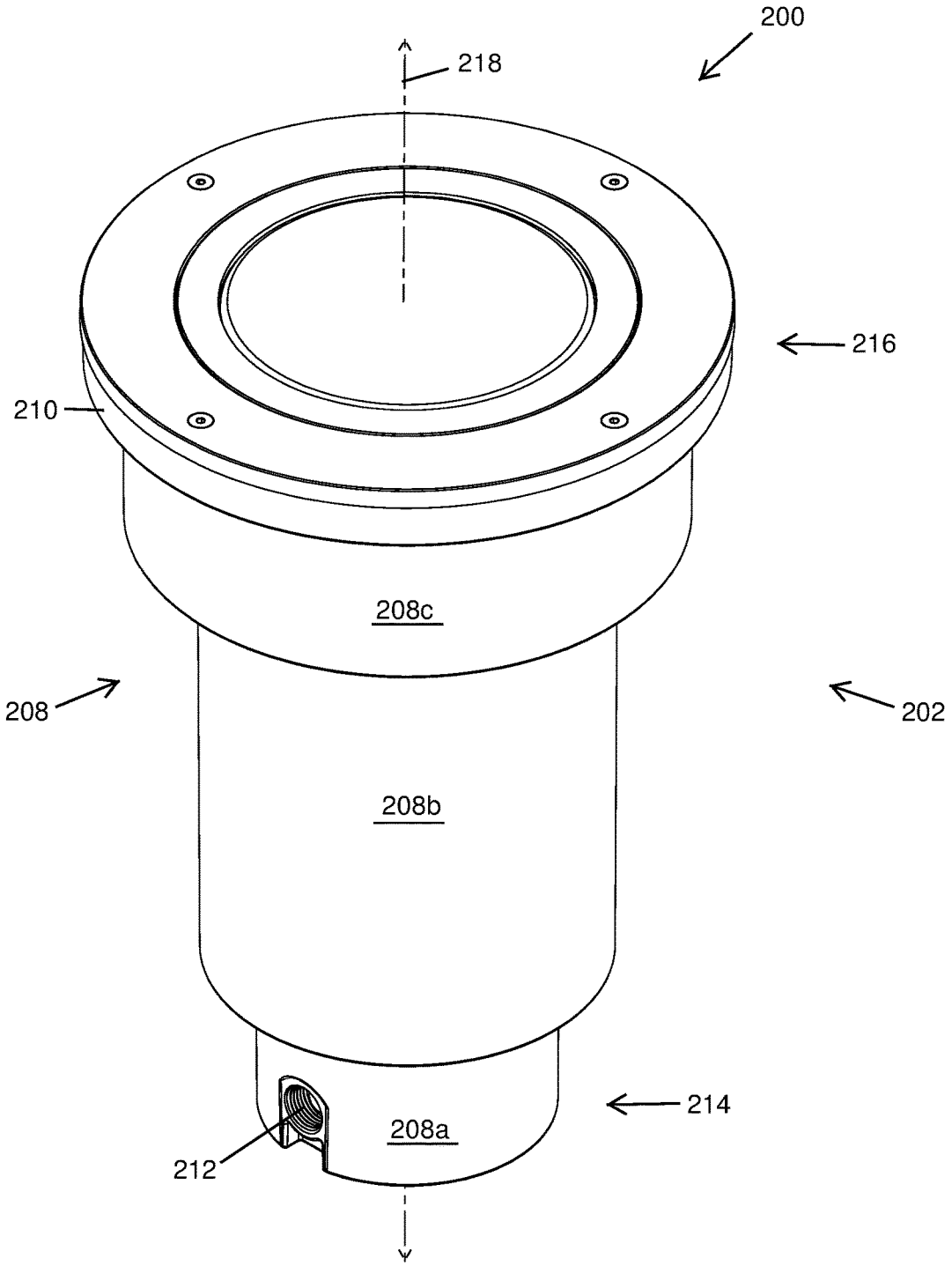
FIG. 24 is a perspective view of an in-grade light.
Figure 25:
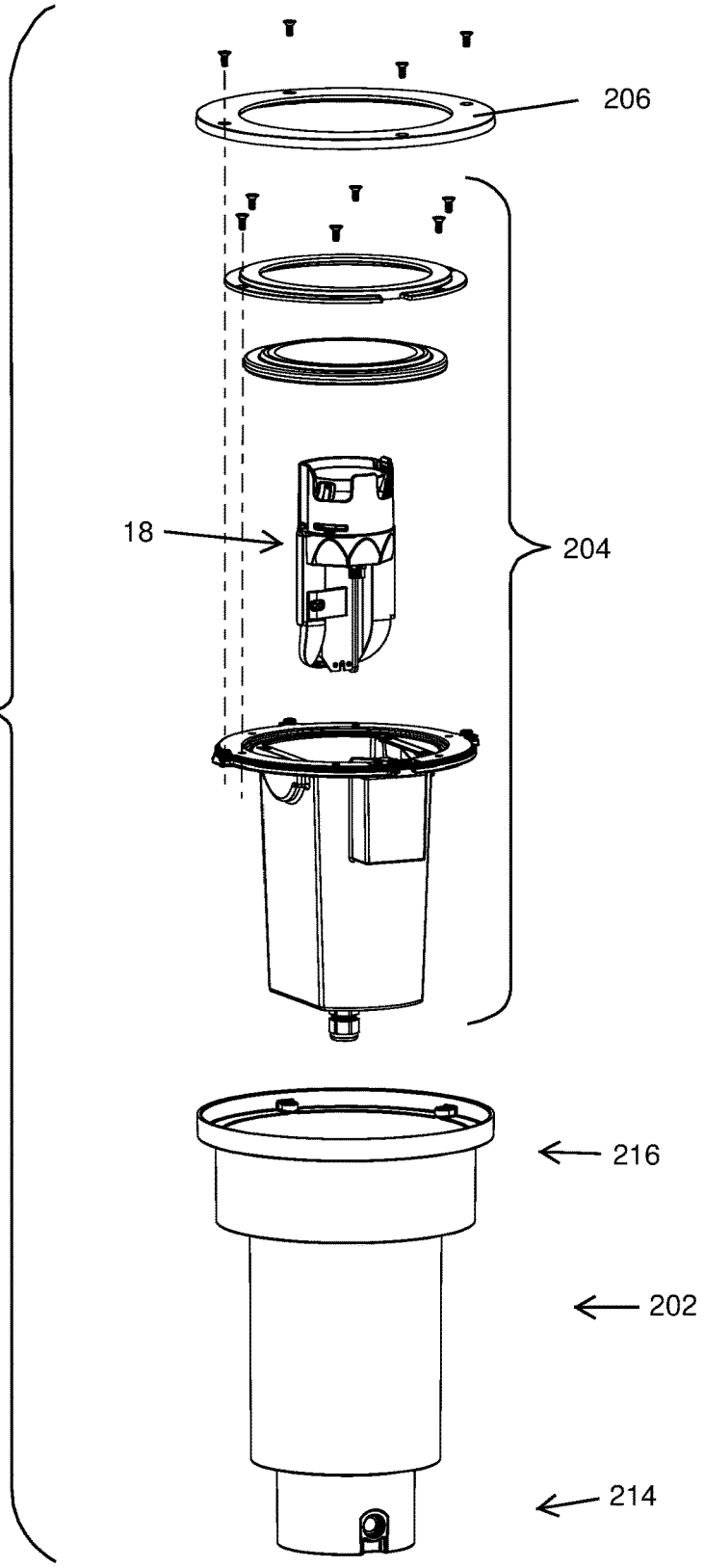
FIG. 25 is an exploded view of the in-grade light of FIG. 24.

An example of such An in-grade light 200 is illustrated in FIGS. 24 and 25. The in-grade light 200 can include one or more housings in which electrical and mechanical components are housed. For example, the in-grade light 200 can include an outer housing 202. An inner housing assembly 204 may be positioned at least partially within the outer housing 202 when the in-grade light 200 is assembled. The in-grade light 200 can include a cover 206 configured to couple with one or both of the outer housing 202 and the inner housing assembly 204.

The in-grade light 200 can include a cartridge 18. The cartridge 18 can be the same as or similar to the cartridges described above. In some embodiments, the cartridge 18 can be configured to releasably connect to one or both of the outer housing 202 and the inner housing assembly 204.

As will be discussed in more detail below, the in-grade light 200 can include one or more mechanisms or structures configured to facilitate tilting and/or rotating of the cartridge 18 or some other component or system of components with respect to the outer housing 202.

In-Grade Light Outer Housing

With reference back to FIG. 24, the outer housing 202 of the in-grade light 200 can include a sleeve portion 208. The sleeve portion 208 can have a first end (e.g., lower end) 214 and a second end (e.g., upper end) 216. As best seen in FIG. 25, the second end 216 can be open. In some embodiments, the first end 214 is closed. The outer housing 202 (e.g., the sleeve portion 208) is hollow or at least partially hollow. The outer housing 202 can have an outer housing axis 218 extending through one or both of the first and second ends 214, 216 of the sleeve portion 208.

Returning to FIG. 24, the sleeve portion 208 can be connected to a connection portion 210. The connection portion 210 can be, for example, positioned at the second end 216 of the sleeve portion 208. The connection portion 210 can be configured to connect to the inner housing assembly 204 and/or to the cover 206. The outer housing 202 can include one or more electrical ports 212. The one or more electrical ports 212 can be configured to facilitate electrical connection between the interior of the outer housing 202 and the exterior of the outer housing 212. The one or more electrical ports 212 can be positioned at or near the first end 214 of the sleeve portion 208.

The sleeve portion 208 can have a cylindrical or generally cylindrical shape. In some embodiments, one or more segments of the sleeve portion 208 have a different shape from one or more other segments of the sleeve portion 208. For example, one or more segments of the sleeve portion 208 can have a rectangular cross-sectional shape (e.g., as measured perpendicular to the outer housing axis 218), a triangular cross-sectional shape, an oval cross-section, and/or some other polygonal or curved cross-sectional shape.

With continued reference to FIG. 24, the sleeve portion 208 can have a plurality of segments between the first and second ends 214, 216 of the sleeve portion 208. A first segment 208a of the sleeve portion 208 can be positioned closes to the first end 214 of the sleeve portion 208. A second segment 208b of the sleeve portion 208 can be connected to the first segment 208a between the first segment 208a and the second end 216 of the sleeve portion 208. In some embodiments, the sleeve portion 208 includes a third segment 208c connected to the second segment 208b and positioned between the second segment 208b and the second end 216 of the sleeve portion 208. In some cases, the connection portion 210 of the outer housing 202 is connected to the third segment 208c of the sleeve portion 208. In some embodiments, each of the segments 208a, 208b, 208c of the sleeve portion 208 has a same or similar cross-sectional shape and/or area. In some embodiments, the cross-section of the third segment 208c is larger than the cross-sections of one or both of the first and second segments 208a, 208b. In some embodiments, the cross-section of the second segment 208b is larger than the cross-sections of one or both of the first and third segments 208a, 208c. In some embodiments, the cross-section of the first segment 208a is larger than the cross-sections of one or both of the second and third segments 208b, 208c. As illustrated, the cross-section of the second segment 208b can be greater than the cross-section of the first segment 208a but smaller than the cross-section of the third segment 208c.

Figure 26:
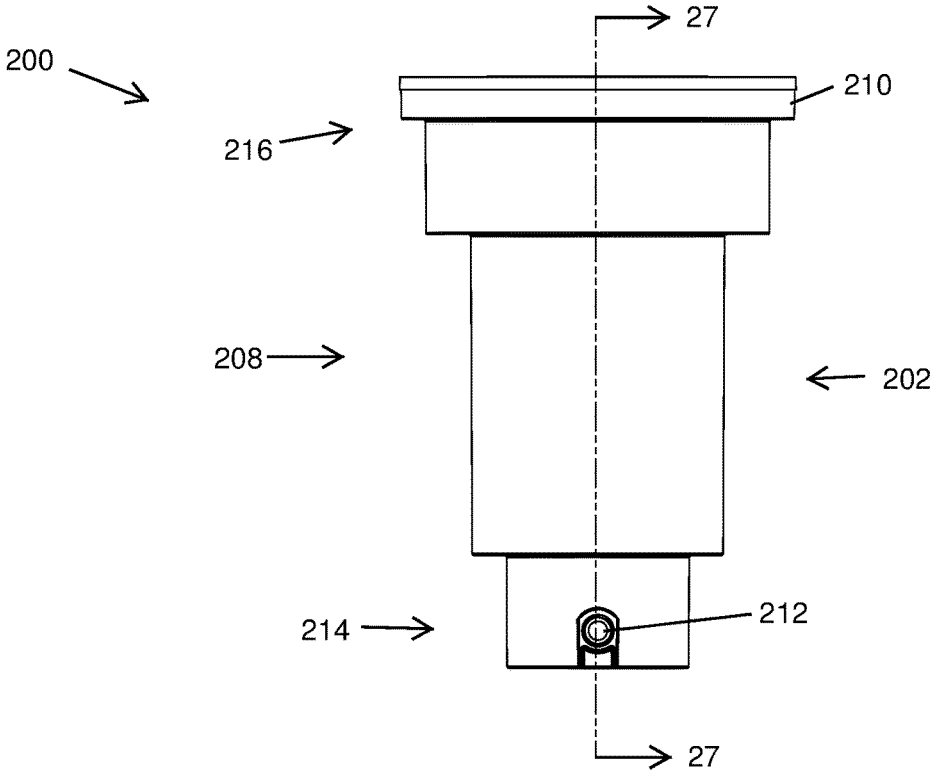
FIG. 26 is a front view of the in-grade light of FIG. 24.
Figure 27:
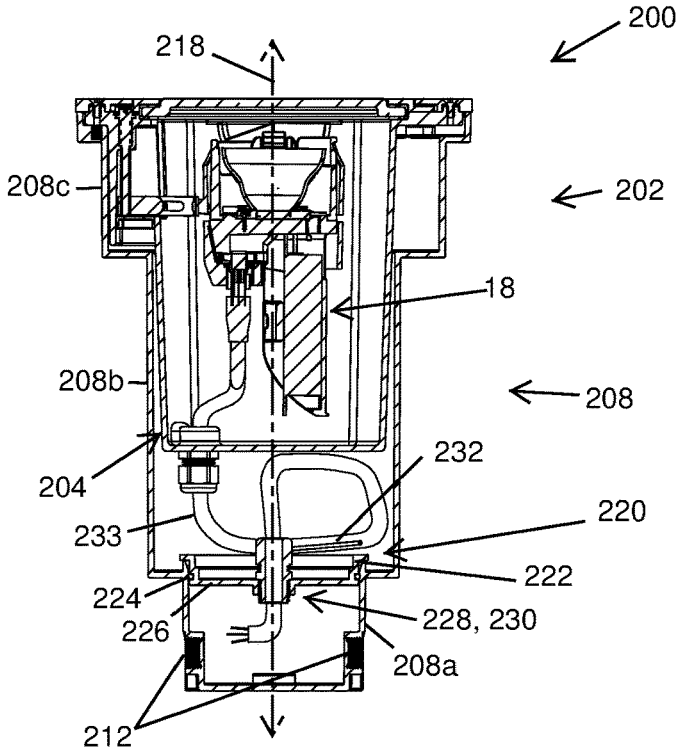
FIG. 27 is a side cross-section view of the in-grade light of FIG. 24 along the cut-plane 27-27 of FIG. 26.

As illustrated in FIGS. 26 and 27, the outer housing 202 can include a plurality of electrical ports 212. For example, the outer housing 202 can include two electrical ports 212. Three or more electrical ports 212 are also contemplated. The use of a plurality of ports 212 can facilitate easier hardwiring between two or more in-grade lights 200. The electrical ports 212 can positioned at or near the first end 214 of the sleeve portion 208. In some embodiments, the electrical ports 212 are positioned on opposite sides (e.g., as measured perpendicular to the outer housing axis 218) of the sleeve portion 208 from each other. One or more of the electrical ports 212 can be a stamped portion of the sleeve portion 208. The stamped portion can be punched out if or when the user (e.g., installation technician) decides to use the electrical port 212 in question. Unused electrical ports 212 can be left un-punched and impervious to fluid ingress or egress.

The electrical ports 212 can include threaded portions configured to engage with electrical fittings. In some embodiments, the electrical ports 212 are configured to engage with external electrical fittings in a fluid and/or liquid-tight manner.

Figure 28:
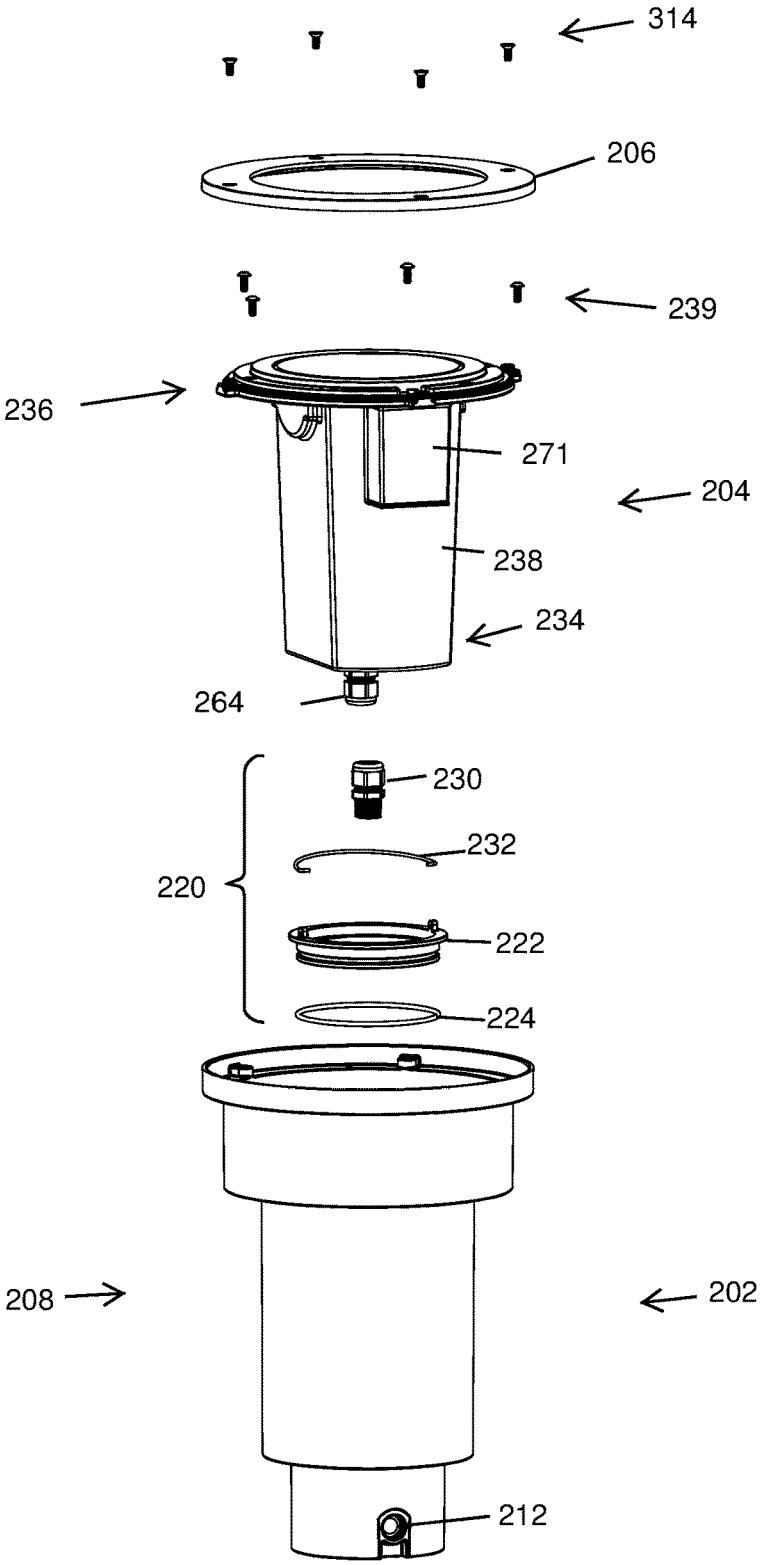
FIG. 28 is another exploded view of the in-grade light of FIG. 24.
Figure 41:
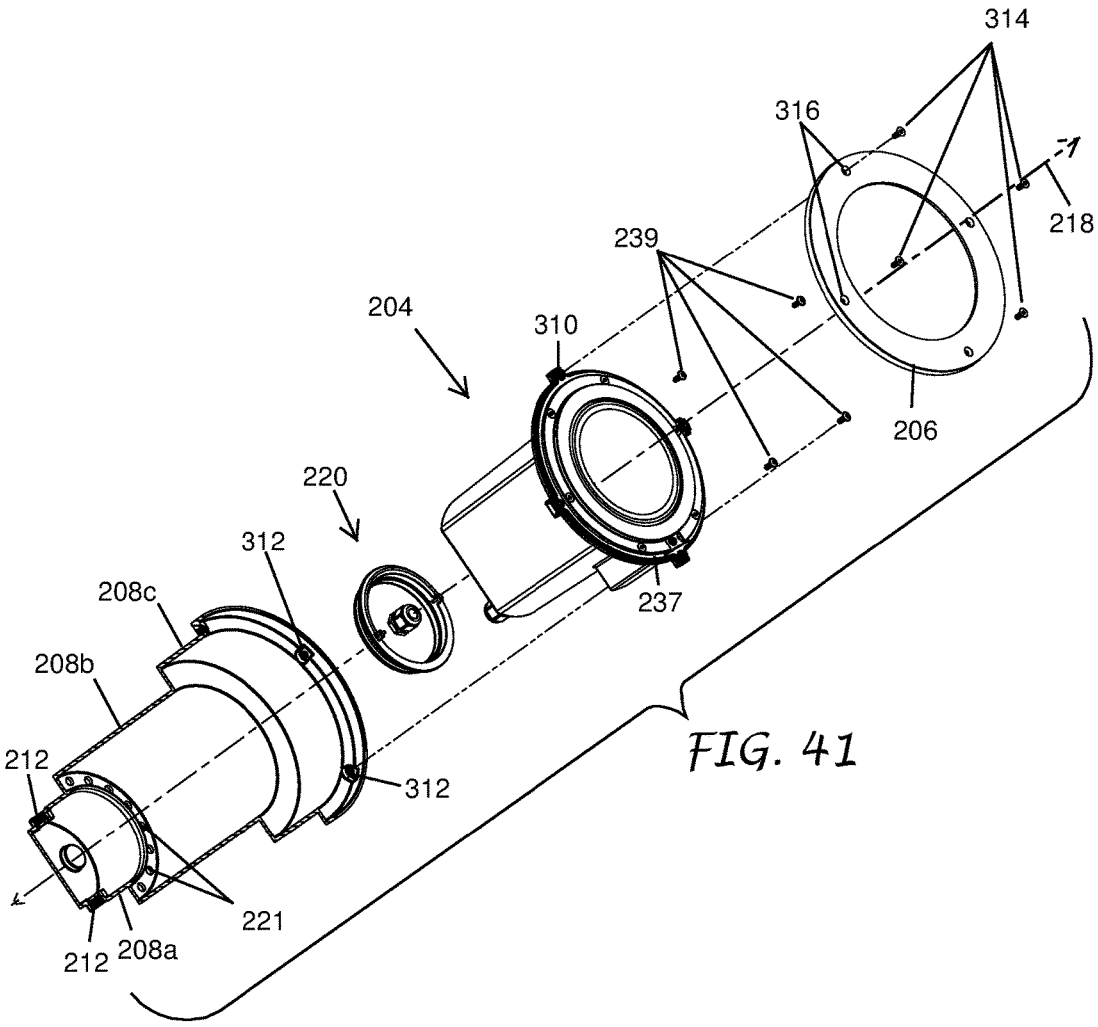
FIG. 41 is a top perspective exploded view of the in-grade light of FIG. 24, wherein the outer housing is shown in cross-section taken along the cut-plane 27-27 of FIG. 26.

In some embodiments, as illustrated in FIGS. 27 and 28, the in-grade light 200 includes an internal cap assembly 220. The internal cap assembly 220 can be configured to fluidly isolate one or more portions of the interior of the outer housing 202 from other portions of the interior of the outer housing 202. More specifically, in the illustrated embodiments, the internal cap assembly 220 can be used to at least partially isolate the first segment 208a of the sleeve portion 208 from the second segment 208b of the sleeve portion 208. In some embodiments, the sleeve portion (e.g., the second segment 208b) includes one or more drain holes 221 (FIG. 41). The drain holes 221 can be configured to permit moisture to pass from the interior of the outer housing 202 to the surrounding environment (e.g., to soil, concrete, and/or other surrounding media). Draining the interior of the outer housing 202 can reduce the risk of water accumulation within the outer housing 202. The cap 220 can be configured to inhibit or prevent ingress of moisture from the interior of the second or third segments 208b, 208c of the sleeve portion 208 into the first segment 208a. Inhibiting or preventing moisture from entering the first segment 208a of the sleeve portion 208 can reduce the risk of moisture contact with electrical connections within the first segment 208a to reduce the risk of electrical shorts and other adverse occurrences.

The internal cap assembly 220 can include a cap body 222. The cap body 222 can be sized to fit snugly with an inner surface of the sleeve portion 208 of the outer housing 202. For example, the cap body 222 can be sized to fit snugly with an inner surface of the first segment 208a of the sleeve portion 208. The internal cap assembly 220 can include a seal (e.g., an O-ring) 224 configured to fit between an outer surface of the cap body 222 and the inner surface of the first segment 208a. In some embodiments, the cap body 222 includes one or more grooves configured to receive the O-ring 224. The O-ring 224 can be configured to inhibit or prevent passage of fluid between the cap body 222 and the inner wall of the sleeve portion 208 (e.g., of the first segment 208a) when the internal cap assembly 220 is coupled with the sleeve portion 208. In some embodiments, the cap assembly 220 includes a handle 232 or other gripping structure configured to facilitate removal of the cap assembly 220 from the sleeve portion 208.

In some embodiments, the cap body 222 includes a sealing wall 226 (FIG. 27) separating one portion of the interior of the sleeve portion 208 from other portions of the interior of the sleeve portion 208. For example, the sealing wall 226 can fluidly separate the one or more electrical ports 212 from the inner housing assembly 204 of the in-grade light 200 when the in-grade light 200 is assembled. The sealing wall 226 can include at least one aperture 228. The aperture 228 in the sealing wall 226 can be configured to couple with a strain relief 230 or other structure configured to facilitate passing one or more wires through the sealing wall 226. The strain relief 230 can include one or more gaskets or other sealing structures configured to facilitate passing one or more wires or cords 233 through the sealing wall in a fluid or liquid-tight manner. In some embodiments, the strain relief 230 is connected to the aperture 228 in the sealing wall 226 via threads, detents, and/or friction fit. In some embodiments, one or more electrical connectors (e.g., wires) can be inserted through the one or more electrical ports 212 prior to installation of the outer housing 202 at an installation site (e.g., in the ground).

In-Grade Light Inner Housing

As discussed above, the in-grade light 200 can include an inner housing assembly 204. The inner housing assembly 204 can be configured to couple and decouple with the outer housing 202. In some embodiments, the inner housing assembly 204 is configured to pass at least partially through the second end 216 of the outer housing 202 during coupling with and decoupling from the outer housing 202. FIG. 28 illustrates an example wherein the inner housing assembly 204 has a first end 234 (e.g., lower end) and a second end 236 (e.g., upper end).

The inner housing assembly 204 can be constructed such that, when assembled, the inner housing assembly 204 hermetically (e.g., in an air-tight, or water-tight manner) seals an interior of the inner housing assembly 204 from an exterior of the inner housing assembly 204. In some embodiments, the inner housing assembly 204 is constructed such that it remains (e.g., or at least is capable of remaining) hermetically sealed before, during, and after installation of the inner housing assembly 204 in the outer housing 202 and/or removal of the inner housing assembly 204 from the outer housing 202.

Figure 29:
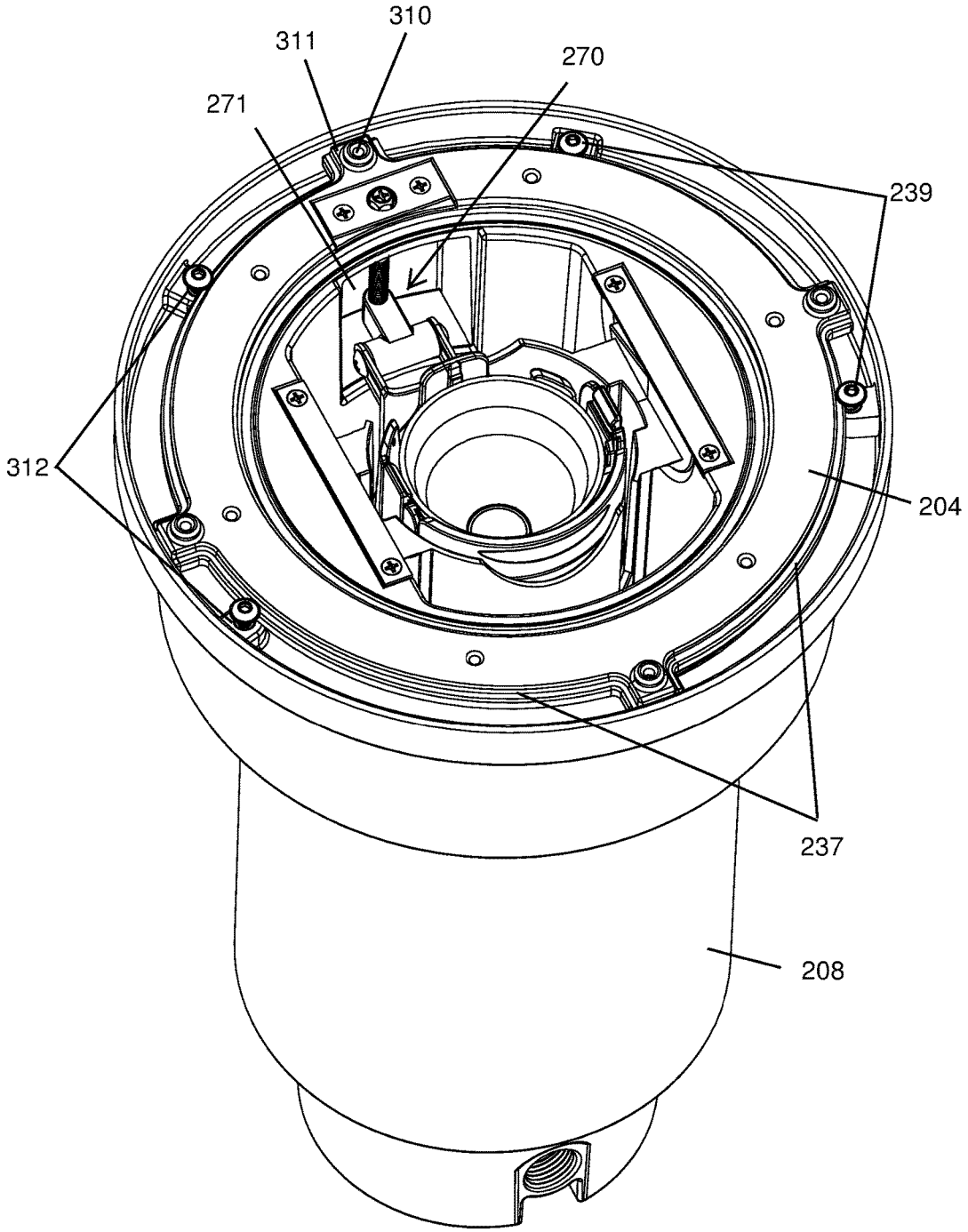
FIG. 29 is a top perspective view of the in-grade light of FIG. 24, wherein the lens assembly is removed.

The inner housing assembly 204 can be constructed such that it remains hermetically sealed before, during, and/or after tilting of the cartridge and/or rotation of the cartridge 18/inner housing assembly 204 with respect to the outer housing 202. For example, as illustrated in FIG. 29, the inner housing 204 (e.g., the inner housing body 238) can include a mating structure 237. The mating structure 237 can be, for example, a shoulder, flange, indentation, protrusion, aperture, and/or some other structure configured to facilitate mating between the inner housing 204 and the outer housing 202. In the illustrated embodiment, the mating structure 237 is a shoulder 237 configured to be held (e.g., compresses, wedged, and/or secured) between the heads of one or more fastener 239 and the outer housing 202 when the one or more fasteners 239 are connected to the outer housing 202. In some embodiments, an intermediate structure such as a washer can be positioned between the heads of the fasteners 239 and the mating structure 237 to hold the mating structure 237. The fasteners 239 can be configured to mate with one or more outer apertures 312 of the outer housing 202 (e.g., of the connection portion 210 of the outer housing 202).

In some configurations, the inner housing 204 is configured to be rotatable (e.g., about the outer housing axis 218) with respect to the outer housing 202 when the fasteners 239 and/or other mating structures are loosened. For example, in some embodiments, loosening of the fasteners 239, with or without removal of the fasteners 239 from the outer housing 202, permits rotation of the inner housing 204 with respect to the outer housing 202. Tightening of the fasteners 239 (e.g., such that the mating structure 237 is held) can facilitate rotational locking of the inner housing 204 with respect to the outer housing 202. In some embodiments, the shoulder 237 of the inner housing 204 and fasteners 239 form a sort of rail system wherein the shoulder 237 rides in the space between the heads of the fasteners 239 an portion (e.g., the connecting portion 210) of the outer housing 202. The inner housing 204 can be configured to rotate between many (e.g., infinite) different rotational positions with respect to the outer housing 202. In some configurations, interference between structures of the inner and outer housings 204, 202 can limit the rotational range of motion between the inner and outer housings 204, 202. For example, the outer apertures 310 (described in more detail below) may be positioned in protrusions 311 extending radially outward from the shoulder 237. In some cases, the protrusions 311 interfere with the fasteners 239 during rotation of the inner housing 204.

Figure 30:
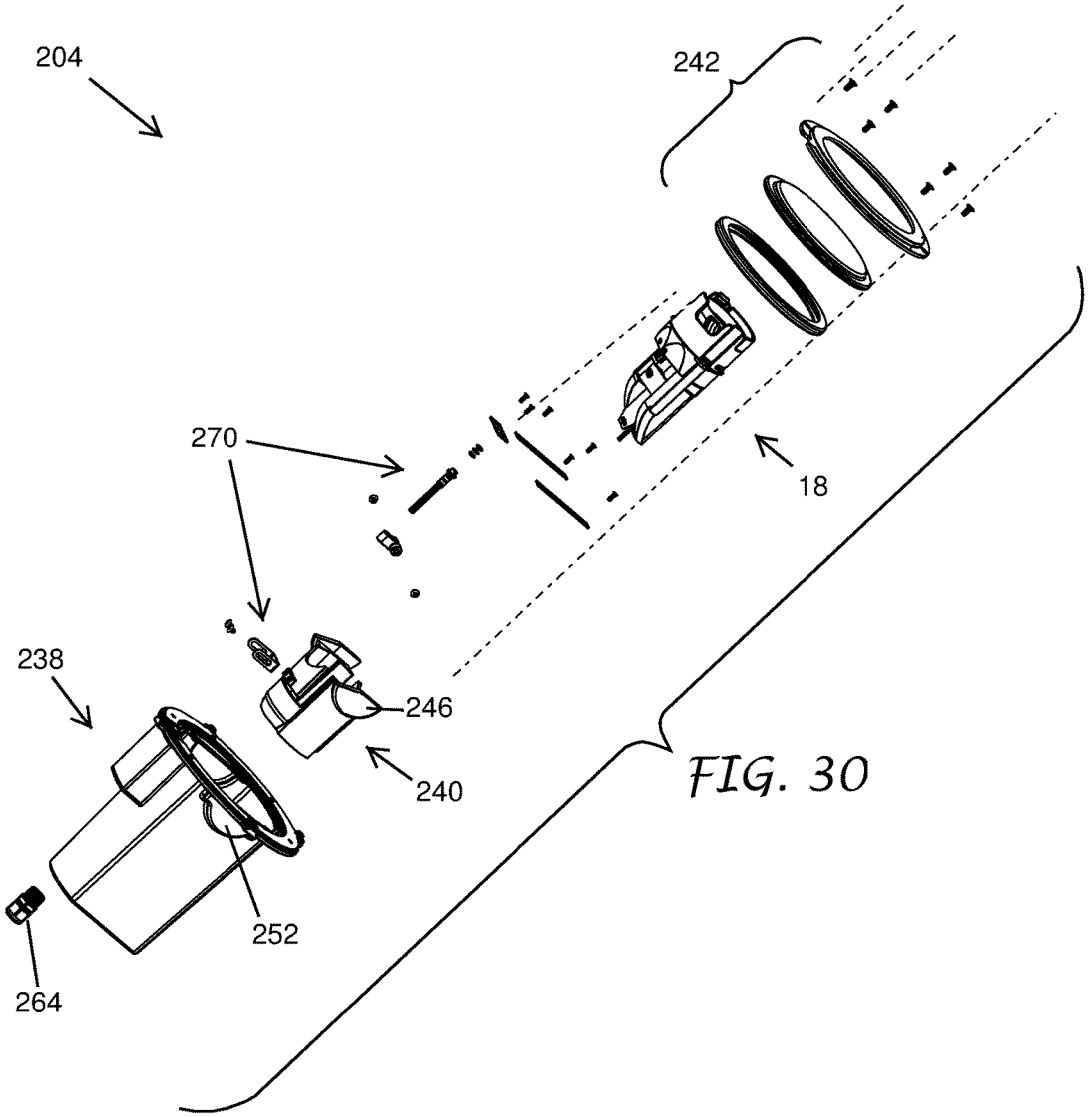
FIG. 30 is an exploded view of an inner housing assembly of the in-grade light of FIG. 24.

Moving to FIG. 30, the inner housing assembly 204 can include an inner housing body 238. The inner housing body 238 is hollow or at least partially hollow and is configured to receive the cartridge 18. In some embodiments, the inner housing assembly 204 includes a pivot frame 240. The pivot frame 240 can be configured to couple with one or both of the inner housing body 238 and the cartridge 18. The inner housing assembly 204 can include a tilting assembly 270 (FIGS. 33-39). The tilting assembly 270 can be configured to facilitate user control of the tilt angle of the cartridge 18 and/or pivot frame 240 with respect to the inner housing body 238 (e.g., and with respect to the outer housing 202), as is described in more detail below.

In some embodiments, the inner housing assembly 204 includes a lens assembly 242. The lens assembly 242 can be configured to connect to the inner housing body 238 at or near the second end 236 of the inner housing assembly 204. The inner housing assembly 204 can include a strain relief 264 positioned in an aperture of the inner housing body 238 and configured to facilitate passage of one or more electrical connectors (e.g., wires) between the interior and exterior of the inner housing assembly 204. The strain relieve 264 can be the same as or similar to the strain relief 230 in structure and/or in function. In some embodiments, the strain relief 264 is configured to permit passage of one or more wires in a fluid-tight or liquid-tight manner.

Pivot Frame

Figure 31:
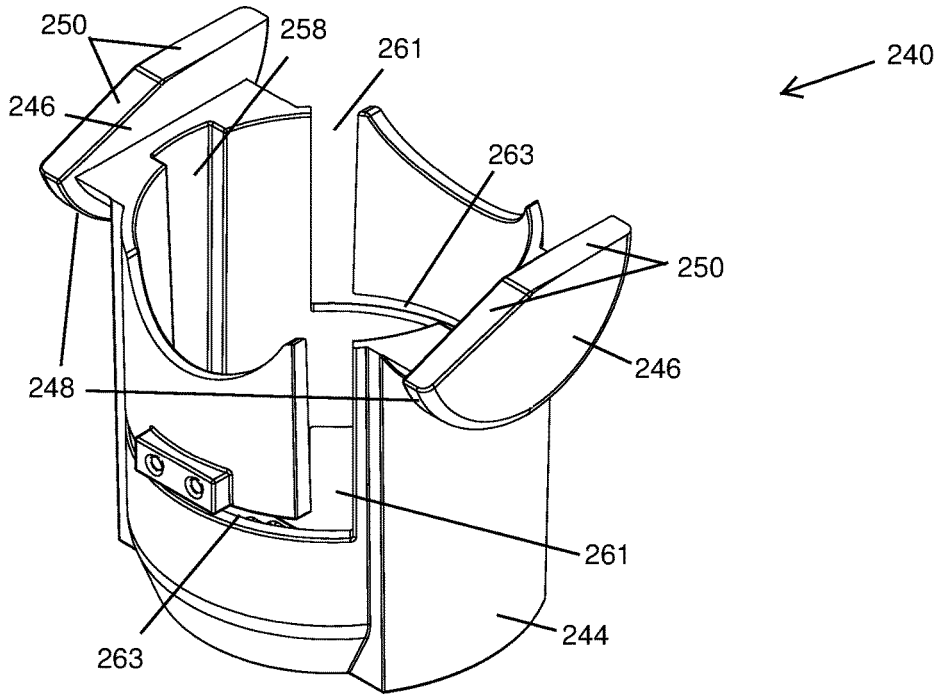
FIG. 31 is a perspective view of a pivot frame of the inner housing assembly of FIG. 30.
Figure 32:
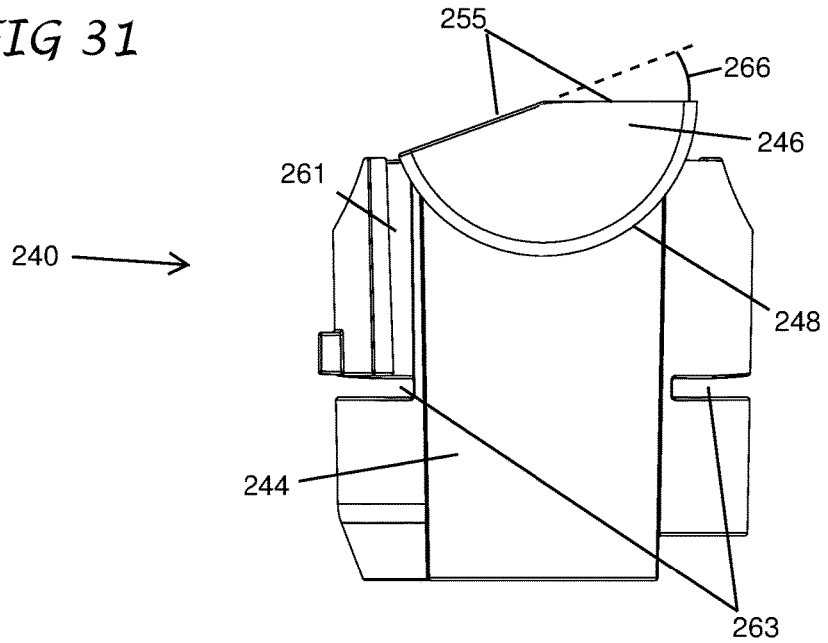
FIG. 32 is a side view of the pivot fame of FIG. 31.

As illustrated in FIGS. 30-32, the pivot frame 240 can include a sleeve portion 244. The sleeve portion 244 can have an elongate shape such as, for example, a generally cylindrical shape. The pivot frame 240 can include one or more tilting members 246. In some embodiments, the pivot frame 240 includes two tilting members 246 connected on opposite sides of the sleeve portion 244. In some embodiments, the pivot frame 240 (e.g., the sleeve portion 244 of the pivot frame 240) includes one or more mating features configured to facilitate removable connection between the sleeve portion 244 and a cartridge 18.

The tilting members 246 can be configured to engage with tilting structure on the inner housing body 238. For example, the tilting members 246 can be configured to fit at least partially within tilting pockets 252 in the inner housing body 238. In some embodiments, the tilting members 246 are configured to rotate within the pockets 252 between a first tilt position (FIG. 36) and a second tilt position (FIG. 37). In some embodiments, light from the cartridge is directed in a direction parallel or substantially parallel to the outer housing axis 218 when the pivot member 240 is in the first tilt position.

The tilting members 246 can include an arcuate surface 248 (FIG. 31). In some embodiments, the tilting members 246 include stop walls 250 configured to limit the range of tilting of the pivot frame 240. One or more of the tilting members 246 can include a plurality of stop walls 250. One or more of the stop walls 250 can be substantially straight in a plane parallel to the axis about which the pivot frame is configured to tilt. In some embodiments, each of the tilting members 246 includes at least two stop walls 250 offset from each other by a tilt angle 266 (FIG. 32). The tilt angle 266 can define the angular distance between the first tilt position (FIG. 36) and the second tilt position (FIG. 37). In some embodiments, the tilt angle 266 is at least 5°, at least 10°, at least 15°, at least 25°, and/or at least 45°. In some embodiments, the tilt angle 266 is approximately 20°.

Figure 33:
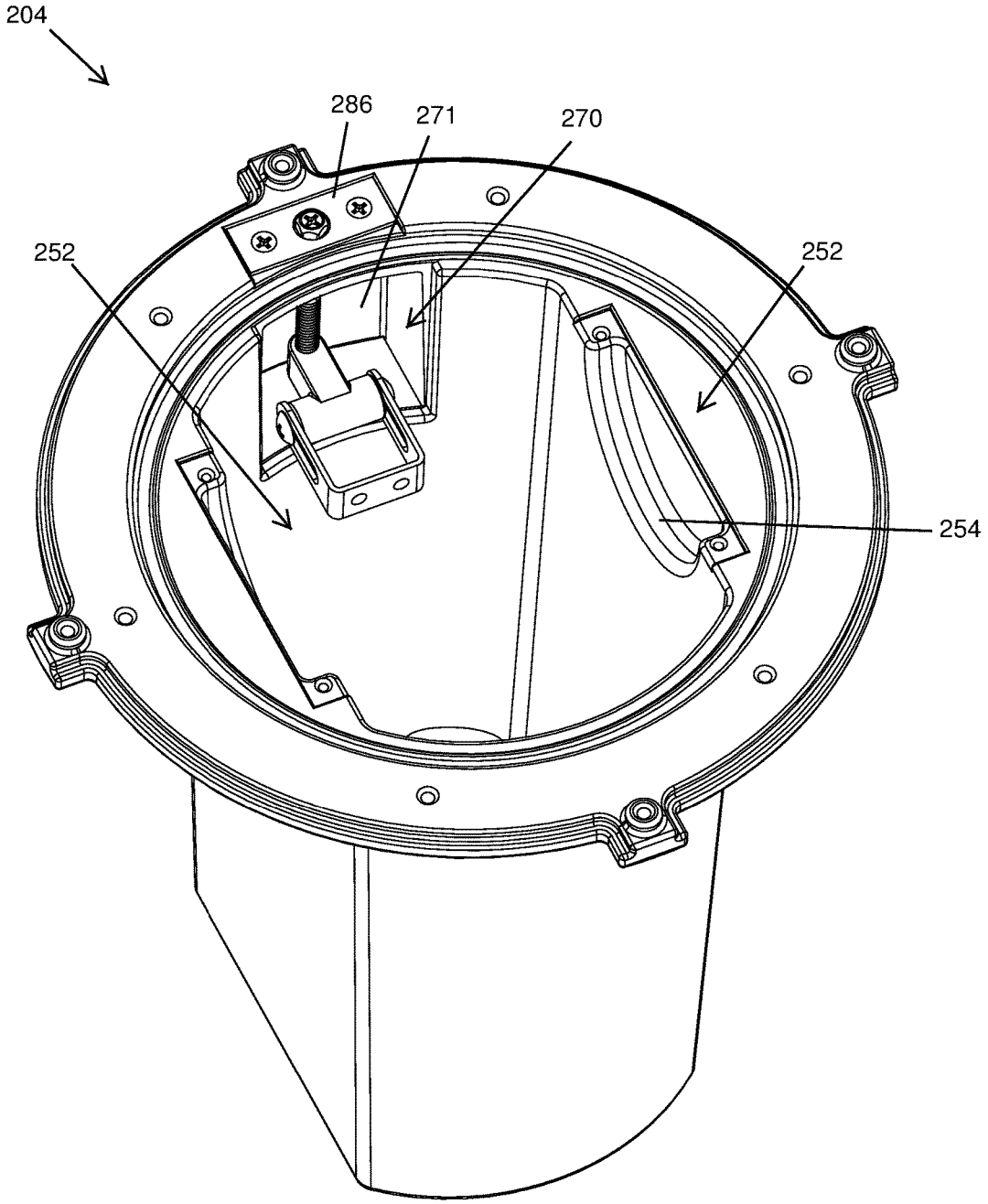
FIG. 33 is a top perspective view of the inner housing assembly of FIG. 30, wherein the pivot frame, cartridge, and lens assembly are removed.
Figure 34:
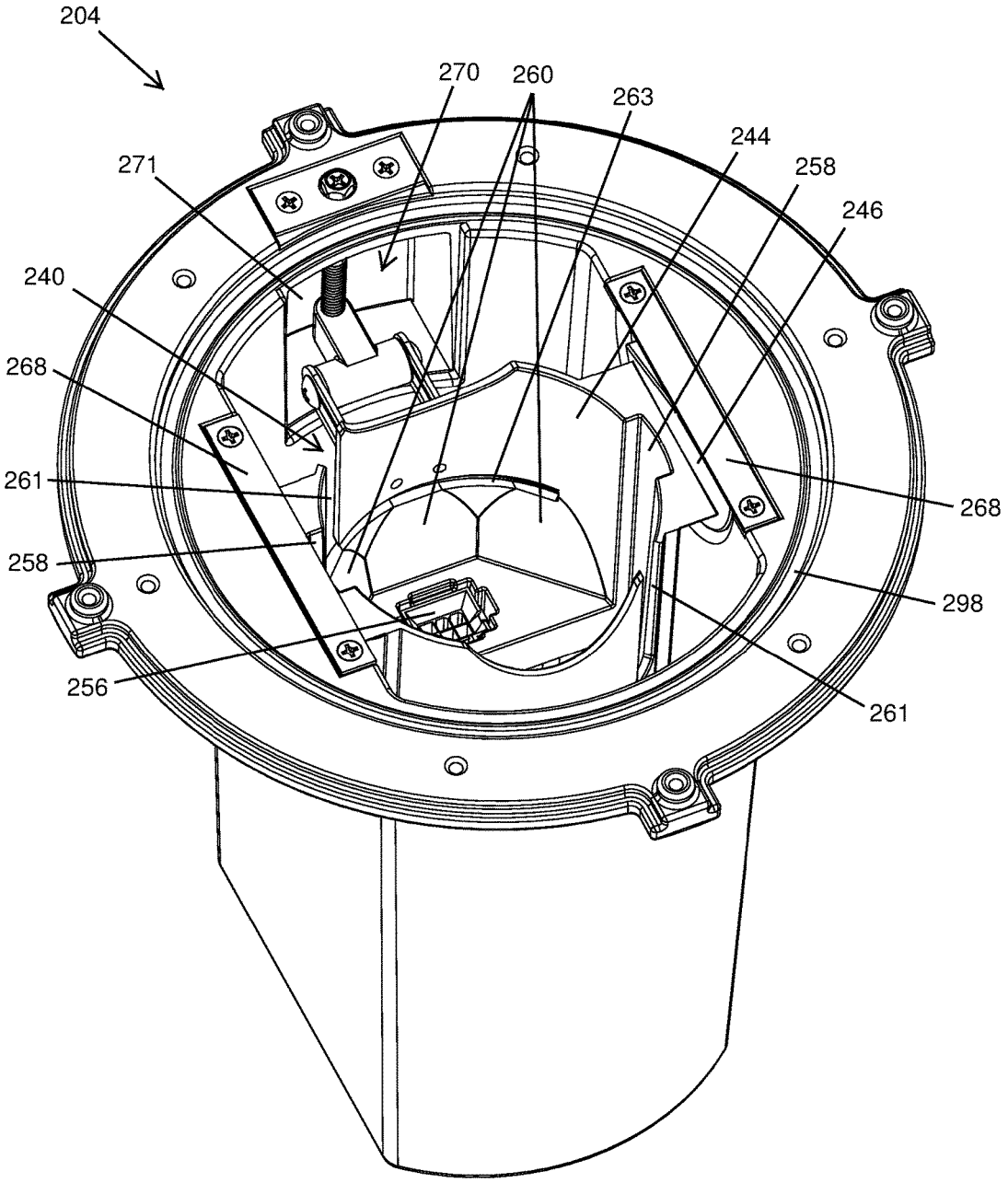
FIG. 34 is a top perspective view of the inner housing assembly of FIG. 30, wherein the cartridge and lens assembly are removed.
Figure 35:
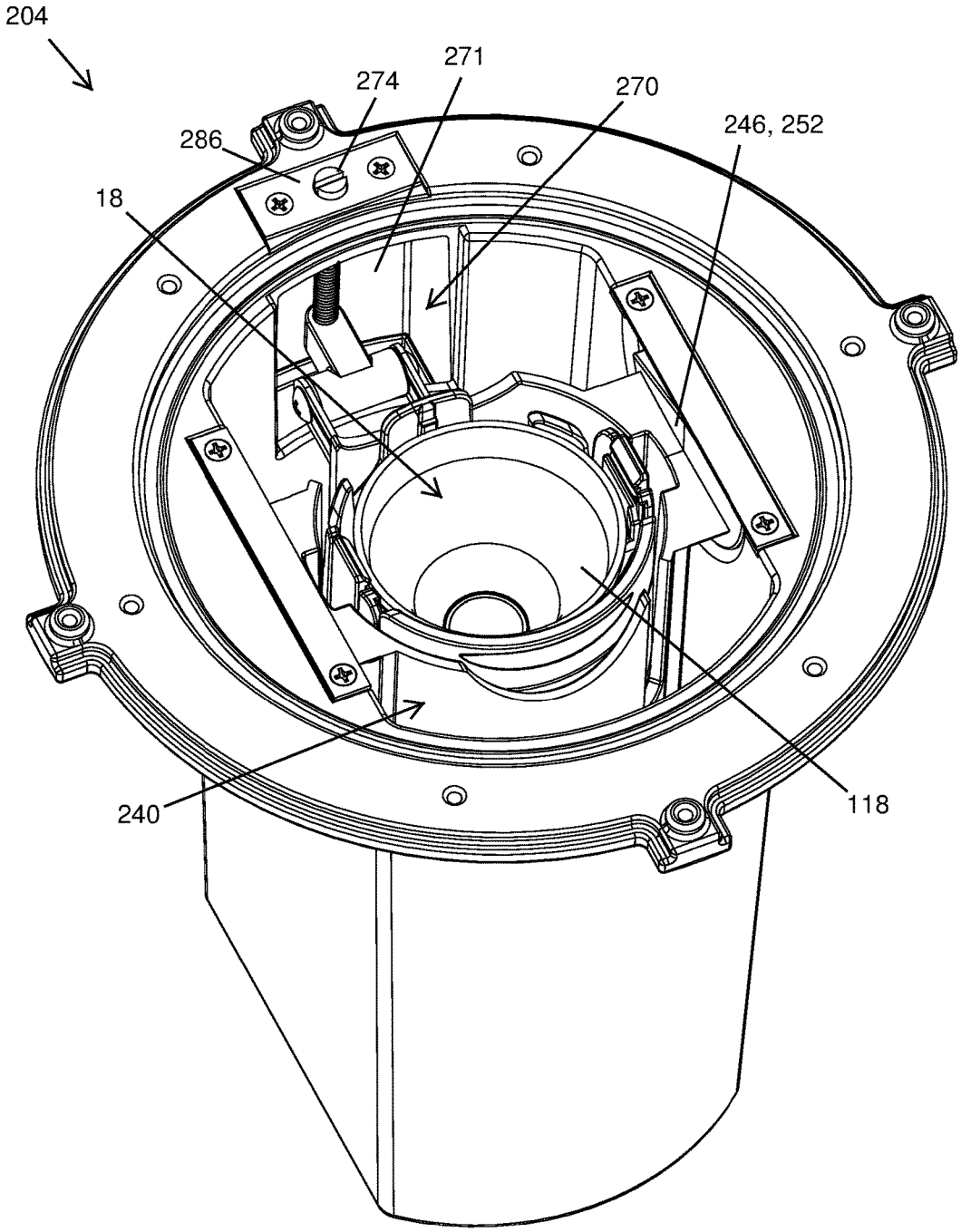
FIG. 35 is top perspective view of the inner housing assembly of FIG. 30, wherein the lens assembly is removed

Referring to FIGS. 33 and 34, the tilting pockets 252 can have arcuate surfaces 254 configured to engage the arcuate surface 248 of the tilting members 246 and facilitate tilting of the pivot frame 240 with respect to the inner housing body 238. As illustrated in FIGS. 34-35, in some embodiments the stop walls 250 are configured to abut a pivot frame retainer 268. The pivot frame retainer 268 can be, for example, an elongate panel or other structure connected to the inner housing body 238. In some embodiments, the pivot frame retainer 268 is removably connected to the inner housing body 238 via, for example, one or more fasteners. The pivot frame retainer 268 can spaced from the arcuate surfaces 254 of the tilting pockets 252. In some embodiments the pivot frame retainer 268 and arcuate surfaces 254 combine to form a bounded or substantially bounded wall configured to inhibit or prevent inadvertent removal of the tilting members 246 from the pockets 252. In some embodiments, the pivot frame retainer 268 is integral with the inner body housing 238. In some embodiments, the pivot frame retainer 268 could be one or more screws and/or other fasteners.

As best shown in FIG. 34, the pivot frame 240 can include an electrical connection (e.g., plug) 256. The plug 256 can be configured to connect (e.g., mechanically and/or electrically connect) to the electrical connector 112 of the cartridge 18. The sleeve portion 244 can include one or more channels 258 (e.g., alignment structures) configured to receive the alignment structure 84 of the cartridge 18. The channels 258 can be configured to inhibit or prevent misalignment between the cartridge 18 and the pivot frame 240 before, during, and/or after mating of the cartridge 18 with the pivot frame 240. In some embodiments, the pivot frame 240 includes one or more thermally-conductive pads 260 configured to operate in a same or similar manner as the pads 89 described above. As illustrated in FIG. 35, in some embodiments, the cartridge 18 does not include a lens, diffuser or other optical structure other than the beam reflector 118. In some embodiments, the cartridge 18 may not include a beam reflector.

In some embodiments, the cartridge 18 and pivot frame 240 are configured to couple and decouple in a manner similar to or the same as the manner described above with respect to the cartridge 18 and light housing 12. For example, as best illustrated in FIG. 31, the pivot frame 240 can include one or more tab openings 261 configured to receive a locking tab 90 of the cartridge 18. The pivot frame can include one or more tab slots 263 configured to function in a manner similar to or the same as the tab slot 92 of the light housing 12. The tab slot 263 can be in communication with the tab opening 261 to permit rotation of the collar 74 of the cartridge 18 within the pivot frame 240 between locked and unlocked positions. In some embodiments, when the collar 74 is in the locked position within the pivot frame 240, interference between the tab 90 and the walls of the tab slot 263 inhibits or prevents inadvertent movement of the cartridge 18 out from the pivot frame 240.

Tilting Assembly

As illustrated in FIGS. 33-37, the inner housing assembly 204 can include a tilting assembly 270. The tilting assembly 270 can be positioned at least partially within a tilt housing 271 (see also, FIG. 29) extending outward from the inner housing body 238. The tilting assembly 270 can be configured to facilitate user control over the tilt angle of the cartridge 18 with respect to the inner housing body 238. The tilting assembly 270 can include one or more user input portions configured to receive user input. The assembly 270 can include one or more components configured to translate the user input to tilt the cartridge 18 and/or pivot frame 240 in one or more directions.

Figure 38:
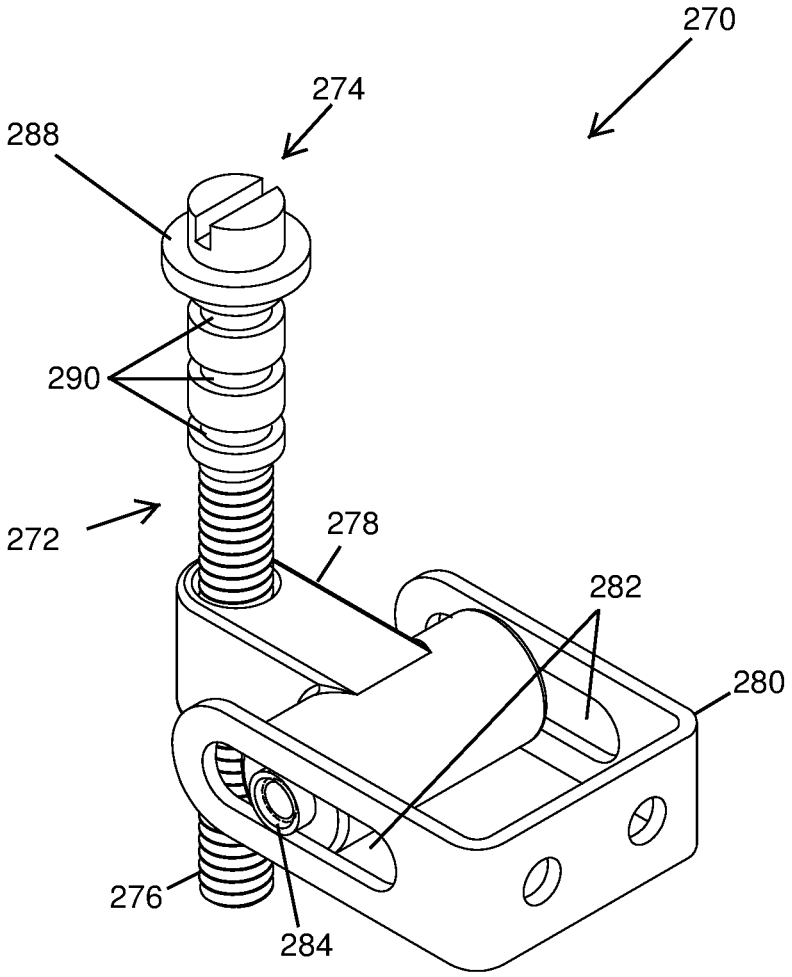
FIG. 38 is a perspective view of a tilting assembly of the in-grade light of FIG. 24.

As best illustrated in FIG. 38, the tilting assembly 270 can include an adjusting shaft 272. The adjusting shaft 272 can include a user input portion 274 positioned on a first end of the shaft 272. The user input portion 274 can be, for example, a flat head, Phillips head, Allen head, or other tool-receiving screw-tip head configured to receive a tool for rotation of the shaft 272. The adjusting shaft 272 can include a threaded portion 276 extending over a portion of the length of the shaft 272 (e.g., extending from a second end of the shaft toward the first end of the shaft).

The tilting assembly 270 can include a tilt-transmitting portion. For example, the tilt-transmitting portion can be a collar 278. The collar 278 can be adjustably connected to the shaft 272. For example, the collar 278 can include a threaded aperture configured to engage with the threaded portion 276 of the adjustment shaft 272. In some embodiments, rotation of the adjustment shaft 272 moves the collar 278 in a direction parallel to the rotation axis of the adjustment shaft 272. In some embodiments, the rotation axis of the adjustment shaft 272 is parallel or substantially parallel to the outer housing axis 218 when the in-grade light 200 is assembled.

In some embodiments, the tilting assembly 270 includes a structure configured to translation motion of the collar 278 to tilting of the pivot frame 240 and/or of the cartridge 18. For example, the tilting assembly 270 can include a tilt bracket 280. The tilt bracket 280 can be connected to (e.g., via fasteners, welding, co-molding, adhesives, or otherwise) the pivot frame 240 and/or directly to the cartridge 18. The tilt bracket 280 can include one or more elongated slots 282 or other structure configured to slidingly engage with a portion of the collar 278. For example, the collar 278 can include one or more protrusions 284 configured to fit at least partially in the slots 282. In some embodiments, the protrusions 284 are configured to receive fasteners to inhibit or prevent inadvertent disconnection between the collar 278 and the slots 282. In some embodiments, fasteners are inserted through the slots 282 into the collar 278 and the fasteners ride within the slots 282.

Figure 36:
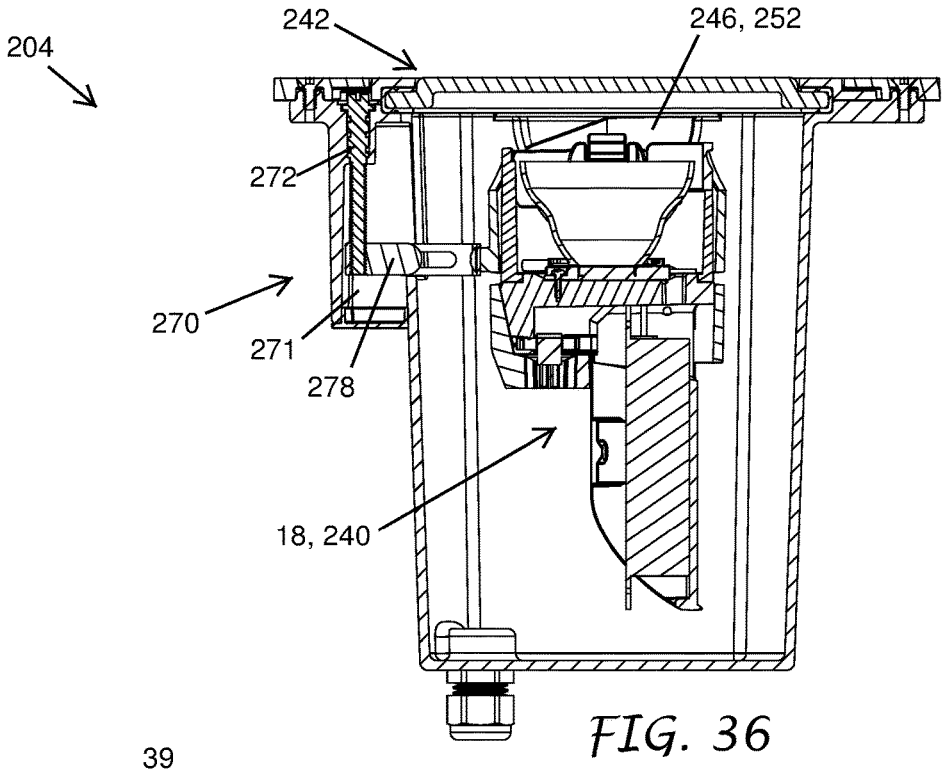
FIG. 36 is a side cross-section view of the inner housing assembly of FIG. 30 along the cut-plane 27-27 of FIG. 26.
Figure 37:
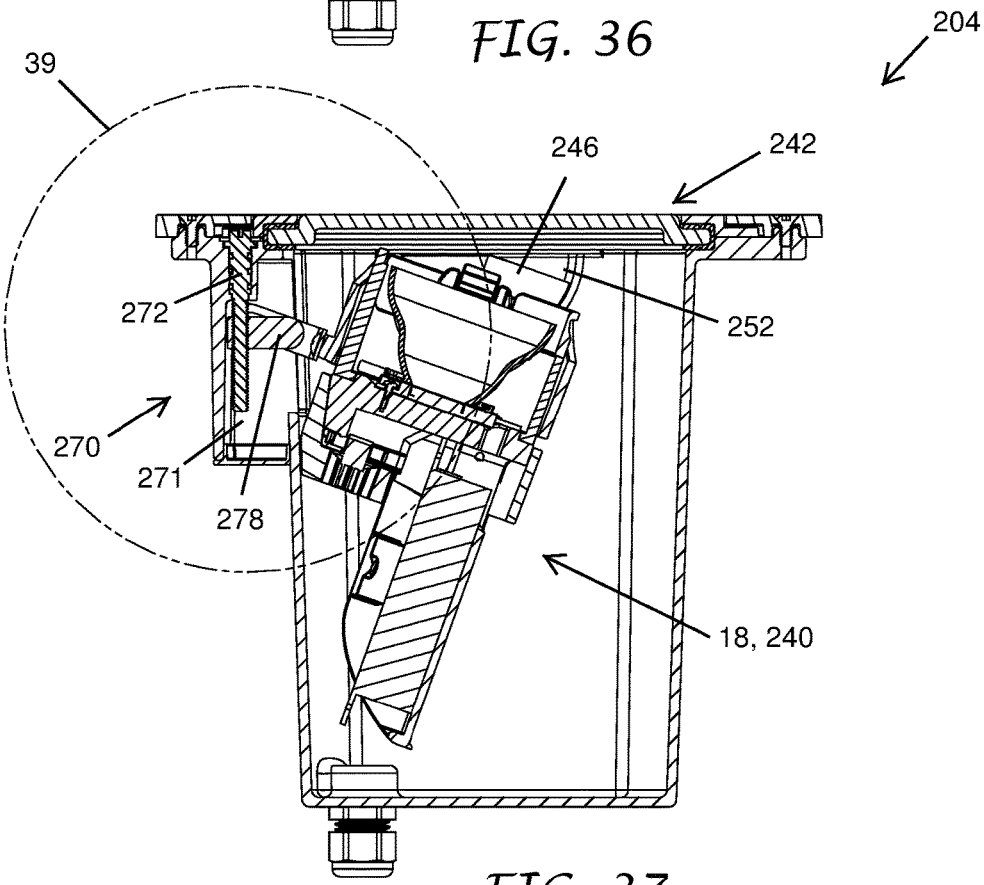
FIG. 37 is a side cross-section view of the inner housing assembly of FIG. 30 along the cut-plane 27-27 of FIG. 26, wherein the pivot frame is tilted.

Comparing FIGS. 36 and 37, rotation of the adjustment shaft 272 can move the collar 278 along the threaded portion 276 of the adjustment shaft 272. Movement of the collar 278 toward the lens assembly 242 (e.g., upward) can tilt the pivot frame 240 in a clockwise direction in the frame of reference of FIGS. 36 and 37 (e.g., the top end of the pivot frame 240 and cartridge 18 tilt away from the tilting assembly 270). Movement of the collar away from lens assembly 242 (e.g., downward) can tilt the pivot frame in a counterclockwise direction in the frame of reference of FIGS. 36 and 37 (e.g., the top end of the pivot frame and cartridge 18 tilt toward the tilting assembly 270). Movement of the collar 278 downward can cause the collar 278 to ride in the slots 282 of the bracket 280 in a direction away from the pivot frame 240. In some embodiments, movement of the collar 278 upward can cause the collar 278 to ride in the slots 282 of the bracket 280 in a direction toward from the pivot frame 240. The extent to which the pivot frame 240 tilts toward and away from the tilting assembly 270 can be limited by the engagement of the stop walls 250 with the pivot frame retainers 268, as described above.

Figure 39:
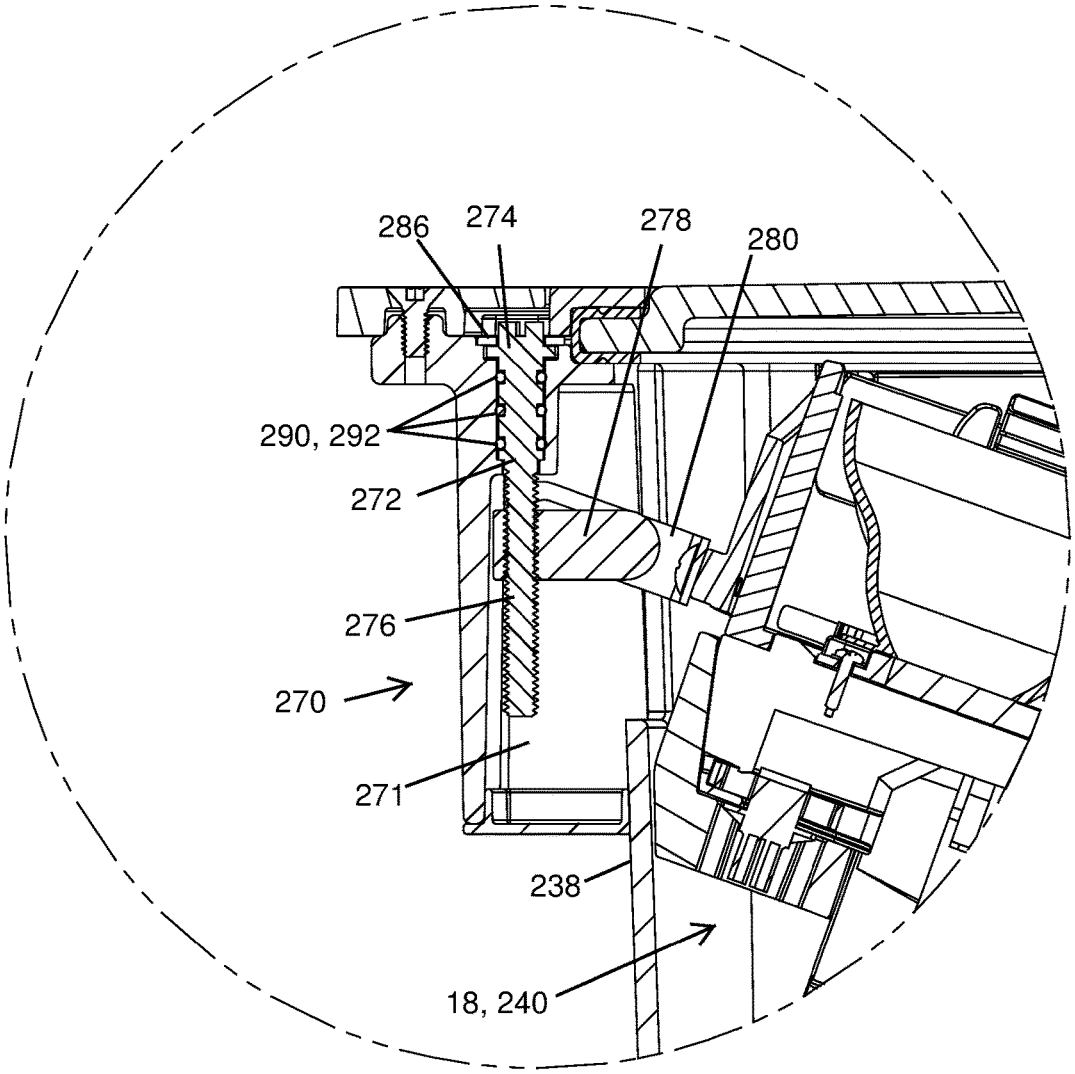
FIG. 39 is a close-up view of cross-section view of the inner housing assembly of FIG. 37.

As illustrated in FIGS. 33 and 39, the tilting assembly 270 can include a shaft retainer 286 configured to reduce or eliminate movement of the shaft 272 in a direction toward the lens assembly 242 before, after, and/or during rotation of the shaft 272. In some embodiments, the adjustment shaft 272 includes a flange 288 (FIG. 38) or other structure configured to abut the retainer 286 and/or some other portion of the inner housing assembly 204 to inhibit or prevent movement of the adjustment shaft 272 parallel to the axis of rotation of the adjustment shaft.

FIGS. 38 and 39 illustrate an embodiment of the tilting assembly 270 that can include one or more sealing structures configured to inhibit or prevent ingress or liquid or other fluids into the inner housing assembly 204. For example, the adjustment shaft 272 can include one or more (e.g., two, three, four, etc.) grooves 290 configured to engage O-rings 292 or other sealing structures. The O-rings 292 can be configured to inhibit or prevent ingress of moisture or other environmental hazards into the inner housing assembly 204 around the adjustment shaft 272.

The tilting assembly 270 can be used in combination with lights other than in-grade lights. For example, the tilting assembly 270 can be incorporated into and/or used in conjunction with lights mounted into/on a wall or light post. In some cases, the tilting mechanism 270 can be used in a subterranean setting (e.g., under a translucent or transparent walkway). In some cases, the tilting mechanism 270 be used in submarine settings (e.g., pool lights, pond lights, etc.). In one or all of the applications of the tilting mechanism 270, the tilting mechanism 270 is configured to facilitate tilting or aiming of the light without breaking a seal of the inner housing assembly and without moving the outer housing.

Methods of Assembling the In-Grade Light

Figure 40:
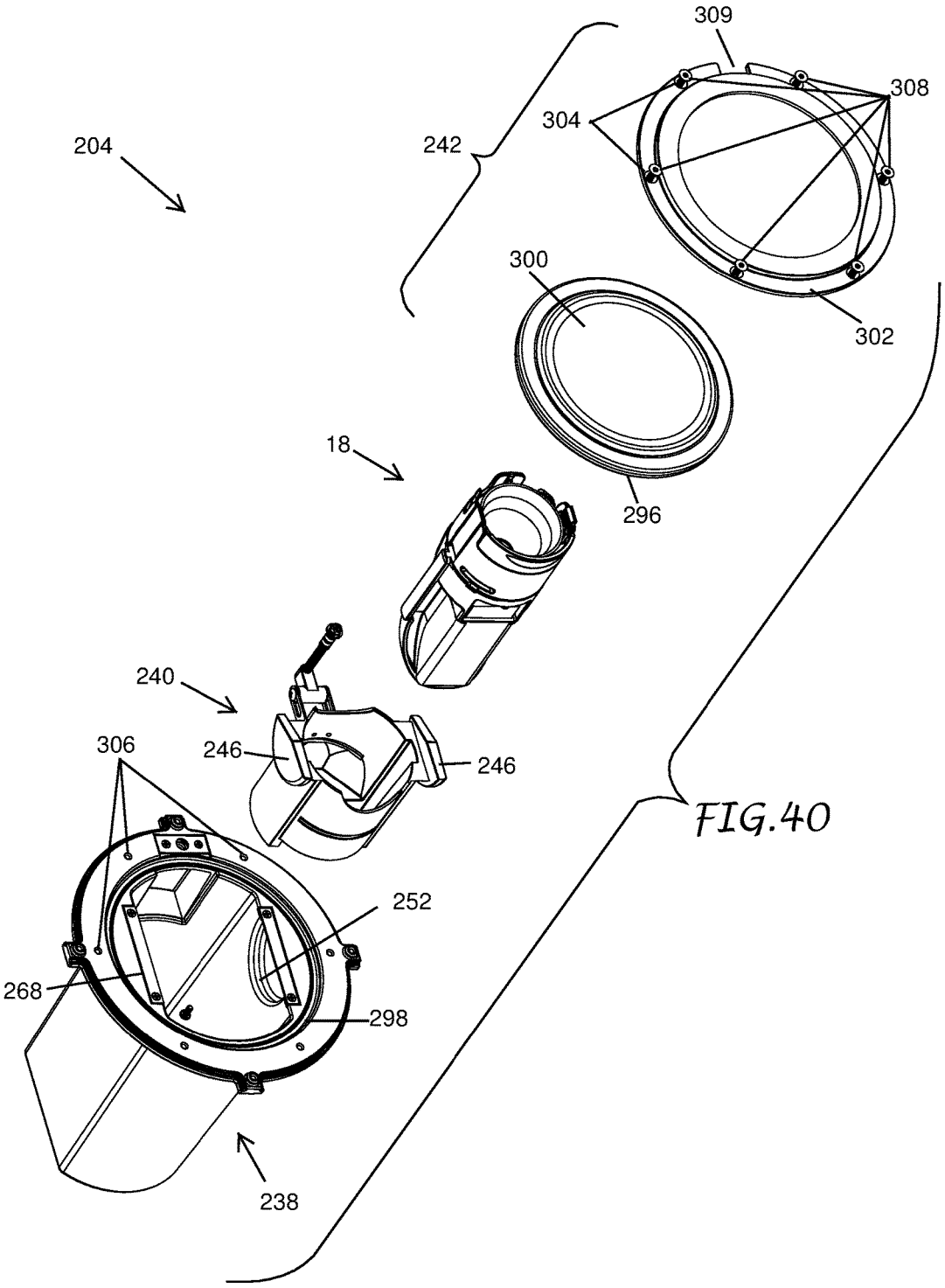
FIG. 40 is a top perspective exploded view of the inner housing assembly of FIG. 30.

Referring now to FIG. 40, the inner housing assembly 204 can be assembled prior to inserting the inner housing assembly 204 into the outer housing assembly 202. In some cases, all or a portion of the inner housing assembly 204 can be disassembled while positioned in the outer housing 202.

The pivot frame 240 can be inserted into the inner housing body 238. The tilting members 246 can be positioned within the tilting pockets 252 of the body 238. The pivot frame retainers 268 can be installed on the inner housing body 238 to inhibit or prevent removal of the tilting members 246 from the pockets 252. The tilting assembly 270 can be connected to the pivot frame 240 and/or to the inner housing body 238 before or after the pivot frame 240 is positioned within the inner housing body 238.

The cartridge 18 can be coupled with the pivot frame 240 in the manner described above. In some embodiments, the cartridge 18 does or does not include a handle 76 and collar 74 as described above. Coupling of the cartridge 18 with the pivot frame 240 can electrically connect the cartridge 18 to the pivot frame 240 and/or to some other portion of the inner housing assembly 204.

The lens assembly 242 can be installed on the inner housing body 238 to seal the interior of the inner housing assembly 204. For example, the lens assembly 242 can be installed on the inner housing assembly 204 using fasteners, detents, friction fittings, or other releasable connection methods or structures.

In some embodiments, the lens assembly 242 includes a lens seal 296. The lens seal 296 can have an annular shape and can be sized to engage with a portion of the inner housing body 238. For example, the lens seal 296 can be configured to engage with a seal groove 298 in the second end 236 of the inner housing body 238 (FIG. 34). A lens 300 can be positioned between the lens seal 296 and a lens frame 302. The lens frame 302 can be configured to connect to the second end 236 of the inner housing body 238. For example, the lens frame 302 can include one or more inner apertures 304 configured to receive fasteners. The one or more inner apertures 304 can be distributed to align with one or more inner apertures 306 on the second end 236 of the inner housing body 238. Fasteners 308 can be inserted through the inner apertures 304, 306 of the lens frame 302 and inner housing body 238 and tightened to compress the lens seal 296 between the lens 300 and the inner housing body 238. In some embodiments, the lens frame 302 includes one or more gaps or spaces 309 (FIG. 40) in its perimeter. The space 309 can be sized and/or positioned to facilitate user access to the adjustment shaft 272 after the frame 302 is connected to the inner housing body 238.

As best illustrated in FIG. 41, a method of assembling the overall in-grade light 200 can include inserting the internal cap assembly 220 into the outer housing 202. For example, the internal cap assembly 220 can be inserted at least partially into the first segment 208a of the sleeve portion 208 of the outer housing 202. The lens frame 302 and/or inner housing body 238 can include one or more connection structures configured to facilitate connection between the inner housing 204 and the outer housing 202. For example, as described above, the inner housing body 238 can include a shoulder 237 or other mating structure configured to engage with the fasteners 239 when the fasteners 239 are inserted into the outer apertures 312 of the outer housing 202.

Optionally, cover 206 can be connected to one or both of the inner and outer housings 202, 204. For example, the cover 206 can include one or more apertures 316 configured to align with the outer apertures 310, 312 of one or both of the inner and outer housings 202, 204. In some embodiments, the fasteners 314 can be inserted through the cover 206, and the inner housing 204 to connect the cover 206 to the inner housing 204. In some embodiments, the cover 206 can be connected directly or indirectly (e.g., through inner housing 204) with the outer housing 202 using one or more fasteners. The cover 206 can be decorative to match a color scheme of the installation site. The cover 206 may include various features such as a ring, a cowling, fins, spokes, a full cover with optics, and/or other ornamental or function features. In some embodiment, the cover 206 "hides" or covers the fasteners 308 when installed on the in-grade light 200. In some embodiments, the cover 206 covers the adjustment shaft 272 (e.g., the user input portion 274 of the adjustment shaft 272).

To remove the inner housing 204 from the outer housing 202, the user may disconnect the fasteners 239 from the inner and/or outer housings 202, 204 and lift the inner housing 204 from the outer housing 202. In some embodiments, one or more electrical connections (e.g., plugs or other connections) between the inner housing 202 and some other portion of the in-grade light 200 can be disconnected to completely remove the inner housing 204 from the in-grade light 200. Each of the steps of inserting and removing the inner housing 204 from the outer housing 202 can be performed without unsealing the inner housing 204. In some embodiments, the cover 206 may be removed before or after removing the inner housing 204 from the outer housing 202.

To adjust the tilt of the pivot frame, a user can remove the cover 206, if present. If no cover 206 is used, the user may use a tool to rotate the adjustment shaft 272 of the tilt assembly 270. This adjustment to the tilt of the pivot frame 240 and/or cartridge 18 can be performed without unsealing the inner housing 204. In some cases, a user can rotate the entire inner housing 204 with respect to the outer housing 202 (e.g., about an axis or rotation parallel or substantially parallel to the outer housing axis 218) by first loosening or removing the fasteners 239. Upon loosening or removing of the fasteners 239, the user can rotate the inner housing 204 to different desired rotational position. The tilt housing 271 can rotate freely within the third segment 208c of the sleeve portion 208 of the outer housing 202 during rotation of the inner housing 204. Rotation of the inner housing 204 as described above can be performed without unsealing the inner housing 204.

Installing, removing, and adjusting the position of the inner housing 204 and/or its components without unsealing the inner housing 204 can greatly improve the performance of the in-grade light 200. The electrical components of the inner housing 204 (e.g., the cartridge 18 and its subcomponents) can be isolated from the surrounding environment and its hazards. Any repair and replacement of the components of the inner housing 204 can be performed in a controlled environment away from the installation site of the in-grade light 200. In some cases, replacement inner housings 204 can be swapped with existing inner housings 204 without the need for the installer to open any of the inner housings 204.

Methods of Installing the In-Grade Light

In some applications, the outer housing 202 may first be installed before other components of the in-grade light 200 are assembled. For example, in a landscaping or walkway application, it may be desirable to install the outer housing 202 in the ground before assembling the remaining in-grade light components. Installing the outer housing 202 in concrete or other materials may present challenges, as it may be difficult to properly chair (e.g., align) the upper end of the outer housing 202 with the surface of the walkway or other installation site.

Figure 42:
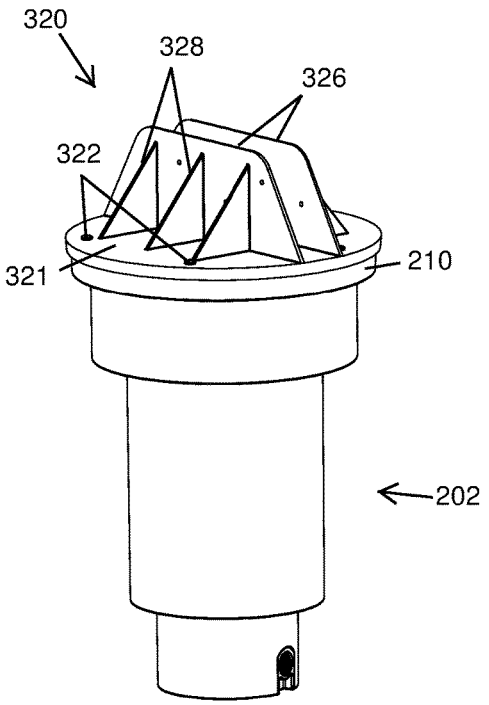
FIG. 42 is a perspective view of the outer housing of the in-grade light of FIG. 24, wherein an installation cap is connected to the open end of the outer housing.
Figure 43:
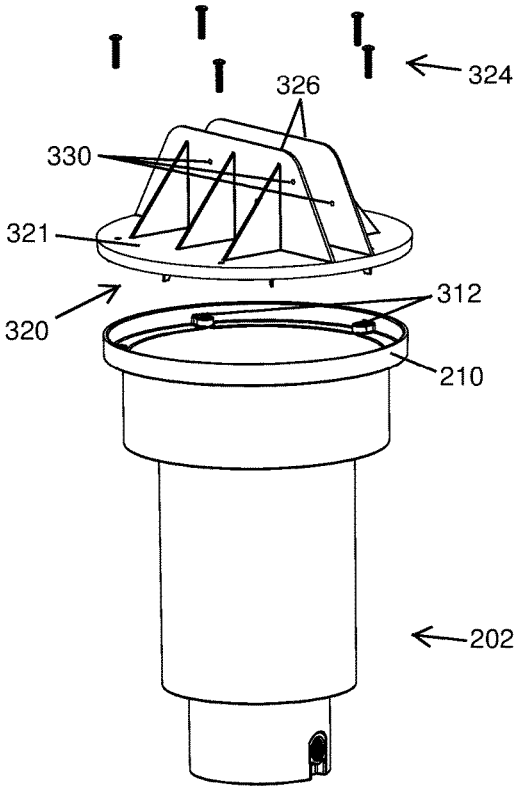
FIG. 43 is an exploded view of the assembly of FIG. 42.
Figure 44:
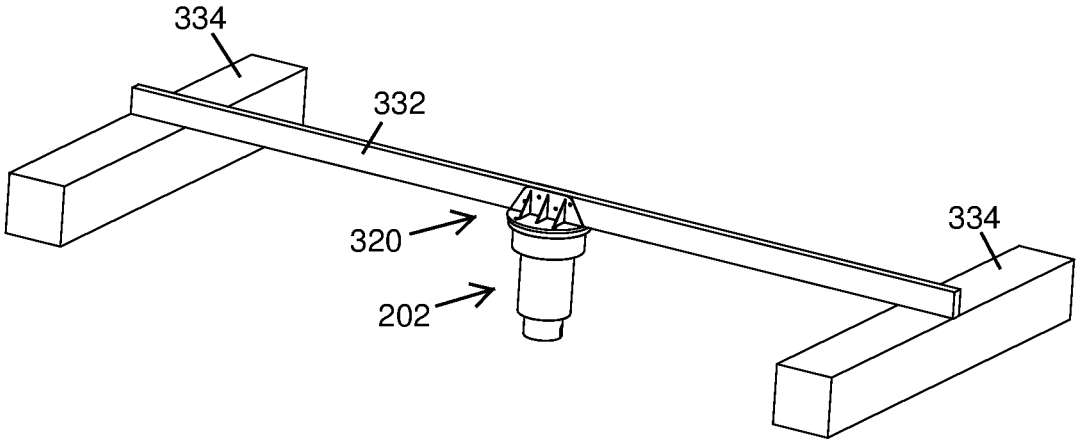
FIG. 44 is a perspective view of the assembly of FIG. 42 connected to a chairing structure and supports.

FIGS. 42-44 illustrate a method of installing the outer housing 202 and associated installation structures. As illustrated, the installation structures can include an installation cap 320. The installation cap 320 can include a cover portion 321 having a generally planar shape. In some embodiments, the cover portion 321 is sized to cover all or substantially all of the upper end and/or connection portion 210 of the outer housing 202. The cover portion 321 can include one or more apertures 322 configured to align with the outer apertures 312 of the outer housing 202. Fasteners 324 can be inserted through apertures 322 into the outer apertures 312 of the outer housing 202 to connect the installation cap 320 to the outer housing 202. In some embodiments, other connection methods and structures (e.g., detents, friction fittings, threading, etc.) are used in addition to or instead of the fasteners 324.

The installation cap 320 can include one or more upward walls 326 extending from the cover portion 321. The upward walls 326 can be structurally supported by one or more ribs 328 extending between the upward walls 326 and the cover portion 321. The upward walls 326 can include one or more apertures 330 configured to facilitate connection of the upward walls 326 to a chairing structure 332 (e.g., a wood beam).

As illustrated in FIG. 44, the chairing structure 332 can be braced and/or supported by one or more supports 334 (e.g., blocks, beams, or other structures). The outer housing 202 can be suspended in the installation site using the installation cap 320 and structures 332, 334. Concrete, dirt, clay, or other materials can be filled in around the outer housing 202 to reduce the likelihood that the upper end of the in-grade light 200 is misaligned with the surface of the finished walkway or other installation feature. Upon pouring and/or setting of the concrete/dirt, the installation cap 320 can be removed and the other components of the in-grade light 200 can be installed. In some cases, the cover portion 321 may have at least one width greater than the diameter of the outer housing 202. In some embodiments, an outer width or diameter of the cover portion 321 is slightly larger than the outer diameter of the cover 206 to facilitate flush installation of the cover 206 with the surface of the concrete or other material surrounding the outer housing 202.

In some embodiments, wires and/or other electrical connection structures can be connected to the outer housing 202 prior to pouring of the concrete/dirt. For example, wiring can be inserted through the one or more electrical ports 212 and the strain relief 230.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

What is claimed is:

1. A light [assembly] *fixture* comprising:

an outer housing [having] *including*:

a first end configured to be positioned at or below a ground level or [wall] surface when *the outer housing is* installed; *and* a second end [opposite] *different from* the first end[:], *the second end including* an outer [housing] axis extending [through] *away from* the [first and] second [ends of the outer housing] *end*;

*a tilt assembly including an adjustment; and*

[an] *a hermetically sealed* inner housing [assembly having] *including*:

a first end;

a second end *different from the first end and including a lens*; *and*

[an inner housing body extending between the first and second ends of the inner housing assembly and forming a hermetic seal with the second end;]

a light cartridge [positioned within the inner housing body and having a lighting element] *including one or more light emitting diodes* (*LEDs*) configured to emit light through the *lens of the* second end of the inner housing [assembly; and],

[a tilt assembly connected to the inner housing body and having a user input portion configured to receive user input,] *wherein* the tilt assembly *includes an outside portion accessible and adjustable by a user from outside the hermetically sealed inner housing, and an inside portion responsive to the outside portion, the tilt assembly collectively* configured to tilt the *one or more* light [cartridge] *emitting diodes* (*LEDs*) between a first tilt position and a second tilt position *different from the first tilt position* with respect to the outer [housing] axis [upon receipt of the user input] without [breaking the hermetic seal] *unsealing the inner housing*.

2. The light [assembly] *fixture* of claim 1, wherein the second end [comprising a lens assembly, the lens assembly forming the] *of the hermetically sealed inner housing forms a* hermetic seal [with the inner housing body].

3. The light [assembly] *fixture* of claim 2, [wherein the lens assembly comprises] *further comprising*:

a lens frame configured to connect to the second end of the *hermetically sealed* inner housing [assembly];

[a lens positioned between the lens frame and the second end of the inner housing assembly when the lens frame is connected to the second end of the inner housing assembly;] and a seal positioned between the lens and the second end of the *hermetically sealed* inner housing [assembly] when the lens frame is connected to the second end of the *hermetically sealed* inner housing [assembly and forming the hermetic seal].

4. The light [assembly] *fixture* of claim 1, wherein the tilt assembly comprises:

an adjusting shaft with a first end and a second end, the [user input] *outside* portion positioned on the first end of the adjusting shaft; and a collar adjustably connected to the adjusting shaft;

wherein the collar is configured to move toward and away from the second end of the *hermetically sealed* inner housing [assembly] in response to [the] user input to the [user input] *outside* portion.

5. The light [assembly] *fixture* of claim 4, wherein the [tilting] *tilt* assembly further comprises a bracket, the bracket being connected to the light cartridge and having at least one rail, and wherein the collar is slidably connected to the at least one rail.

6. The light [assembly] *fixture* of claim 4, wherein the first end of the adjusting shaft is accessible from outside of the *hermetically shaped* inner housing [assembly] when the lens [assembly] is connected to the second end of the *hermetically sealed* inner housing [assembly], and wherein the second end of the adjusting shaft is positioned inside the *hermetically sealed* inner housing [assembly] when the lens [assembly] is connected to the second end of the *hermetically sealed* inner housing [assembly].

7. The light [assembly] *fixture* of claim 4, wherein the adjusting shaft includes a threaded portion between the first and second ends of the adjusting shaft, and wherein the collar includes a threaded aperture connected to the threaded portion of the adjusting shaft.

8. The light [assembly] *fixture* of claim 1, wherein the *hermetically sealed* inner housing [assembly] is configured to transition between a first position and a second position without breaking the hermetic seal.

9. The light [assembly] *fixture* of claim 1, further comprising a pivot frame disposed within the *hermetically sealed* inner housing [assembly] and configured to receive the light cartridge, the pivot frame comprising a sleeve portion and at least one tilting member extending from the sleeve portion.

10. The light [assembly] *fixture* of claim 9, wherein the at least one tilting member comprises an arcuate surface, wherein the *hermetically sealed* inner housing [body] comprises at least one tilting pocket configured to receive the at least one tilting member, wherein the at least one tilting body has an arcuate surface configured to engage the arcuate surface of the at least one tilting member, and wherein the at least one tilting member is configured to rotate within the tilting pocket between a first tilt position and a second tilt position.

11. The light [assembly] *fixture* of claim 10, wherein the at least one tilting member is configured to rotate within the tilting pocket about a tilt axis, and wherein the tilt axis is non-parallel to the outer [housing] axis.

12. The light [assembly] *fixture* of claim 11, wherein the tilt axis is substantially perpendicular to the outer [housing] axis.

13. The light [assembly] *fixture* of claim 10, wherein the at least one tilting member comprises a first stop wall and a second stop wall, and wherein the first stop wall is configured to limit rotation of the tilting member with respect to the tilting pocket in a first direction and the second stop wall is configured to limit rotation of the tilting member with respect to the tilting pocket in a second direction.

14. The light [assembly] *fixture* of claim 13, further comprising at least one pivot frame retainer connected to the *hermetically sealed* inner housing [body], wherein the first stop wall is configured to abut the at least one pivot frame retainer when the at least one tilting member is in the first tilt position, and wherein the second stop wall is configured to abut the at least one pivot frame retainer when the at least one tilting member is in the second tilt position.

15. The light [assembly] *fixture* of claim 1, wherein the *hermetically sealed* inner housing [body] comprises a tilt housing, and wherein the tilt assembly is positioned at least partially within the tilt housing.

16. A method of assembling a light [assembly] *fixture*, the method comprising:

inserting an inner housing [assembly] into an open end of an outer housing having an outer [housing] axis, the inner housing [assembly] being hermetically sealed and having [an inner housing body and] a light cartridge [disposed therein] *including one or more light emitting diodes* (*LEDs*), the *one or more* light [cartridge] *emitting diodes* (*LEDs*) being configured to direct light through a lens of the inner housing [assembly]; and tilting the *one or more* light [cartridge] *emitting diodes* (*LEDs*) with respect to the outer [housing] axis without moving the [inner housing body] *lens* and without breaking the hermetic seal of the inner housing [assembly].

17. The method of claim 16, further comprising:

rotating the inner housing [assembly] about the outer housing with respect to the outer housing after inserting the inner housing [assembly] through the open end of the outer housing and without breaking the hermetic seal of the inner housing [assembly].

18. The method of claim 16, further comprising manually actuating a user input portion of a tilt assembly [within the inner housing assembly] to tilt the *one or more* light [cartridge] *emitting diodes* (*LEDs*) with respect to the [inner housing body] *lens* without breaking the hermetic seal of the inner housing [assembly].

19. The method of claim 16, further comprising removing the inner housing [assembly] from the outer housing and inserting a second inner housing [assembly] without breaking the hermetic seal of the inner housing [assembly] or a hermetic seal of the second inner housing [assembly].

20. A light [assembly] *fixture* comprising:

an outer housing [having] *including*:

a first end;

a second end [opposite] *different from* the first end;

an outer [housing] axis extending [through] *away from* the [first and] second [ends of the outer housing] *end*;

[an] *a hermetically sealed* inner housing [assembly] having:

a first end;

a second end *different from the first end and including a lens*;

an inner housing body extending between the first and second ends of the inner housing [assembly] and containing a light cartridge[, the light cartridge having a lighting element] *including one or more light emitting diodes* (*LEDs*) configured to emit light through the [second end of the inner housing assembly] *lens*;

[a lens connected to the second end of the inner housing assembly;] and a tilt member supported by the *hermetically sealed* inner housing [body] and having*:* a user input portion configured to receive user input, the tilt member being configured to tilt the *one or more* light [cartridge] *emitting diodes* (*LEDs*) between at least a first position and a second position with respect to the outer [housing] axis upon receipt of the user input and without moving the [inner housing body] *lens and without breaking the hermetic seal of the inner housing.*

*21. An in-ground light comprising:*

*an outer housing including:*

*an upper end configured to be positioned at or below a ground level or surface when the outer housing is installed;*

*a lower end; and*

*an outer housing axis extending through one or both of the upper end and the lower end; and*

*a hermetically sealed inner housing sized to be inserted in the outer housing and having:*

*a first end;*

*a second end different from the first end and including a lens; and*

*a light cartridge including one or more light emitting diodes (LEDs) configured to emit light through the lens;*

*wherein the one or more light emitting diodes (LEDs) is configured to be tilted between at least a first position and a second position with respect to the outer housing axis without moving the lens and without breaking the hermetic seal of the inner housing.*

*22. The in-ground light of claim 21, wherein the one or more light emitting diodes (LEDs) is further configured to be manually rotated about the outer housing axis without breaking the hermetic seal of the inner housing.*

*23. The in-ground light of claim 21, further comprising a user input portion accessible from the second end of the hermetically sealed inner housing when the hermetically sealed inner housing is inserted in the outer housing, the user input portion being configured to cause the hermetically sealed inner housing to move between the first position and the second position.*

*24. The in-ground light of claim 21, further comprising a tilt-transmitting portion, the tilt-transmitting portion moving the hermetically sealed inner housing between the first position and the second position.*

*25. The in-ground light of claim 23, further comprising a bracket having one or more elongated slots, the one or more elongated slots being configured to slidingly engage relative to the tilt-transmitting portion.*

*26. An in-ground light comprising:*

*a hermetically sealed light mount including a window and a light cartridge, the light cartridge including one or more light emitting diodes (LEDs) configured to emit light through the window;*

*an unsealed casing having an upper end configured to be positioned at or below a ground level or surface when installed in-ground, the unsealed casing including an axis extending away from the upper end, the unsealed casing being sized to receive the hermetically sealed light mount; and*

*a tilt member including a user input portion configured to receive user input, the user input portion being accessible from the upper end of the unsealed casing, the tilt member being configured to tilt the one or more light emitting diodes (LEDs) between at least a first position and a second position with respect to the axis upon application of the user input and without moving the window and without breaking the hermetic seal of the light mount.*

*27. The in-ground light of claim 26, wherein the hermetically sealed light mount is further configured to be manually rotated about the axis without breaking the hermetic seal of the light mount.*

*28. The in-ground light of claim 26, wherein the window comprises transparent or translucent material.*

*29. The in-ground light of claim 26, wherein the window comprises a lens.*

* * * * *